US012597814B2

(12) United States Patent
Liu et al.

(10) Patent No.: US 12,597,814 B2
(45) Date of Patent: Apr. 7, 2026

(54) STATOR, MOTOR, POWER ASSEMBLY, AND ELECTRIC VEHICLE

(71) Applicant: Huawei Digital Power Technologies Co., Ltd., Futian District (CN)

(72) Inventors: Hongbing Liu, Shanghai (CN); Haisong Xu, Shanghai (CN); Jiangang Wang, Dongguan (CN); Shaobo Yang, Dongguan (CN); Bayaer Eerhemu, Shanghai (CN); Jun Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 290 days.

(21) Appl. No.: 18/321,098

(22) Filed: May 22, 2023

(65) Prior Publication Data

US 2023/0327504 A1    Oct. 12, 2023

Related U.S. Application Data

(63) Continuation of application No. PCT/CN2021/111356, filed on Aug. 6, 2021.

(30) Foreign Application Priority Data

Nov. 25, 2020    (CN) .......................... 202011340619.9

(51) Int. Cl.
*H02K 1/20*        (2006.01)
*H02K 5/10*        (2006.01)
*H02K 5/15*        (2006.01)

(52) U.S. Cl.
CPC ................. *H02K 1/20* (2013.01); *H02K 5/10* (2013.01); *H02K 5/15* (2013.01)

(58) Field of Classification Search
CPC .. H02K 1/20; H02K 5/10; H02K 5/15; H02K 5/203; H02K 9/16
(Continued)

(56) References Cited

U.S. PATENT DOCUMENTS

2003/0062780 A1    4/2003  Kaneko et al.
2008/0100159 A1 *  5/2008  Dawsey ................... H02K 1/20
                                                    310/59
(Continued)

FOREIGN PATENT DOCUMENTS

AT            521060 A1    10/2019
CN      106953485 A  *  7/2017  ............... H02K 3/24
(Continued)

OTHER PUBLICATIONS

Machine Translation of CN 109617319 A (Year: 2019).*
Machine Translation of CN 106953485 A (Year: 2017).*
Machine Translation of JP 2019161999 A (Year: 2019).*

*Primary Examiner* — Alexander A Singh
*Assistant Examiner* — Charlie Frank Mann, Jr.
(74) *Attorney, Agent, or Firm* — Maier & Maier, PLLC

(57)    ABSTRACT

A stator includes a stator core and a seal kit. The stator core includes a yoke part and a plurality of tooth parts. A tooth root of the tooth part is connected to the yoke part. A tooth top of the tooth part is away from the yoke part. An opening slot is formed between two adjacent tooth parts. The opening slot includes a coil slot and a flow passing slot that communicate with each other. The coil slot extends from the tooth top to the tooth root. The coil slot is configured to accommodate a stator coil. The flow passing slot extends from the tooth root to the yoke part. The seal kit is connected to an inner wall of the opening slot. The seal kit and the inner wall of the flow passing slot jointly form a flow passing passage for a coolant to flow through.

20 Claims, 48 Drawing Sheets

(58) Field of Classification Search
USPC ........................................................... 310/59
See application file for complete search history.

(56) References Cited

U.S. PATENT DOCUMENTS

| | | | | |
|---|---|---|---|---|
| 2011/0133580 A1* | 6/2011 | Sugimoto | ................ | H02K 1/20 |
| | | | | 310/54 |
| 2012/0080982 A1* | 4/2012 | Bradfield | ................ | H02K 9/00 |
| | | | | 310/60 A |

FOREIGN PATENT DOCUMENTS

| | | | | | | |
|---|---|---|---|---|---|---|
| CN | 106972666 | A | | 7/2017 | | |
| CN | 207782530 | U | | 8/2018 | | |
| CN | 109494898 | A | | 3/2019 | | |
| CN | 109617319 | A | * | 4/2019 | ............ | H02K 9/197 |
| CN | 110247485 | A | | 9/2019 | | |
| CN | 110535261 | A | | 12/2019 | | |
| CN | 211239470 | U | | 8/2020 | | |
| JP | 2003324901 | A | | 11/2003 | | |
| JP | 2012143041 | A | | 7/2012 | | |
| JP | 2019161999 | A | * | 9/2019 | ............ | H02K 1/165 |

* cited by examiner

2000

1000

16

162
161

STATOR, MOTOR, POWER ASSEMBLY, AND ELECTRIC VEHICLE

CROSS-REFERENCE TO RELATED APPLICATIONS

This application is a continuation of International Application No. PCT/CN2021/111356, filed on Aug. 6, 2021, which claims priority to Chinese Patent Application No. 202011340619.9, filed on Nov. 25, 2020. The disclosures of the aforementioned applications are hereby incorporated by reference in their entireties.

TECHNICAL FIELD

The embodiments relate to the field of electric vehicle technologies, a stator, a motor, a power assembly, and an electric vehicle.

BACKGROUND

With the development of electric vehicles, electric vehicle assemblies develop towards a direction of a high speed and high power density, and heat consumption density of motors is increasingly high. Heat dissipation becomes an important challenge. Whether a motor can implement good heat dissipation directly affects working reliability of the motor and performance of an entire vehicle. The motor includes a stator. A corresponding heat dissipation may needs to be mad for the stator. However, heat dissipation of a stator of an existing motor may result in high costs but low reliability.

SUMMARY

The embodiments may provide a stator, a motor, a power assembly, and an electric vehicle, to reduce the processing costs and also ensure heat dissipation reliability of a stator of a motor.

According to a first aspect, the embodiments may provide a stator. The stator includes a stator core and a seal kit.

The stator core includes a yoke part and a plurality of tooth parts. A tooth root of the tooth part is connected to the yoke part. A tooth top of the tooth part is away from the yoke part. An opening slot is formed between two adjacent tooth parts.

The opening slot includes a coil slot and a flow passing slot that communicate with each other. The coil slot extends from the tooth top to the tooth root. The coil slot is configured to accommodate a stator coil. The flow passing slot extends from the tooth root to the yoke part.

The seal kit is connected to an inner wall of the opening slot. The seal kit and the inner wall of the flow passing slot jointly form a flow passing passage for a coolant to flow through.

In this way, the opening slot extending from the tooth part to the yoke part is formed between two adjacent tooth parts, and the opening slot is divided into two functional spaces of the flow passing slot and the coil slot, so that the coil slot can accommodate the stator coil and the coolant can flow through the flow passing slot. The flow passing slot and the coil slot are independent of each other and do not interfere with each other. In other words, the opening slot can have two independent functional spaces for accommodating the stator coil and the coolant. In comparison with an existing solution in which the coolant needs to flow in the coil slot, this setting can minimize a possibility of increasing flow resistance of the coolant due to the narrow slot, challenging fluidity of the coolant, and causing difficulty in normal heat dissipation of the stator coil. This helps ensure that the coolant has a sufficient flow space, reduce imbalance generated when the coolant flows, and improve heat dissipation performance of the stator core. In addition, because there is no need to guide a flow in the coil slot, a form of a part that is of the stator coil and that passes through the coil slot may be manufactured by using a relatively simple process. In this way, the overall processing costs and the material management costs can be greatly reduced when heat dissipation reliability of the stator is ensured. This helps improve production efficiency.

In addition, the inner wall of the flow passing slot and the seal kit can cooperatively form the flow passing passage for the coolant to flow through. Therefore, when the coolant flows in the flow passing passage, heat can be fully dissipated for the stator core due to direct contact between the coolant and the stator core, and further, the coolant can be close to the stator coil to a maximum extent when sealing reliability of the flow passing passage is ensured, to ensure that heat is well dissipated in a region that requires heat dissipation in the stator coil. In this way, the stator coil can be fully cooled, and heat dissipation performance of the stator coil can be ensured, thereby implementing high reliability.

The flow passing passage is entirely located at the yoke part and is close to the tooth root of the tooth part. In comparison with an existing solution in which a passage for the coolant to flow through is disposed between two adjacent coil slots (that is, a passage is disposed at a tooth part on which no coil slot is disposed), the structure setting can minimize an impact on electromagnetic performance of the motor, so that the motor can be run normally in various working conditions. This facilitates a high-speed development trend of the motor.

In a possible implementation, the stator further includes a stator coil, the stator coil includes a core part, and the core part passes through the coil slot.

The seal kit is located between the core part and the coil slot, and the seal kit wraps the inner wall of the coil slot.

In this way, the seal kit is connected to the inner wall of the opening slot, and the seal kit further wraps the inner wall of the coil slot, so that the inner wall of the coil slot is fully covered by the seal kit. In other words, the seal kit is closely attached to the inner wall of the coil slot and is not easy to fall off and is convenient for production and management. In this way, when the core part passes through the coil slot, mutual scratching between the stator core and the stator coil can be effectively avoided. A short circuit caused because the core part is worn due to a corner or a sharp protruding part of the stator core can be effectively avoided. Therefore, a good buffering function can be implemented.

It may be understood that the seal kit further needs to cooperate with the inner wall of the flow passing slot to form the flow passing passage. Therefore, to ensure that integrity of the seal kit is not damaged, the seal kit does not need to be punctured for flow guiding as in the existing solution. Process complexity is low. A material, the processing costs, the production costs, and the management costs caused by extra operations for the seal kit can be effectively reduced. In addition, flow passing does not need to be implemented in the coil slot. In this way, an increase in process difficulty and the costs caused by ensuring sealing performance in the coil slot and insulation performance of the coolant can be effectively reduced. Therefore, practicability is high, and an application scope is wide. For example, in the conventional technologies, flow passing in the coil slot may be flow passing on two sides or one side of the stator coil in the coil slot. However, it should be understood that a manner of flowing passing in the coil slot in the conventional technologies is not limited thereto.

For example, because flow passing does not need to be implemented in the coil slot, the seal kit does not need to be punctured. An existing solution uses a flat wire process to maintain a copper wire form of the stator coil. In comparison, the stator coil provided in this embodiment may be made through a relatively simple process: a round wire process. However, it should be understood that setting of the seal kit in this embodiment can also adapt to the flat wire process and is not limited thereto.

In a possible implementation, the seal kit is insulation paper.

In this case, the seal kit is insulating. Therefore, the seal kit can cooperate with the inner wall of the flow passing slot to form the flow passing passage, and the seal kit can further well implement insulation between the stator coil and the stator core, so that the stator coil and the stator core are insulated from each other. In other words, the seal kit can have both a sealing function and an insulation function. Use performance of the seal kit is diversified, and high flexibility is implemented. However, in this setting, because the seal kit is in direct contact with the stator coil, when the coolant flows in the flow passing passage, heat of the stator coil can be transferred to the coolant through the seal kit. A heat dissipation path of the stator coil is short, and link thermal resistance is small, which facilitates heat dissipation of the stator coil in a working condition with a large torque. In addition, because the coolant is further in direct contact with the stator core, the coolant can cool both the stator core and the stator coil, thereby significantly improving heat dissipation capabilities of the stator core and the stator coil.

In a possible implementation, the stator coil further includes an end winding connected to the core part, the end winding is located on an outer side of the stator core, and an outlet of the flow passing passage faces the end winding.

Because the end winding includes the first end winding and the second end winding, there are two outlets of the flow passing passage. One outlet of the flow passing passage is disposed at one end of the stator core, and the other outlet of the flow passing passage is disposed at the other end of the stator core.

In this way, when the coolant flows in the flow passing passage, heat can be dissipated from the core part of the stator coil. When the coolant flows out from the flow passing passage, one part of the coolant can flow out from the end of the stator core to dissipate heat from the first end winding, and the other part of the coolant can flow out from the other end of the stator core to dissipate heat from the second end winding, thereby achieving an objective of balanced heat dissipation of two ends of a stator winding in the motor and improving heat dissipation of the motor. In other words, the coolant can not only cool the core part, but also cool the end winding. The coolant can cool both the core part and the end winding, so that thermal resistance of the entire stator coil is reduced. In this way, heat dissipation is even, and reliability is high. This helps improve a heat dissipation capability of the motor and reduce a temperature rise of the motor.

In a possible implementation, the flow passing slot includes a body part and at least one branch part, the body part communicates with the coil slot, and the at least one branch part is spaced on a peripheral side of the body part and communicates with the body part.

Therefore, the branch part is added, so that the coolant can flow not only in the body part but also in the branch part. The addition of the branch part is equivalent to an increase of a slot wall area of the flow passing slot, that is, equivalent to an increase of a contact area between the coolant and the stator core, thereby further enhancing heat dissipation performance and cooling performance of the stator.

In a possible implementation, the flow passing slot has a symmetrical structure.

Therefore, regardless of whether the flow passing slot includes only the body part or includes both the body part and the branch part, processing of the flow passing slot is simpler, and the material costs and the production management costs are reduced.

In a possible implementation, the yoke part is further provided with a flow guiding passage extending in a radial direction.

An inlet of the flow guiding passage is disposed on an outer surface of the yoke part and is configured to guide a coolant in a liquid inlet passage of a peripheral mechanical part of the stator core to the stator core, and an outlet of the flow guiding passage at least partially communicates with an inlet of the flow passing passage.

It may be understood that, the peripheral mechanical part of the stator core is entirely located on a periphery of the stator core and is disposed close to the stator core and can have a direct or an indirect connection relationship with the stator core. In this case, the peripheral mechanical part of the stator core is provided with the liquid inlet passage, and the flow guiding passage is connected between the liquid inlet passage and the flow passing passage, so that the coolant can be guided to the flow guiding passage of the stator core based on a flow guiding function of the liquid inlet passage, and the coolant can be guided to the flow passing passage based on a guiding function of the flow guiding passage. In this way, the coolant flows in the flow passing passage, and heat dissipation of the stator core and the stator coil is also considered, thereby implementing high heat dissipation efficiency.

For example, the peripheral mechanical part of the stator core may be a motor housing. However, it should be understood that the peripheral mechanical part is not limited thereto.

In addition, different from the flow passing passage extending in the axial direction, the flow guiding passage extends in the radial direction. In this way, the coolant can be guided at a shortest distance to the flow passing passage. In this setting, a heat transfer path of the coolant is short, and flow resistance is small, thereby avoiding a relatively large local temperature difference in the stator core to a greatest extent.

For example, the outlet of the flow guiding passage partially communicates with the inlet of the flow passing passage. In this way, due to fluidity, the coolant flowing into the flow guiding passage can smoothly flow into the flow passing passage. Because the outlet of the flow guiding passage does not need to completely communicate with the inlet of the flow passing passage, a processing and manufacturing process of the stator core is simpler.

Alternatively, the outlet of the flow guiding passage completely communicates with the inlet of the flow passing passage.

Based on the foregoing description, it should be understood that, a flow quantity and a flow velocity of the coolant may be controlled through changing a degree of the communication between the outlet of the flow guiding passage and the inlet of the flow passing passage, thereby ensuring flow reliability and evenness of the coolant in the flow passing passage.

In a possible implementation, the yoke part is further provided with a flow splitting passage extending in an axial direction. The flow splitting passage is away from the tooth part relative to the flow passing passage. An inlet of the flow splitting passage communicates with the flow guiding passage, and an outlet of the flow splitting passage is disposed on an end face of the yoke part.

One end of the flow splitting passage in the radial direction is open, and the other end of the flow splitting passage in the radial direction is closed.

Alternatively, two ends of the flow splitting passage are both closed in the radial direction.

The flow splitting passage is disposed, so that heat can be directly dissipated from the stator core when the coolant flows into the flow splitting passage. In comparison with a case in which only the flow passing passage is responsible for heat dissipation of the stator core and the stator coil, the flow splitting passage is additionally disposed so that two layers of passages are formed inside the stator core, to share a heat dissipation load on the flow passing passage and reduce the heat dissipation load on the flow passing passage. In this way, cooling performance of the stator core is further improved, and heat dissipation efficiency and heat dissipation reliability of the stator core are further ensured.

In addition, a form of the flow splitting passage may be selected according to an actual status of the stator core, provided that the flow splitting passage is disposed at an edge of the yoke part or at an edge close to the yoke part. It should be understood that overall strength of the stator core and heat distribution of the stator core need to be considered for a location of the flow splitting passage.

In a possible implementation, the stator core includes a middle part, and a first side part and a second side part that are respectively connected to two ends of the middle part. The yoke part and the tooth part both sequentially extend from the first side part to the middle part and then to the second side part. The flow guiding passage is located at the middle part.

In other words, the flow guiding passage is at a middle location of an axial length of the stator core. In this way, after the coolant enters the liquid inlet passage, the coolant may flow in from a location of the middle part in the stator core. In this setting, when the motor is run in a high-speed rated working condition, heat exchange and cooling can be quickly performed at the location of the middle part in the stator core prone to a highest temperature, to minimize a possibility that the stator core fails due to overheating, so that the stator core is not damaged due to local overtemperature. Therefore, high reliability is implemented.

In a possible implementation, the flow passing passage includes a first flow passing passage and a second flow passing passage. The first flow passing passage and the second flow passing passage are respectively located at the first side part and the second side part. The first flow passing passage and the second flow passing passage are symmetrically disposed. The first flow passing passage and the second flow passing passage each communicate with the flow guiding passage and an outer space of the stator.

In this way, a structure of the flow passing passage can fully adapt to a manner in which the coolant flows in from the middle part, so that the coolant can flow to two ends of the stator core in the axial direction based on a flow splitting function of the flow guiding passage when the coolant enters the flow guiding passage from the middle part of the stator core. Therefore, the coolant can quickly dissipate heat at the two ends of the stator core, and temperatures at the two ends of the stator core can be relatively even without an excessively large difference. In other words, it can be ensured that temperatures of the first side part and the second side part are even.

In a possible implementation, the flow splitting passage includes a first flow splitting passage and a second flow splitting passage. The first flow splitting passage and the second flow splitting passage are respectively located at the first side part and the second side part. The first flow splitting passage and the second flow splitting passage are symmetrically disposed. The first flow splitting passage and the second flow splitting passage each communicate with the flow guiding passage and the outer space of the stator.

In this way, a structure of the flow splitting passage can fully adapt to a manner in which the coolant flows in from the middle part, so that the coolant can flow to two ends of the stator core in the axial direction based on a flow splitting function of the flow guiding passage when the coolant enters the flow guiding passage from the middle part of the stator core. Therefore, the coolant can quickly dissipate heat at the two ends of the stator core, and the temperatures at the two ends of the stator core can be relatively even without an excessively large difference. In other words, it can be ensured that the temperatures of the first side part and the second side part are even.

In a possible implementation, the flow guiding passage includes one first flow guiding passage, two second flow guiding passages, and two third flow guiding passages. The first flow guiding passage communicates with the liquid inlet passage of the peripheral mechanical part of the stator core.

The two second flow guiding passages are respectively located on two sides of an inlet of the first flow guiding passage. One of the second flow guiding passages communicates with the first flow guiding passage and the first flow splitting passage, and the other one of the second flow guiding passages communicates with the first flow guiding passage and the second flow splitting passage.

The two third flow guiding passages are respectively located on two sides of an outlet of the first flow guiding passage. One of the third flow guiding passages communicates with the first flow guiding passage and the first flow passing passage, and the other one of the third flow guiding passages communicates with the first flow guiding passage and the second flow passing passage.

In this way, when the coolant flows into the first flow guiding passage, based on a flow guiding function of the first flow guiding passage, a part of the coolant can enter the second flow guiding passage, and a part of the coolant can enter the third flow guiding passage. The coolant entering the second flow guiding passage may flow out from an outlet of the first flow splitting passage or the second flow splitting passage, and the coolant entering the third flow guiding passage may flow out from an outlet of the first flow passing passage or the second flow passing passage. The flow guiding passage may be a combination form of a plurality of passages, to further enlarge the contact area between the coolant and the stator core, so that the coolant can be in contact with the stator core to a greatest extent in a limited space. In this way, a heat dissipation area of the stator core is fully ensured. This helps improve the heat dissipation efficiency of the stator core.

In a possible implementation, there are a plurality of flow passing passages. The plurality of flow passing passages are spaced in a circumferential direction. There are also a plurality of flow guiding passages. The plurality of flow guiding passages are spaced in the circumferential direction.

An inlet of each first flow passing passage communicates with an outlet of one of the flow guiding passages, and an outlet of each first flow passing passage is disposed on an end face of the first side part; and an inlet of each second flow passing passage communicates with an outlet of one of the flow guiding passages, and an outlet of each second flow passing passage is disposed on an end face of the second side part.

Alternatively, an inlet of each first flow passing passage communicates with outlets of two adjacent flow guiding passages, and an outlet of each first flow passing passage is disposed on an end face of the first side part; and an inlet of each second flow passing passage communicates with outlets of two adjacent flow guiding passages, and an outlet of each second flow passing passage is disposed on an end face of the second side part.

For example, the plurality of flow passing passages are evenly spaced in the circumferential direction. In other words, the plurality of flow passing passages are evenly distributed in the circumferential direction. In the setting of even distribution of the plurality of flow passing passages in the circumferential direction, an overall temperature of the stator core can be relatively even; and under fully adaption to the fluidity of the coolant, the imbalance generated when the coolant flows can be reduced, thereby further minimizing a possibility of increasing flow resistance of the coolant, challenging the fluidity of the coolant, and causing difficulty in normal working of the stator due to generation of the imbalance. In this way, use performance of the stator is effectively ensured.

In this way, the plurality of flow guiding passages may communicate with the plurality of flow passing passages in a one-to-one correspondence manner. Based on the setting of the communication in the one-to-one correspondence manner, it can be ensured that the coolant flows through each of the flow passing passages, so that the coolant can be evenly distributed at various locations in the stator core in the circumferential direction.

Alternatively, a correspondence between the plurality of flow guiding passages and the plurality of flow passing passages is that one flow guiding passage corresponds to two adjacent flow passing passages. When the coolant enters one of the flow guiding passages, one part of the coolant enters one of two adjacent flow passing passages corresponding to the flow guiding passage, and the other part of the coolant enters the other one of the two adjacent flow passing passages corresponding to the flow guiding passage.

In other words, the coolant in each of the flow passing passages may come from two adjacent flow guiding passages. In this setting, the coolant in the two adjacent flow guiding passages can supplement each other. It is ensured that even if a flow quantity of the coolant in one of the flow guiding passages is relatively small when the coolant flows into the flow passing passage, due to existence of the other flow guiding passage, the coolant sufficiently flows through each of the flow passing passages. In this way, high reliability is implemented, thereby achieving an objective of effective heat dissipation.

In a possible implementation, there are also a plurality of flow splitting passages. The plurality of flow splitting passages may be spaced in the circumferential direction and may be located on a periphery of the plurality of flow passing passages.

Each first flow splitting passage is located at the first side part. An inlet of each first flow splitting passage communicates with one of the flow guiding passages, and an outlet of each first flow splitting passage is disposed on the end face of the first side part.

Each second flow splitting passage is located at the second side part. An inlet of each second flow splitting passage communicates with one of the flow guiding passages, and an outlet of each second flow splitting passage is disposed on the end face of the second side part.

For example, the plurality of flow splitting passages may be evenly spaced in the circumferential direction. In other words, the plurality of flow splitting passages may be evenly distributed in the circumferential direction. In the setting of even distribution of the plurality of flow splitting passages in the circumferential direction, an overall temperature of the stator core can be relatively even; and under fully adaption to the fluidity of the coolant, the imbalance generated when the coolant flows can be reduced, thereby further minimizing a possibility of increasing flow resistance of the coolant, challenging the fluidity of the coolant, and causing difficulty in normal working of the stator due to generation of the imbalance. In this way, use performance of the stator is effectively ensured.

In a possible implementation, the stator core includes a plurality of first laminations and a plurality of second laminations. The plurality of first laminations may be stacked to form the first side part and the second side part. The plurality of second laminations may be stacked to form the middle part.

All first laminations forming the first side part, all the second laminations forming the middle part, and all first laminations forming the second side part are sequentially connected to cooperatively form the stator core.

The first laminations and the second laminations in two different forms are disposed. Therefore, when all the laminations are stacked in the axial direction and contours of the laminations completely overlap in the circumferential direction, slot structures at the same locations in the laminations may have a specified location relationship according to a requirement of a product. For example, all slot structures at the same locations in the laminations completely overlap to form the flow guiding passage, the flow splitting passage, and the flow passing passage of the stator core. In addition, in the stacking assembly, an eddy-current loss of the stator core can be reduced. This may be highly practical and widely applied.

In a possible implementation, each of the first laminations is provided with a plurality of first coil slots. The plurality of first coil slots on the same first lamination is spaced in the circumferential direction.

Each of the second laminations is provided with a plurality of second coil slots. The plurality of second coil slots on the same second lamination are spaced in the circumferential direction.

The first coil slots of all the first laminations and the second coil slots of all the second laminations communicate with each other to cooperatively form the plurality of coil slots spaced in the circumferential direction. Each of the coil slots sequentially extends from the first side part to the middle part and the second side part.

In a possible implementation, each of the second laminations is further provided with a plurality of first flow guiding slots. The plurality of first flow guiding slots on the same second lamination are spaced in the circumferential direction and are located on a periphery of the plurality of second coil slots on the same second lamination.

The first flow guiding slots of all the second laminations communicate with each other to cooperatively form a plurality of flow guiding passages spaced in the circumferential direction.

For example, the plurality of flow guiding passages are evenly spaced in the circumferential direction. In other words, the plurality of flow guiding passages are evenly distributed in the circumferential direction. In the setting of even distribution of the plurality of flow guiding passages in the circumferential direction, an overall temperature of the stator core can be relatively even; and under fully adaption to the fluidity of the coolant, the imbalance generated when the coolant flows can be reduced, thereby further minimizing a possibility of increasing flow resistance of the coolant, challenging the fluidity of the coolant, and causing difficulty in normal working of the stator due to generation of the imbalance. In this way, use performance of the stator is effectively ensured.

In a possible implementation, a center line of each of the second coil slots on the same second lamination in the radial direction is collinear with a center line of one of the first flow guiding slots on the same second lamination in the radial direction.

In this way, when all the laminations are stamped to form the stator core, the following passage setting can be implemented: The plurality of flow passing passages communicate with the plurality of flow guiding passages in a one-to-one correspondence manner. Based on the passage setting of the communication in the one-to-one correspondence manner, it can be ensured that the coolant flows through each of the flow passing passages, so that the coolant can be evenly distributed at various locations in the stator core in the circumferential direction.

Alternatively, center lines of all the second coil slots on the same second lamination in the radial direction and center lines of all the first flow guiding slots on the same second lamination in the radial direction are arranged in a staggered manner.

In this way, when all the laminations are stamped to form the stator core, the following passage setting can be implemented: One flow passing passage corresponds to two adjacent flow guiding passages. In this setting, the coolant in the two adjacent flow guiding passages can supplement each other. It is ensured that even if a flow quantity of the coolant in one of the flow guiding passages is relatively small when the coolant flows into the flow passing passage, due to existence of the other flow guiding passage, the coolant sufficiently flows through each of the flow passing passages. In this way, high reliability is implemented, thereby achieving an objective of effective heat dissipation.

In a possible implementation, the stator core includes a plurality of first laminations, a plurality of second laminations, and a plurality of third laminations.

The plurality of first laminations may be stacked to form the first side part and the second side part. The plurality of second laminations may be stacked. The plurality of third laminations may be stacked on two sides of the plurality of second laminations, to cooperatively form the middle part with the plurality of second laminations.

All first laminations forming the first side part, all second laminations and all the third laminations forming the middle part, and all first laminations forming the second side part are sequentially connected to cooperatively form the stator core.

The first laminations, the second laminations, and the third laminations in three different forms are disposed. Therefore, when all the laminations are stacked in the axial direction and contours of the laminations completely overlap in the circumferential direction, slot structures at the same locations in the laminations may have a specified location relationship according to a requirement of a product. For example, all slot structures at the same locations in the laminations completely overlap to form the flow guiding passage, the flow splitting passage, and the flow passing passage of the stator core. In addition, in the stacking assembly, an eddy-current loss of the stator core can be reduced. This may be highly practical and widely applied.

In a possible implementation, each of the first laminations is provided with a plurality of first coil slots. The plurality of first coil slots on the same first lamination is spaced in the circumferential direction.

Each of the second laminations is provided with a plurality of second coil slots. The plurality of second coil slots on the same second lamination may be spaced in the circumferential direction.

Each of the third laminations is provided with a plurality of third coil slots. The plurality of third coil slots on the same third lamination may be spaced in the circumferential direction.

The first coil slots of all the first laminations, the second coil slots of all the second laminations, and the third coil slots of all the third laminations communicate with each other to cooperatively form the plurality of coil slots spaced in the circumferential direction. Each of the coil slots sequentially extends from the first side part to the middle part and the second side part.

In a possible implementation, each of the second laminations is further provided with a plurality of first flow guiding slots. The plurality of first flow guiding slots on the same second lamination may be spaced in the circumferential direction and may be located on a periphery of the plurality of second coil slots on the same second lamination.

Each of the third laminations is further provided with a plurality of second flow guiding slots and a plurality of third flow guiding slots. The plurality of second flow guiding slots on the same third lamination may be spaced in the circumferential direction and may be located on a periphery of the plurality of third coil slots on the same third lamination. The plurality of third flow guiding slots on the same third lamination may be spaced in the circumferential direction and may be located between the plurality of third coil slots and the plurality of second flow guiding slots on the same third lamination.

The first flow guiding slots of all the second laminations communicate with each other to cooperatively form a plurality of first flow guiding passages spaced in the circumferential direction.

The second flow guiding slots of all the third laminations communicate with each other to cooperatively form a plurality of second flow guiding passages spaced in the circumferential direction.

The third flow guiding slots of all the third laminations communicate with each other to cooperatively form a plurality of third flow guiding passages spaced in the circumferential direction.

In a possible implementation, the flow passing slot includes a first flow passing slot located at the first side part and a second flow passing slot located at the second side part.

Each of the first laminations is further provided with a plurality of flow passing sub-slots. The plurality of flow passing sub-slots on the same first lamination may be spaced in the circumferential direction and may communicate in a one-to-one correspondence manner with the plurality of first coil slots located at the same first lamination.

Flow passing sub-slots of all the first laminations forming the first side part communicate with each other to cooperatively form a plurality of first flow passing slots that are spaced in the circumferential direction and that extend in the axial direction.

Flow passing sub-slots of all the first laminations forming the second side part communicate with each other to cooperatively form a plurality of second flow passing slots that are spaced in the circumferential direction and that extend in the axial direction.

In a possible implementation, each of the first laminations is further provided with a plurality of flow splitting slots. The plurality of flow splitting slots on the same first lamination may be spaced in the circumferential direction and may be located on a periphery of the plurality of flow passing sub-slots on the same first lamination.

Flow splitting slots of all the first laminations forming the first side part communicate with each other to cooperatively form a plurality of first flow splitting passages that may be spaced in the circumferential direction and that may extend in the axial direction.

Flow splitting slots of all the first laminations forming the second side part communicate with each other to cooperatively form a plurality of second flow splitting passages that are spaced in the circumferential direction and that extend in the axial direction.

According to a second aspect, the embodiments may further provide a motor. The motor includes a motor housing and the stator described above. The stator is accommodated inside the motor housing.

In a possible implementation, an inner surface of the motor housing is provided with an annular liquid inlet passage, an outer surface of the motor housing is provided with a liquid inlet for flow-in of a coolant, and the liquid inlet communicates with the liquid inlet passage.

The liquid inlet passage communicates with the flow guiding passage of the yoke part.

Alternatively, an outer surface of the yoke part caves in to form a connection slot extending in the axial direction, the connection slot is connected to the inner surface of the motor housing to form a connection passage, and the liquid inlet passage communicates with the connection passage.

In this way, a connection relationship of the liquid inlet passage may be selected according to an actual situation. This has high flexibility.

It may be understood that the outer surface of the motor housing is provided with the liquid inlet to provide a guiding function for the coolant outside the motor housing. In this way, the coolant can flow into the liquid inlet passage of the motor housing through the liquid inlet and prepare for subsequently entering the passage of the stator core. It can be ensured that the coolant can flow in the motor without being splashed to the outside of the motor. Overall heat dissipation effect of the motor is effectively ensured. The liquid inlet passage is annular. Therefore, when the coolant flows in the liquid inlet passage, the coolant can be evenly distributed in the circumferential direction of the motor housing. In other words, the liquid inlet passage has a flow equalization function, and can evenly distribute, in the circumferential direction of the motor housing, the coolant flowing through the liquid inlet, thereby implementing subsequent full contact between the coolant and the stator core.

For example, the liquid inlet passage may be at a middle location of an axial length of the motor housing. Therefore, a distance between the liquid inlet passage and an axial end of the stator core is approximately equal to that between the liquid inlet passage and the other axial end of the stator core. When the coolant subsequently flows into the stator core, one part of the coolant flows out from one end of the stator core, and the other part of the coolant flows out from the other end of the stator core. In this setting, flow passing paths of the two parts of the coolant in the stator core can be approximately equal, thereby minimizing heat transfer paths of the two parts of the coolant flowing out from the two ends and effectively avoiding a relatively large temperature difference between the two ends of the stator core. In this way, the overall processing costs and the material management costs of the motor are greatly reduced, and heat dissipation efficiency of the motor is improved.

In a possible implementation, the motor further includes a first end cover and a second end cover, and the first end cover and the second end cover are respectively connected to two ends of a housing of the stator and abut against two axial ends of the stator core.

There may be a plurality of connection passages. The plurality of connection passages may be spaced in the circumferential direction.

The first end cover includes a first body and a plurality of first protrusion parts protruding from the first body. The plurality of first protrusion parts may be spaced in the circumferential direction and abut against the stator core. Each of the first protrusion parts is provided with one first liquid outlet penetrating the first end cover. The first body cooperates with the housing of the stator and the stator core to form a first flow equalization passage. The first flow equalization passage communicates with the plurality of connection passages.

The second end cover includes a second body and a plurality of second protrusion parts protruding from the second body. The plurality of second protrusion parts may be spaced in the circumferential direction and abut against the stator core. Each of the second protrusion parts is provided with one second liquid outlet penetrating the second end cover. The second body cooperates with the housing of the stator and the stator core to form a second flow equalization passage. The second flow equalization passage communicates with the plurality of connection passages.

Two adjacent flow passing passages respectively communicate with the first liquid outlet and the second liquid outlet. The flow passing passage communicating with the first liquid outlet further communicates with the second flow equalization passage. The flow passing passage communicating with the second liquid outlet further communicates with the first flow equalization passage.

It may be understood that, when the first end cover and the second end cover are stacked, the first liquid outlet of the first end cover and the second liquid outlet of the second end cover are not disposed in a facing manner but are disposed in a staggered manner. Each first liquid outlet on the first end cover may face one gap between two adjacent second protrusion parts on the second end cover. Each second liquid outlet on the second end cover faces one gap between two adjacent first protrusion parts on the first end cover.

In this way, outlets of two adjacent flow passing passages are respectively a first liquid outlet and a second liquid outlet. In other words, in the two adjacent flow passing passages, the coolant in one flow passing passage is sprayed from the first liquid outlet of the first end cover to the first end winding, and the coolant in the other flow passing passage is sprayed from the second liquid outlet of the second end cover to the second end winding. In this setting, the coolant can flow out through three layers of passages (the connection passage, the first flow equalization passage, and the flow passing passage; or the connection passage, the second flow equalization passage, and the flow passing passage), thereby sufficiently increasing a contact area with the stator core and implementing a high heat dissipation capability and high cooling efficiency.

In a possible implementation, the stator core includes a plurality of first laminations, and the plurality of first laminations may be stacked to form the stator core.

Each of the first laminations is provided with a plurality of first coil slots. The plurality of first coil slots on the same first lamination may be spaced in the circumferential direction.

The first coil slots of all the first laminations communicate with each other to cooperatively form the plurality of coil slots spaced in the circumferential direction.

In a possible implementation, each of the first laminations is further provided with a plurality of flow passing sub-slots. The plurality of flow passing sub-slots on the same first lamination may be spaced in the circumferential direction and may communicate in a one-to-one correspondence manner with the plurality of first coil slots located at the same first lamination.

Flow passing sub-slots of all the first laminations forming the stator core communicate with each other to cooperatively form a plurality of flow passing slots that may be spaced in the circumferential direction and that may extend in the axial direction.

In a possible implementation, each of the first laminations is further provided with a plurality of connection sub-slots. The plurality of connection sub-slots on the same first lamination may be spaced in the circumferential direction and may be located on a periphery of the plurality of flow passing sub-slots on the same first lamination.

Connection sub-slots of all the first laminations forming the stator core communicate with each other to cooperatively form a plurality of connection slots that may be spaced in the circumferential direction and that may extend in the axial direction.

According to a third aspect, the embodiments may further provide a power assembly. The power assembly includes a motor controller and the foregoing motor. The motor controller is electrically connected to the motor.

According to a fourth aspect, the embodiments may further provide an electric vehicle. The electric vehicle includes a vehicle frame and the foregoing power assembly. The power assembly is mounted on the frame.

In the embodiments, the opening slot extending from the tooth part to the yoke part is formed between two adjacent tooth parts, and the opening slot is divided into two functional spaces of the flow passing slot and the coil slot, so that the coil slot can accommodate the stator coil and the coolant can flow through the flow passing slot. The flow passing slot and the coil slot are independent of each other and do not interfere with each other. In other words, the opening slot can have two independent functional spaces for accommodating the stator coil and the coolant. In comparison with an existing solution in which the coolant needs to flow in the coil slot, this setting can minimize a possibility of increasing flow resistance of the coolant due to the narrow slot, challenging fluidity of the coolant, and causing difficulty in normal heat dissipation of the stator coil. This helps ensure that the coolant has a sufficient flow space, reduce imbalance generated when the coolant flows, and improve heat dissipation performance of the stator core. In addition, because there is no need to guide a flow in the coil slot, a form of a part that is of the stator coil and that passes through the coil slot may be manufactured by using a relatively simple process. In this way, the overall processing costs and the material management costs can be greatly reduced when heat dissipation reliability of the stator is ensured. This helps improve production efficiency. In addition, the inner wall of the flow passing slot and the seal kit can cooperatively form the flow passing passage for the coolant to flow through. Therefore, when the coolant flows in the flow passing passage, heat can be fully dissipated for the stator core due to direct contact between the coolant and the stator core, and further, the coolant can be close to the stator coil to a maximum extent when sealing reliability of the flow passing passage is ensured, to ensure that heat is well dissipated in a region that requires heat dissipation in the stator coil. In this way, the stator coil can be fully cooled, and heat dissipation performance of the stator coil can be ensured, thereby implementing high reliability. The flow passing passage is entirely located at the yoke part and is close to the tooth root of the tooth part. In comparison with an existing solution in which a passage for the coolant to flow through is disposed between two adjacent coil slots (that is, a passage is disposed at a tooth part on which no coil slot is disposed), the structure setting can minimize an impact on electromagnetic performance of the motor, so that the motor can be run normally in various working conditions. This facilitates a high-speed development trend of the motor.

DETAILED DESCRIPTION OF THE EMBODIMENTS

The following describes the embodiments with reference to the accompanying drawings.

Figure 1:
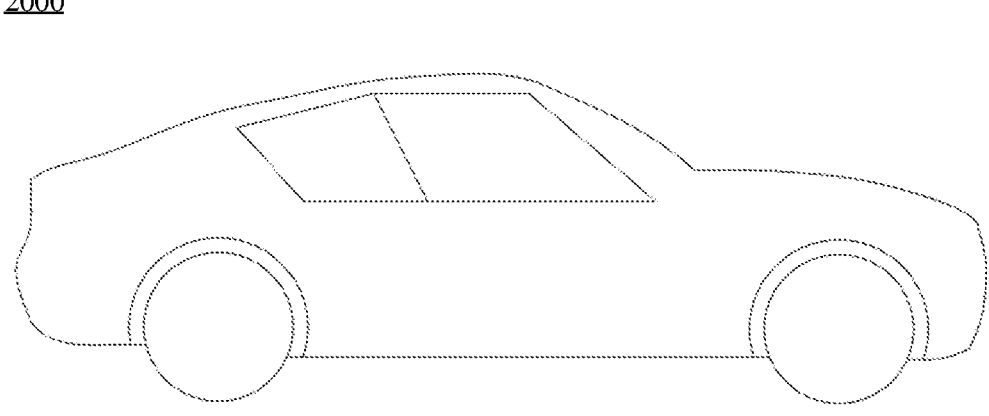
FIG. 1 is a schematic diagram of a structure of an electric vehicle according to an embodiment.
Figure 2:
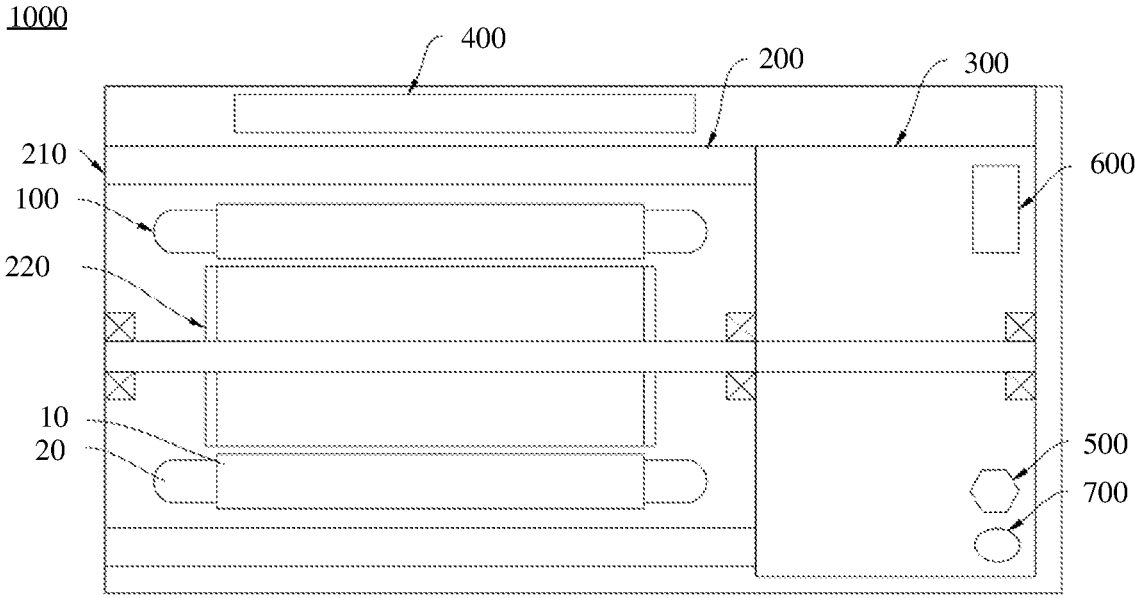
FIG. 2 is a schematic diagram of a structure of a power assembly according to an embodiment.

With reference to FIG. 1 and FIG. 2, an embodiment may provide an electric vehicle 2000. The electric vehicle 2000 may be but is not limited to a pure electric vehicle (PEV/BEV), a hybrid electric vehicle (HEV), a range extended electric vehicle (REEV), a plug-in hybrid electric vehicle (PHEV), or a new energy vehicle.

The electric vehicle 2000 may include a vehicle frame (not shown in the figure) and a power assembly 1000 mounted on the vehicle frame. The vehicle frame is a structural framework of the electric vehicle 2000; and can have functions of supporting, fastening, and connecting each assembly, and bearing a load of an internal environment and an external environment of a system of the electric vehicle 2000. The power assembly 1000 is a system that can generate power in the electric vehicle 2000 and transfer the power to a road surface. It should be understood that application of the power assembly 1000 may be not limited to the electric vehicle 2000, and the power assembly 1000 may be further applied to a processing device and a mechanical device such as an engineering machinery.

With reference to FIG. 2, the power assembly 1000 may include a motor 200, a reducer 300, and a motor controller 400 (MCU). The motor 200 is an electromagnetic apparatus that implements electric energy conversion or electric energy transfer according to the law of electromagnetic induction. The motor 200 can generate a drive torque and is widely used as a power source of the power assembly 1000. For example, the motor 200 may be but is not limited to a permanent-magnet synchronous motor, an asynchronous motor, or an electric generator. The reducer 300 is mechanically connected to the motor 200 and can reduce a rotational speed of the motor 200 to an extent and increase a torque, to adapt to a plurality of working conditions of the electric vehicle 2000. The motor controller 400 is electrically connected to the motor 200, and can control, through actively working, the motor 200 to work according to a specified direction, speed, angle, and response time.

It may be understood that the motor 200, the reducer 300, and the motor controller 400 generate a large amount of heat during working. If heat dissipation and cooling are not performed on the motor 200, the reducer 300, and the motor controller 400 in time, working reliability of the motor 200, the reducer 300, and the motor controller 400 and performance of the entire vehicle are seriously affected. Therefore, a cooling flow path may be disposed inside the power assembly 1000, and a coolant flows in the cooling flow path to take away heat of the motor 200, the reducer 300, and the motor controller 400, thereby implementing respective heat dissipation and cooling. The coolant may be cooling oil, or may be cooling water, or may be another cooling working substance with fluidity.

In an actual cooling process of the power assembly 1000, heat may be dissipated from the motor 200 and the reducer 300 in the power assembly 1000 in an oil cooling manner, and heat may be dissipated from the motor controller 400 in a water cooling manner. For example, heat may be dissipated from the motor 200 and the reducer 300 in an integrated oil cooling manner, to cool both the motor 200 and the reducer 300. Herein, the coolant may be cooling oil.

Still with reference to FIG. 2, in a possible implementation, the power assembly 1000 may further include a transmit apparatus 500, a heat exchanger 600, and a filter 700. For example, the transmit apparatus 500, the heat exchanger 600, and the filter 700 may be located inside a housing of the reducer 300; or the transmit apparatus 500, the heat exchanger 600, and the filter 700 may be located outside a housing of the reducer 300. This is not limited in this embodiment.

The transmit apparatus 500 may provide power for the coolant and may drive the coolant to flow in the passage of the motor 200 to take away heat of the motor 200, thereby ensuring flowing of the coolant and further controlling a flow velocity of the coolant. For example, when a temperature of an internal component of the motor 200 is relatively high, the flow velocity of the coolant may be increased, so that the coolant quickly takes heat in the motor 200 out, thereby implementing good heat dissipation for the motor 200. For example, the transmit apparatus 500 may be an electric oil pump.

The heat exchanger 600 may absorb heat of the high-temperature coolant through heat exchange by using a cooling fluid flowing in the heat exchanger 600, to implement heat exchange and cooling for the coolant, so that the coolant can be reused. In other words, the heat exchanger 600 may be configured to perform heat exchange on the coolant carrying the heat of the motor 200 to cool the coolant, so that the coolant can be reused. For example, the heat exchanger 600 may be an oil-water heat exchanger. Water may be used as a cooling fluid to perform heat exchange and cooling on cooling oil.

The filter 700 may filter the coolant, to avoid a blockage in the passage of the motor 200 due to a possible foreign matter in the coolant.

For example, the water cooling outlet of the motor controller 400 may be connected to the heat exchanger 600, so that water flowing out of the motor controller 400 flows into the heat exchanger 600. Under a power transmission function of the transmit apparatus 500, the cooling oil may be filtered by the filter 700, exchange, in the heat exchanger 600, heat with water flowing out of the motor controller 400, and then enters the motor 200 to dissipate heat for the motor 200, thereby completing a heat dissipation cycle.

On this basis, in the power assembly 1000 in this embodiment, heat can be effectively dissipated for the motor 200, and the coolant can be reused.

It should be noted that an objective of FIG. 2 is merely to schematically describe a connection relationship among the motor 200, the motor controller 400, the reducer 300, the transmit apparatus 500, the heat exchanger 600, and the filter 700, but not to limit connection locations, structures, and quantities of these devices. The structure shown in this embodiment does not constitute a limitation on the power assembly 1000. In some other embodiments, the power assembly 1000 may include more or fewer components than those shown in the figure, or combine some components, or split some components, or have different component arrangements. The components shown in the figure may be implemented by hardware, software, or a combination of software and hardware.

Still with reference to FIG. 2, the motor 200 includes a motor housing 210, and a stator 100 and a rotor 220 that are disposed in the motor housing 210. Disposing of the motor housing 210 can provide a guiding function for the coolant outside the motor 200 to flow into the motor 200, prevent a foreign matter from entering the motor 200, and minimize a possibility that an internal component of the motor 200 is damaged due to a mechanical collision between the motor 200 and another object in a process of carrying the motor 200, thereby implementing excellent protection performance. The stator 100 may be a stationary fastened part in the motor 200. The stator 100 can generate a rotating magnetic field after a current is supplied. The rotor 220 may be a rotating part in the motor 200 and can rotate under the action of the rotating magnetic field generated by the stator 100.

For example, the motor 200 is a permanent-magnet synchronous motor. When the rotor 220 is used in the permanent-magnet synchronous motor, the rotor 220 may generate a stationary magnetic field, and according to a repulsion and attraction principle between magnetic poles, may rotate under the action of the rotating magnetic field generated by the stator 100. When the motor 200 is an asynchronous induction motor, and the rotor 220 is used in the asynchronous induction motor, based on an electromagnetic induction phenomenon, the rotor 220 may obtain an electromagnetic torque to rotate under the action of the rotating magnetic field generated by the stator 100.

Figure 3:
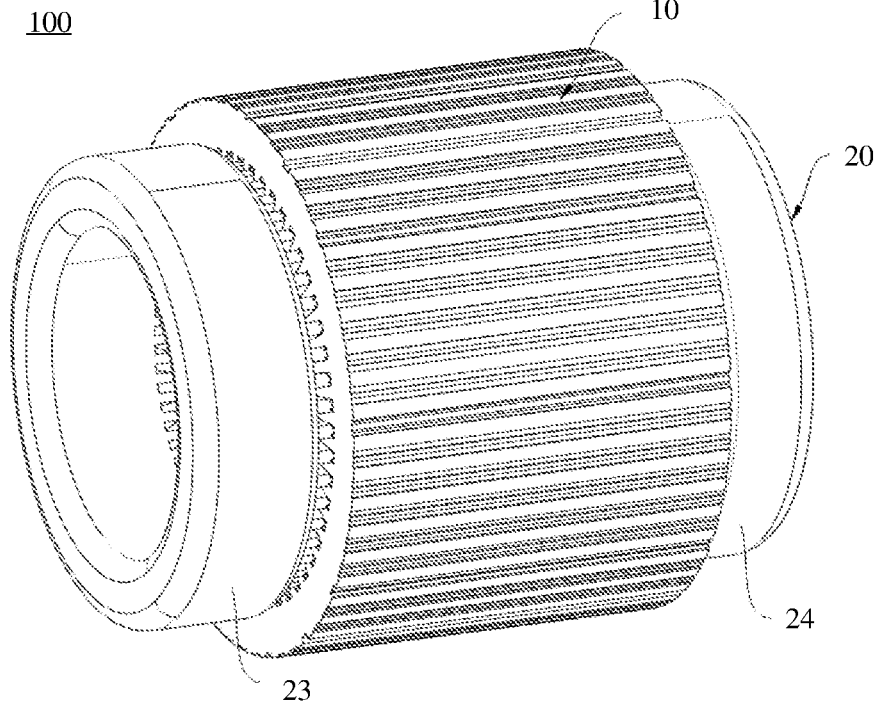
FIG. 3 is a schematic diagram of a structure of a stator according to an embodiment.
Figure 4:
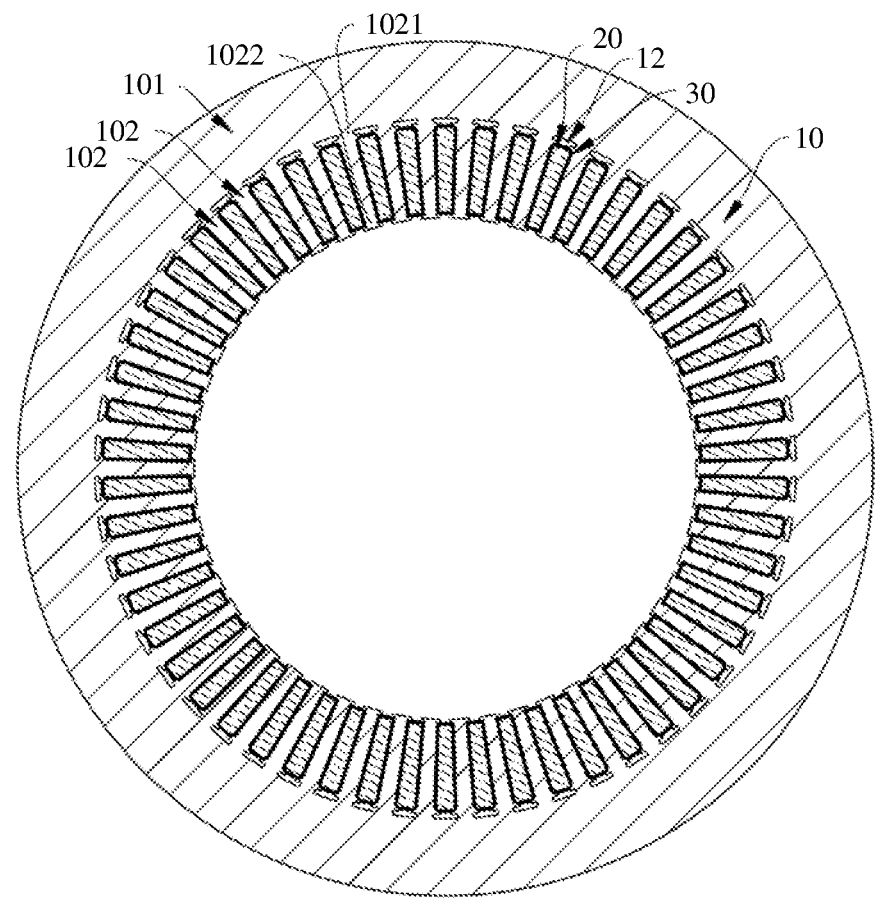
FIG. 4 is a schematic sectional view of a stator according to an embodiment.

With reference to FIG. 2, FIG. 3, and FIG. 4, the motor housing 210 is sleeved on a periphery of the stator 100 and surrounds the stator 100 in a circumferential direction of the stator 100. In an axial direction of the stator 100, a length of the motor housing 210 is greater than a length of the stator 100. In other words, two ends of the stator 100 are within the motor housing 210. The stator 100 is further sleeved on a periphery of the rotor 220 and surrounds the rotor 220 in a circumferential direction of the rotor 220. There is an air gap between the stator 100 and the rotor 220 in the circumferential direction of the rotor 220.

The stator 100 includes a stator core 10, a stator coil 20, and a seal kit 30. The stator core 10 is a part of a magnetic circuit of the motor 200, and may jointly form a complete magnetic circuit of the motor 200 together with a rotor core of the rotor 220 and the air gap between the stator core 10 and the rotor core of the rotor 220 (that is, the air gap between the stator 100 and the rotor 220). The stator coil 20 is mounted on and fastened to the stator core 10 and is a circuit part of the motor 200 and may generate a rotating magnetic field when an alternating current is supplied. The seal kit 30 can isolate the stator core 10 from the stator coil 20, to avoid a current leakage on the stator coil 20.

The following describes in detail only forms of the motor housing 210 and the stator 100. A form of the rotor 220 is not limited in this embodiment.

For ease of understanding, the following explains and describes terms related to the motor housing 210 and the stator 100 in the embodiments.

An axial direction may be understood as an axial direction of the stator core 10, that is, a direction of a central axis of the stator core 10; is equivalent to an extension direction of the stator core 10, that is, a direction in which a first side part 104 of the stator core 10 extends to a middle part 103 and then further extends to a second side part 105; is equivalent to an axial direction of the motor housing 210 sleeved on the periphery of the stator core 10; and is equivalent to an axial direction of the stator coil 20 passing through the stator core 10.

A circumferential direction may be understood as a circumferential direction surrounding the axial direction.

A radial direction may be understood as a direction perpendicular to the axial direction.

A sleeve shape indicates a shape of a component sleeved on an outer surface of a long strip-shaped object, to provide a protection, strengthening, fastening, or connection function. A sleeve-shaped element includes a tubbish (or tubular) housing. There is a hollow space inside the housing. Openings are disposed on two end faces of the tubbish (or tubular)

housing. A long strip-shaped object may enter or pass through the sleeve-shaped element through the two openings. The sleeve-shaped element includes the two end faces and an outer surface (also be referred to as an outer circumferential surface) and an inner surface that are connected between the two end faces. The inner surface encircles the hollow space of the sleeve-shaped element. The outer surface can present an appearance structure of the sleeve-shaped element. An axial direction of the sleeve-shaped element is a direction extending from one end face to the other end face of the sleeve-shaped element. A circumferential direction of the sleeve-shaped element is a direction surrounding the outer surface. A radial direction is a direction perpendicularly extending from the inner surface to the outer surface and may be understood as being perpendicular to the axial direction of the sleeve-shaped element.

With reference to FIG. 2, FIG. 3, and FIG. 4, in this embodiment, in the radial direction, the motor housing 210, the stator core 10, the seal kit 30, and the stator coil 20 are sequentially disposed. In the axial direction, two ends of the stator coil 20 extend out of the stator core 10 but are still within the motor housing 210. The motor housing 210 may be sleeved on the periphery of the stator core 10. The stator coil 20 passes through the stator core 10, and the two ends both extend out of the stator core 10. The seal kit 30 is located between the stator core 10 and the stator coil 20, to isolate the stator core 10 from the stator coil 20.

It may be understood that, to fully adapt to a trend of increasing power density of the power assembly 1000 and a development trend of miniaturization, a maximum rotational speed and current density of the motor 200 need to be increased. However, an increase in the maximum rotational speed easily causes an increase in a loss of the stator core 10, and an increase in the current density easily causes an increase in a loss of the stator coil 20. Therefore, when the motor 200 is run at the maximum rotational speed in a peak working condition, the stator coil 20 and the stator core 10 are prone to an overtemperature risk. On this basis, a corresponding heat dissipation may be required for the stator core 10 and the stator coil 20, to ensure high reliability and stability of the stator 100 in a normal working process.

Therefore, based on the structure of the stator 100 provided in this embodiment, the processing costs can be reduced when heat dissipation reliability of the stator 100 is ensured, and a possibility that a high speed of the motor 200 is apparently restricted due to insufficient cooling for the stator 100 at a high rotational speed can be minimized. Details are further described below.

Figure 5:
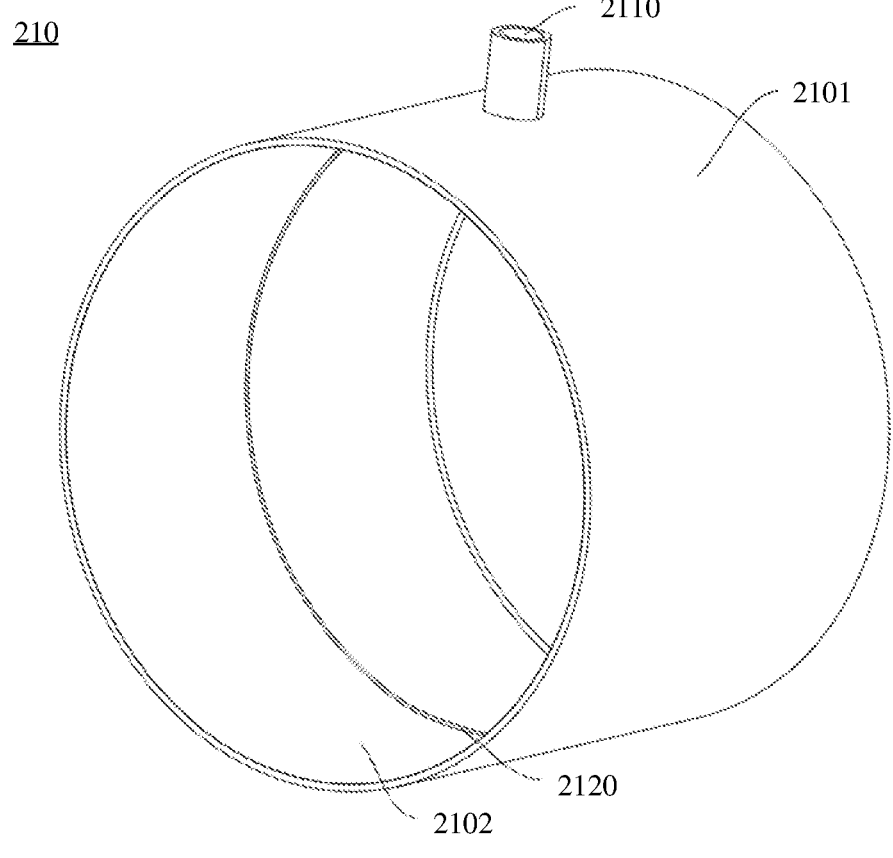
FIG. 5 is a schematic diagram of a structure of a motor housing of a motor according to an embodiment.

With reference to FIG. 5, the motor housing 210 is in a sleeve shape, an outer surface 2101 of the motor housing 210 is provided with a liquid inlet 2110 for flow-in of the coolant, an inner surface 2102 of the motor housing 210 caves in to form an annular liquid inlet passage 2120, and the liquid inlet passage 2120 communicates with the liquid inlet 2110. It may be understood that the outer surface 2101 of the motor housing 210 is provided with the liquid inlet 2110 to provide a guiding function for the coolant outside the motor housing 210. In this way, the coolant can flow into the liquid inlet passage 2120 of the motor housing 210 through the liquid inlet 2110 and prepare for subsequently entering a passage of the stator core 10. It can be ensured that the coolant can flow in the motor 200 without being splashed to the outside of the motor 200. Overall heat dissipation effect of the motor 200 is effectively ensured. The liquid inlet passage 2120 is annular. Therefore, when the coolant flows in the liquid inlet passage 2120, the coolant can be evenly distributed in the circumferential direction of the motor housing 210. In other words, the liquid inlet passage 2120 has a flow equalization function, and can evenly distribute, in the circumferential direction of the motor housing 210, the coolant flowing through the liquid inlet 2110, thereby implementing subsequent full contact between the coolant and the stator core 10.

It should be noted that the motor housing 210 has a thickness. However, to facilitate illustration of a structure of the liquid inlet 2110, the thickness of the motor housing 210 is reduced to some extent, so that the liquid inlet 2110 is disposed and presented as the structure protruding from the outer surface 2101 shown in FIG. 5. However, it should be understood that the liquid inlet 2110 is actually a hole-type structure that is disposed on the outer surface 2101 of the motor housing 210 and that communicates with the liquid inlet passage 2120.

For example, the liquid inlet passage 2120 may be at a middle location of an axial length of the motor housing 210. Therefore, a distance between the liquid inlet passage 2120 and an axial end of the stator core 10 is approximately equal to that between the liquid inlet passage 2120 and the other axial end of the stator core 10. When the coolant subsequently flows into the stator core 10, one part of the coolant flows out from one end of the stator core 10, and the other part of the coolant flows out from the other end of the stator core 10. In this setting, flow passing paths of the two parts of the coolant in the stator core 10 can be approximately equal, thereby minimizing heat transfer paths of the two parts of the coolant flowing out from the two ends and effectively avoiding a relatively large temperature difference between the two ends of the stator core 10. In this way, the overall processing costs and the material management costs of the motor 200 are greatly reduced, and heat dissipation efficiency of the motor 200 is improved.

It may be understood that heat dissipation of the motor 200 may be performed in an oil cooling manner. In comparison with a water cooling manner, the oil cooling manner has advantages such as high power density allowed for the motor 200, small link thermal resistance, low interfacial thermal resistance, no need for glue filling at an end part of a coil, and mass production of a high-speed oil seal. Therefore, oil cooling is increasingly widely used. In other words, the coolant may be cooling oil.

Figure 6:
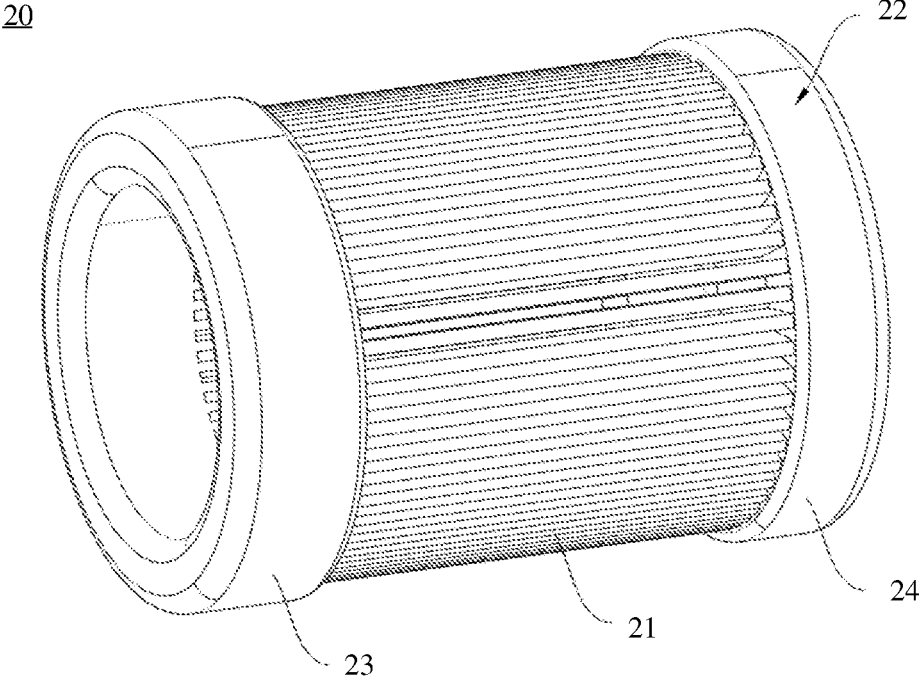
FIG. 6 is a schematic diagram of a structure of a stator coil of a stator according to an embodiment.

With reference to FIG. 6, the stator coil 20 includes a core part 21, and a first end winding 23 and a second end winding 24 that are respectively connected to two ends of the core part 21. The core part 21 extends in the axial direction and is a part that is in the stator coil 20 and that can pass through the stator core 10. The first end winding 23 and the second end winding 24 are two end parts of the stator coil 20 and are parts of the stator coil 20 that are located outside the stator core 10. The first end winding 23 may protrude relative to one end of the stator core 10 and the second end winding 24 may protrude relative to the other end of the stator core 10.

Figure 7:
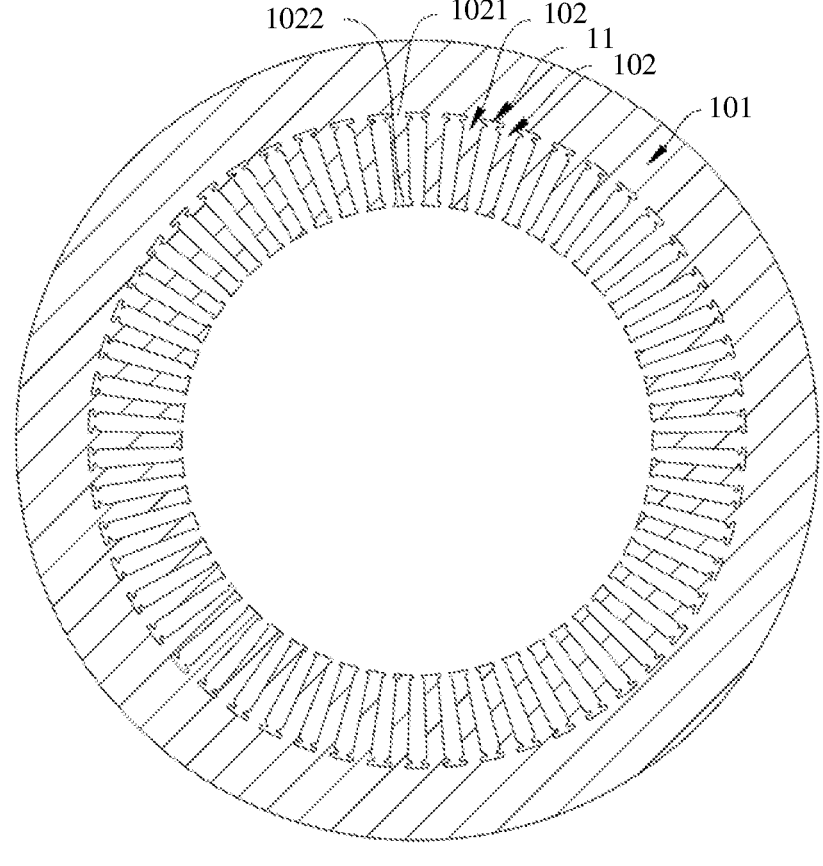
FIG. 7 is another schematic sectional view of a stator according to an embodiment.
Figure 8:
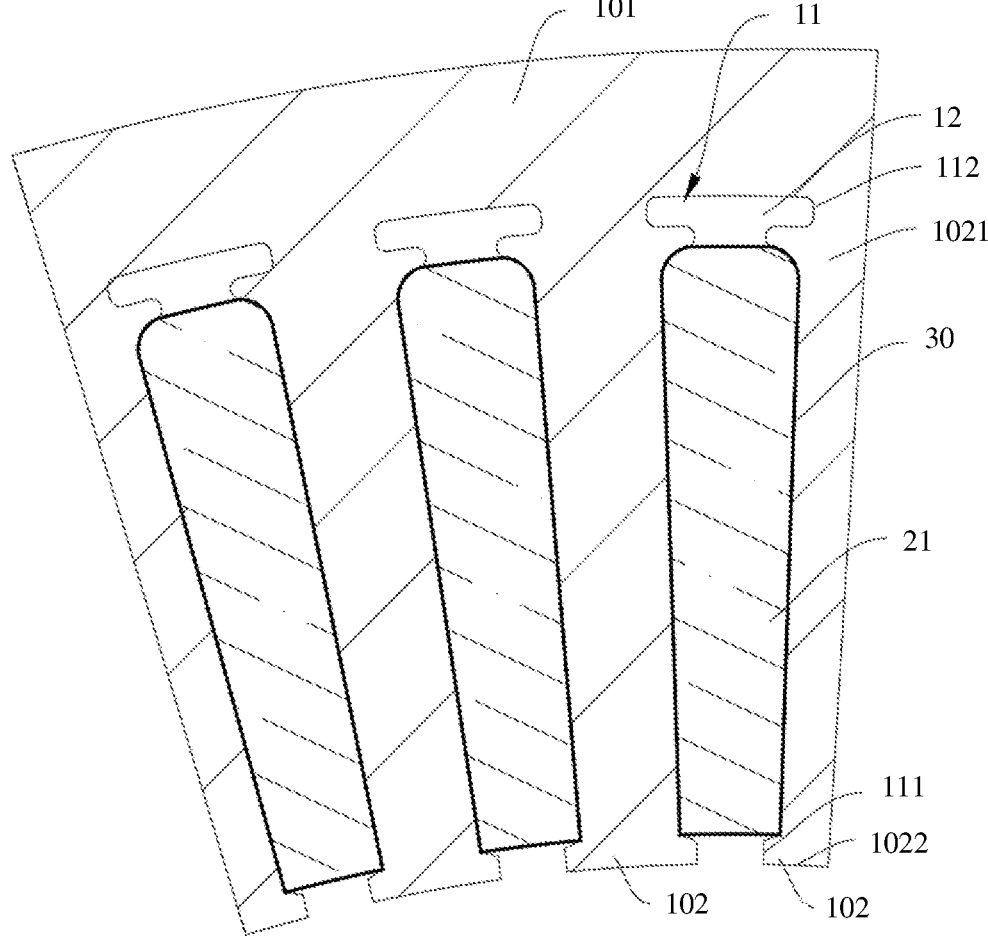
FIG. 8 is a schematic diagram of a structure of a flow passing slot according to an embodiment.

With reference to FIG. 4, FIG. 7, and FIG. 8, the stator core 10 includes a yoke part 101 and a plurality of tooth parts 102. A tooth root 1021 of each of the tooth parts 102 is connected to the yoke part 101, and a tooth top 1022 of each of the tooth parts 102 is away from the yoke part 101.

The yoke part 101 may be annular and may extend in the axial direction. An outer surface of the yoke part 101 is a surface facing the motor housing 210, that is, an outer surface of the stator core 10. The outer surface of the yoke part 101 may be attached to the inner surface 2102 of the motor housing 210. An inner surface of the yoke part 101 is a surface opposite to the motor housing 210, that is, a surface connected to the plurality of tooth parts 102. The plurality of tooth parts 102 may be spaced and arranged at the inner surface of the yoke part 101 in the circumferential direction. Each of the tooth parts 102 extends in the axial direction. An opening slot 11 is formed between two adjacent tooth parts 102.

It may be understood that one opening slot 11 is formed between any two adjacent tooth parts 102. In other words, a plurality of opening slots 11 can be formed between the plurality of tooth parts 102. Because the plurality of opening slots 11 may have same structures, the following describes detailed architecture by using a form of one opening slot 11 as an example.

With reference to FIG. 8, the opening slot 11 includes a coil slot 111 and a flow passing slot 112 that communicate with each other. In the radial direction, the coil slot 111 extends from the tooth top 1022 to the tooth root 1021, and the flow passing slot 112 extends from the tooth root 1021 to the yoke part 101. The coil slot 111 is configured to accommodate the stator coil 20. In this way, the opening slot 11 extending from the tooth part 102 to the yoke part 101 in the radial direction can be formed. The seal kit 30 is connected to an inner wall of the opening slot 11. The seal kit 30 and the inner wall of the flow passing slot 112 jointly form a flow passing passage 12 for the coolant to flow through.

It should be understood that the inner wall of the opening slot 11 includes an inner wall of the coil slot 111 and an inner wall of the flow passing slot 112. In other words, the inner wall of the opening slot 11 is jointly formed by the inner wall of the coil slot 111 and the inner wall of the flow passing slot 112. For example, the seal kit 30 is connected to a joint between the inner wall of the flow passing slot 112 and the inner wall of the coil slot 111. In other words, the seal kit 30 exactly seals one end that is of the flow passing slot 112 and that communicates with the coil slot 111 in the radial direction. However, it should be understood that a connection location of the seal kit 30 is not limited thereto. The seal kit 30 may be alternatively connected to the inner wall of the flow passing slot 112 or may be connected to the inner wall of the coil slot 111. This is not limited in this embodiment.

In this way, the opening slot 11 extending from the tooth part 102 to the yoke part 101 is formed between two adjacent tooth parts 102, and the opening slot 11 is divided into two functional spaces of the flow passing slot 112 and the coil slot 111, so that the coil slot 111 can accommodate the stator coil 20 and the coolant can flow through the flow passing slot 112. The flow passing slot 112 and the coil slot 111 are independent of each other and do not interfere with each other. In other words, the opening slot 11 can have two independent functional spaces for accommodating the stator coil 20 and the coolant. In comparison with an existing solution in which the coolant needs to flow in the coil slot 111, this setting can minimize a possibility of increasing flow resistance of the coolant due to the narrow slot, challenging fluidity of the coolant, and causing difficulty in normal heat dissipation of the stator coil 20. This helps ensure that the coolant has a sufficient flow space, reduce imbalance generated when the coolant flows, and improve heat dissipation performance of the stator core 10. In addition, because there is no need to guide a flow in the coil slot 111, a form of a part that is of the stator coil 20 and that passes through the coil slot 111 may be manufactured by using a relatively simple process. In this way, the overall processing costs and the material management costs can be greatly reduced when heat dissipation reliability of the stator 100 is ensured. This helps improve production efficiency.

In addition, the inner wall of the flow passing slot 112 and the seal kit 30 can cooperatively form the flow passing passage 12 for the coolant to flow through. Therefore, when the coolant flows in the flow passing passage 12, heat can be fully dissipated for the stator core 10 due to direct contact between the coolant and the stator core 10, and further, the coolant can be close to the stator coil 20 to a maximum extent when sealing reliability of the flow passing passage 12 is ensured, to ensure that heat is well dissipated in a region that requires heat dissipation in the stator coil 20. In this way, the stator coil 20 can be fully cooled, and heat dissipation performance of the stator coil 20 can be ensured, thereby implementing high reliability.

The flow passing passage 12 is entirely located at the yoke part 101 and is close to the tooth root 1021 of the tooth part 102. In comparison with an existing solution in which a passage for the coolant to flow through is disposed between two adjacent coil slots 111 (that is, a passage is disposed at a tooth part 102 on which no coil slot 111 is disposed), the structure setting can minimize an impact on electromagnetic performance of the motor 200, so that the motor 200 can be run normally in various working conditions. This facilitates a high-speed development trend of the motor 200.

With reference to FIG. 6, FIG. 7, and FIG. 8, in this embodiment, the seal kit 30 may further be insulating. It may be understood that, because the core part 21 of the stator coil 20 extends in the axial direction, and the coil slot 111 also extends in the axial direction, the coil slot 111 may be provided for the core part 21 of the stator coil 20 to pass through. However, when the stator 100 works normally, the stator coil 20 is powered on for use. Therefore, a current flows through the core part 21 passing through the coil slot 111 in a working state.

In this case, to avoid a current leakage of the core part 21, the insulating seal kit 30 is disposed between the core part 21 and the coil slot 111, so that the stator coil 20 and the stator core 10 can be insulated from each other. The seal kit 30 may be connected to the inner wall of the opening slot 11 and the seal kit 30 may further wrap the inner wall of the coil slot 111, so that the inner wall of the coil slot 111 is fully covered by the seal kit 30. In other words, the seal kit 30 is closely attached to the inner wall of the coil slot 111 and is not easy to fall off and is convenient for production and management. Insulation can be well implemented between the stator coil 20 and the stator core 10 when the core part 21 passes through the coil slot 111. In addition, a short circuit caused because the core part 21 is worn due to a corner or a sharp protruding part of the stator core 10 can be effectively avoided. Therefore, a good buffering function can be implemented.

It may be understood that the seal kit 30 further needs to cooperate with the inner wall of the flow passing slot 112 to form the flow passing passage 12. Therefore, to ensure that integrity of the seal kit 30 is not damaged, the seal kit 30 does not need to be punctured for flow guiding as in the existing solution. Process complexity is low. A material, the processing costs, the production costs, and the management costs caused by extra operations for the seal kit 30 can be effectively reduced. In addition, flow passing does not need to be implemented in the coil slot 111. In this way, an increase in process difficulty and the costs caused by ensuring sealing performance in the coil slot 111 and insulation performance of the coolant can be effectively reduced. Therefore, practicability is high, and an application scope is wide.

For example, because flow passing does not need to be implemented in the coil slot 111, the seal kit 30 does not need to be punctured. An existing solution uses a flat wire process to maintain a copper wire form of the stator coil 20. In comparison, the stator coil 20 provided in this embodiment may be made through a relatively simple process: a round wire process. However, it should be understood that setting of the seal kit 30 in this embodiment can also adapt to the flat wire process and is not limited thereto.

Therefore, the seal kit 30 can cooperate with the inner wall of the flow passing slot 112 to form the flow passing passage 12, and the seal kit 30 can further well implement insulation between the stator coil 20 and the stator core 10. In other words, the seal kit 30 can have both a sealing function and an insulation function. Use performance of the seal kit 30 is diversified, and high flexibility is implemented. However, in this setting, because the seal kit 30 is in direct contact with the stator coil 20, when the coolant flows in the flow passing passage 12, heat of the stator coil 20 can be transferred to the coolant through the seal kit 30. A heat dissipation path of the stator coil 20 is short, and link thermal resistance is small, which facilitates heat dissipation of the stator coil 20 in a working condition with a large torque. In addition, because the coolant is further in direct contact with the stator core 10, the coolant can cool both the stator core 10 and the stator coil 20, thereby significantly improving heat dissipation capabilities of the stator core 10 and the stator coil 20.

For example, as shown in FIG. 8, a cross sectional shape of the coil slot 111 in the radial direction is a club shape. The seal kit 30 may be insulation paper. The insulation paper may also be in the club shape to wrap the inner wall of the coil slot 111 and form a space for the core part 21 to pass through. The core part 21 passes through the space, to form a layout setting in which the coil slot 111, the insulation paper, and the core part 21 are sequentially arranged in the radial direction. In this way, the insulation paper can be located between the coil slot 111 and the core part 21, so that a space in the coil slot 111 can be filled by the core part 21 as much as possible in addition to the insulation paper, thereby effectively improving a slot fill factor of the coil slot 111 and power density of the motor 200.

In this embodiment, a slot depth of the flow passing slot 112 is a width of the flow passing slot 112 in the radial direction, and the slot depth of the flow passing slot 112 may be within a range from the tooth root 1021 of the tooth part 102 to the outer surface of the yoke part 101. However, it should be understood that, in an actual processing process, problems such as structural strength, the processing costs, magnetic strength, and process complexity of the stator core 10 need to be fully considered for the slot depth of the flow passing slot 112. The slot depth of the flow passing slot 112 may vary according to an actual situation based on the foregoing problems. This is not limited in this embodiment.

Figure 9:
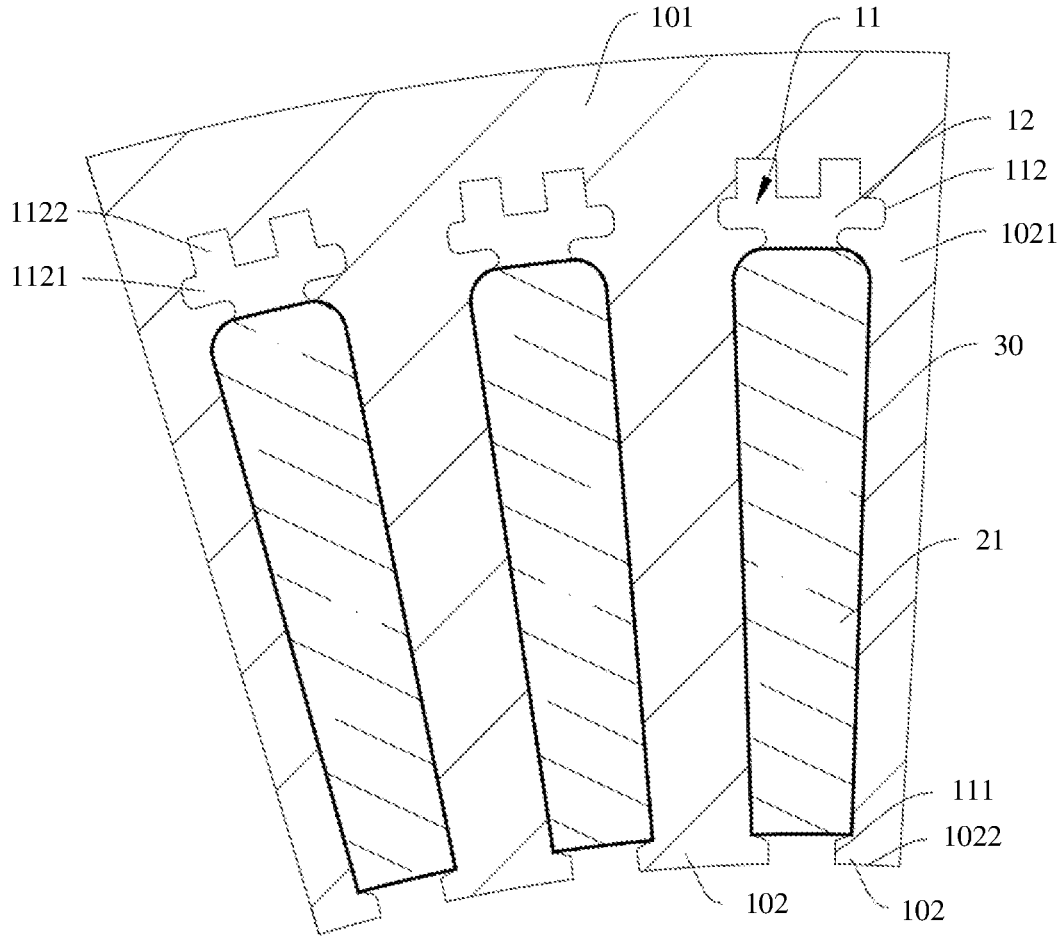
FIG. 9 is another schematic diagram of a structure of a flow passing slot according to an embodiment.
Figure 10:
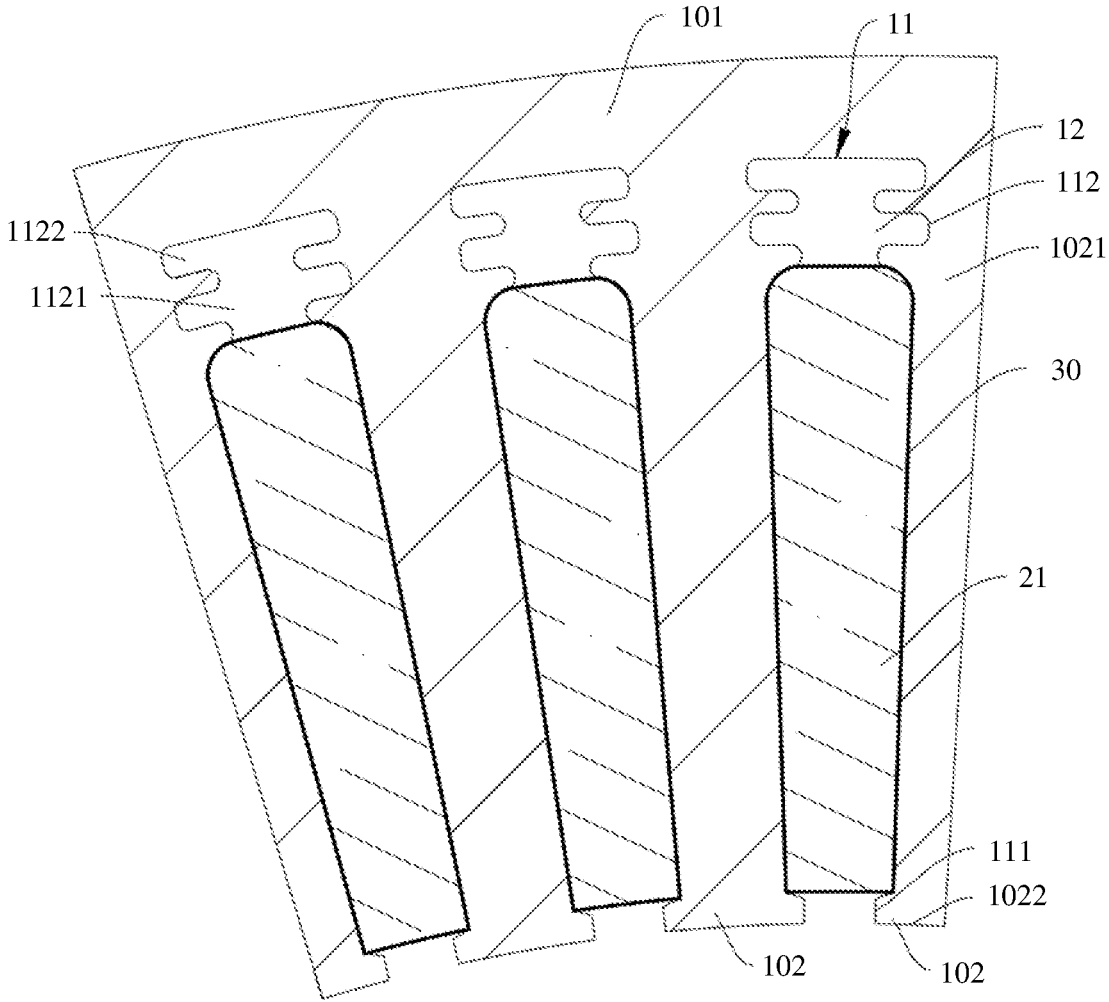
FIG. 10 is still another schematic diagram of a structure of a flow passing slot according to an embodiment.
Figure 11:
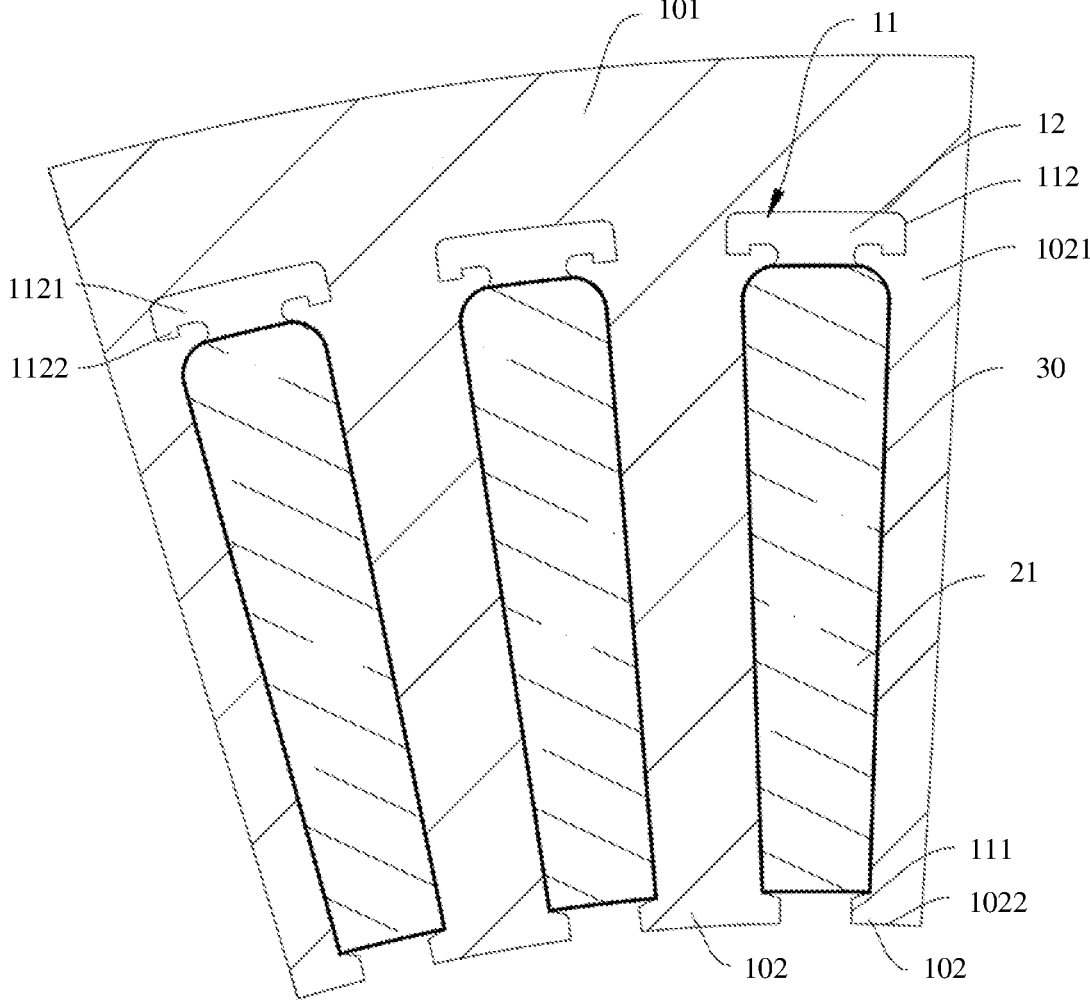
FIG. 11 is yet another schematic diagram of a structure of a flow passing slot according to an embodiment.

With reference to FIG. 9, FIG. 10, and FIG. 11, in a possible implementation, the flow passing slot 112 includes a body part 1121 and at least one branch part 1122, the body part 1121 communicates with the coil slot 111, and the at least one branch part 1122 is spaced on a peripheral side of the body part 1121 and communicates with the body part 1121.

Therefore, the branch part 1122 is added, so that the coolant can flow not only in the body part 1121 but also in the branch part 1122. The addition of the branch part 1122 is equivalent to an increase of a slot wall area of the flow passing slot 112, that is, equivalent to an increase of a contact area between the coolant and the stator core 10, thereby further enhancing heat dissipation performance and cooling performance of the stator 100.

For example, as shown in FIG. 9, a cross sectional shape of the flow passing slot 112 in the radial direction may be an antler shape. Alternatively, as shown in FIG. 10, a cross sectional shape of the flow passing slot 112 in the radial direction may be a goat horn shape. Alternatively, a cross sectional shape of the flow passing slot 112 in the radial direction may be a shape shown in FIG. 11.

It should be noted that the cross sectional shape of the flow passing slot 112 in the radial direction is not limited to the foregoing described shapes and may further be presented in another shape. This is not strictly limited in this embodiment.

Figure 12:
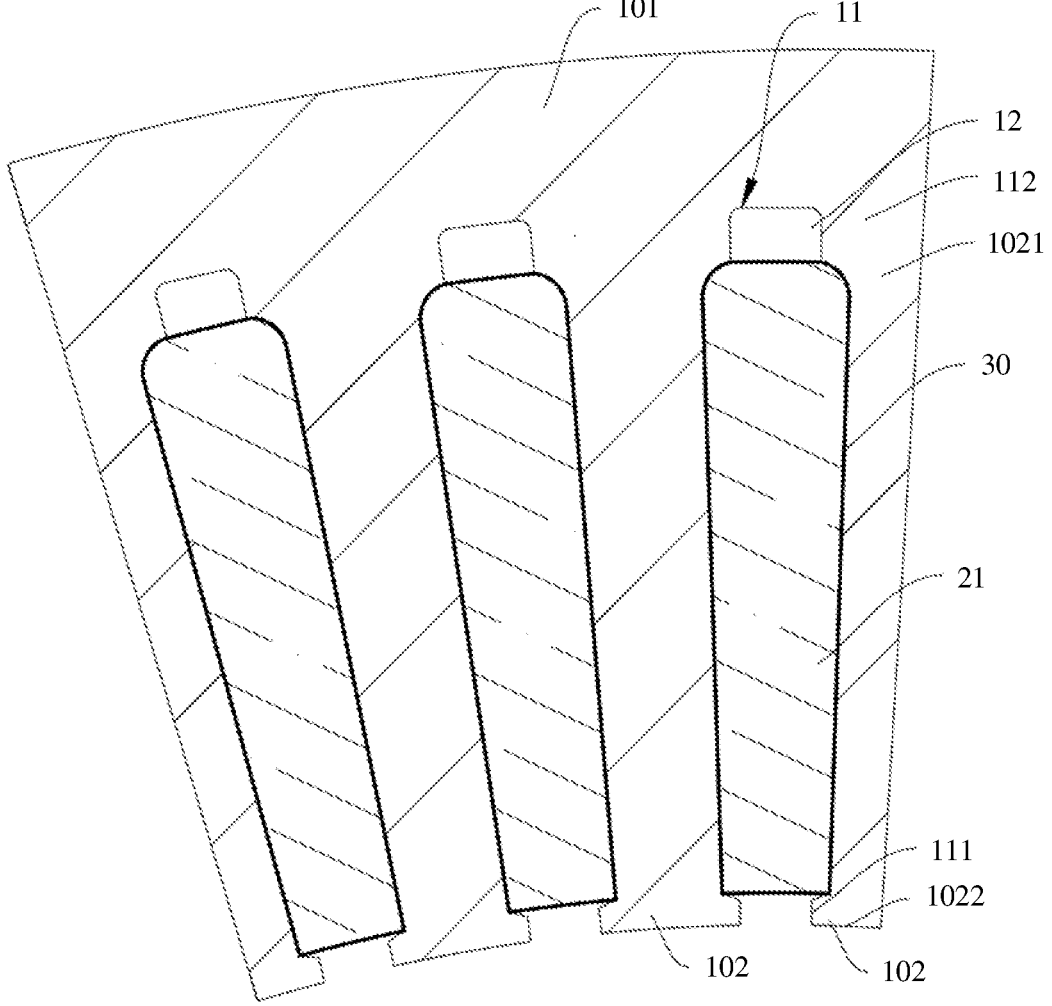
FIG. 12 is a fifth schematic diagram of a structure of a flow passing slot according to an embodiment.

With reference to FIG. 8 and FIG. 12, in another possible implementation, the flow passing slot 112 includes only a body part (not shown in the figure). For example, as shown in FIG. 8, a cross sectional shape of the body part in the radial direction may be a T shape. Alternatively, the body part may be presented in a form shown in FIG. 12.

For example, the flow passing slot 112 may be a symmetrical structure. Therefore, regardless of whether the flow passing slot 112 includes only the body part 1121 or includes both the body part 1121 and the branch part 1122, processing of the flow passing slot 112 is simpler, and the material costs and the production management costs are reduced. The flow passing slot 112 is disposed, to further increase an effective contact area between the coolant and the stator core 10, increase an effective heat dissipation area of the passage in comparison with an existing structure, and reduce flow resistance and a frictional pressure loss of the passage, thereby greatly improving cooling efficiency. In addition, a requirement for structural stiffness of the stator core 10 is also met, and energy consumption is reduced. Further, reliable support is provided for promotion and application of heat dissipation technologies of the motor 200.

It should be noted that structural requirements such as a shape and a size of the flow passing slot 112 may vary according to an actual situation, provided that the flow passing slot 112 can cooperate with the seal kit 30 to form a sufficient space, within a processable range, for the coolant to flow through at relatively small flow resistance. This is not limited in this embodiment.

With reference to FIG. 3, FIG. 6, and FIG. 8, in this embodiment, outlets of the flow passing passage 12 face the end winding 22 (that is, through openings of the flow passing slot 112 that are located at two ends of the stator core 10 face the end winding 22). Because the end winding 22 may include the first end winding 23 and the second end winding 24, there may be two outlets of the flow passing passage 12. One outlet of the flow passing passage 12 is disposed at one end of the stator core 10, and the other outlet of the flow passing passage 12 is disposed at the other end of the stator core 10.

In this way, when the coolant flows in the flow passing passage 12, heat can be dissipated from the core part 21 of the stator coil 20. When the coolant flows out from the flow passing passage 12, one part of the coolant can flow out from the end of the stator core 10 to dissipate heat from the first end winding 23, and the other part of the coolant can flow out from the other end of the stator core 10 to dissipate heat from the second end winding 24, thereby achieving an objective of balanced heat dissipation of the two ends of the stator coil 20 in the motor 200 and improving heat dissipation of the motor 200. In other words, the coolant can not only cool the core part 21, but also cool the end winding 22. The coolant can cool both the core part 21 and the end winding 22, so that thermal resistance of the entire stator coil 20 is reduced. In this way, heat dissipation is even, and reliability is high. This helps improve a heat dissipation capability of the motor 200 and reduce a temperature rise of the motor 200.

Based on the foregoing description, it should be understood that, in this embodiment, the flow passing passage 12 is disposed, so that heat dissipation for the stator coil 20 can be ensured when the motor 200 is run at a low speed and a large torque. In addition, when the motor 200 is run at a high rotational speed, heat dissipation for the stator core 10 is ensured, and heat dissipation requirements of the stator core 10 and the stator coil 20 in various working conditions are met.

It should be noted that, high-speed or low-speed running of the motor 200 herein is relative. In actual application, a critical rotational speed may be specified based on a heat emission status during running of the motor 200, to define the high-speed running and the low-speed running of the motor 200. For example, it may be considered that a rotational speed greater than or equal to 10000 r/min is a high rotational speed.

It may be understood that, to avoid an overtemperature risk for the stator coil 20 due to an increase of current density, when it is required that the flow resistance of the coolant is not increased or a complex process solution with the high costs such as liquid immersion in the coil slot 111 is not used, liquid passing through an interface between the yoke part 101 of the stator core 10 and the tooth root 1021 of the tooth part 102 may be a thermal solution. To implement a coolant flowing path from the liquid inlet passage 2120 of the motor housing 210 to the flow passing passage 12, another passage may be additionally disposed in the stator core 10, and the additionally disposed passage, the liquid inlet passage 2120, and the flow passing passage 12 jointly form a cooling passage of the motor 200. Therefore, heat dissipation requirements of the stator coil 20 and the stator core 10 can be both considered for the stator 100 provided in this embodiment. In other words, heat dissipation and cooling can be performed on both the stator coil 20 and the stator core 10. For example, a passage that can connect the liquid inlet passage 2120 and the flow passing passage 12 and/or a passage that can be used to further improve the heat dissipation capability of the stator core 10 may be additionally disposed.

The following describes the detailed architecture by using four embodiments.

First Embodiment

With reference to FIG. 4, FIG. 5, FIG. 13, and FIG. 14, in the first embodiment, the yoke part 101 is further provided with a flow guiding passage 13 extending in the radial direction. The flow guiding passage 13 is the foregoing described passage that can connect the liquid inlet passage 2120 and the flow passing passage 12. An inlet of the flow guiding passage 13 is disposed on the outer surface of the yoke part 101 and is configured to guide the coolant in the liquid inlet passage 2120 of a peripheral mechanical part of the stator core 10 to the stator core 10, and an outlet of the flow guiding passage 13 at least partially communicates with an inlet of the flow passing passage 12.

It may be understood that, the peripheral mechanical part of the stator core 10 is entirely located on a periphery of the stator core 10 and is disposed close to the stator core 10 and can have a direct or an indirect connection relationship with the stator core 10. In this case, the peripheral mechanical part of the stator core 10 is provided with the liquid inlet passage 2120, and the flow guiding passage 13 is connected between the liquid inlet passage 2120 and the flow passing passage 12, so that the coolant can be guided to the flow guiding passage 13 of the stator core 10 based on a flow guiding function of the liquid inlet passage 2120, and the coolant can be guided to the flow passing passage 12 based on a flow guiding function of the flow guiding passage 13. In this way, the coolant flows in the flow passing passage 12, and heat dissipation of the stator core 10 and the stator coil 20 is also considered, thereby implementing high heat dissipation efficiency.

For example, the peripheral mechanical part of the stator core 10 may be a motor housing 210. However, it should be understood that the peripheral mechanical part is not limited thereto.

In addition, different from the flow passing passage 12 extending in the axial direction, the flow guiding passage 13 extends in the radial direction. In this way, the coolant can be guided at a shortest distance to the flow passing passage 12. In this setting, a heat transfer path of the coolant is short, and flow resistance is small, thereby avoiding a relatively large local temperature difference in the stator core 10 to a greatest extent.

Figure 15:
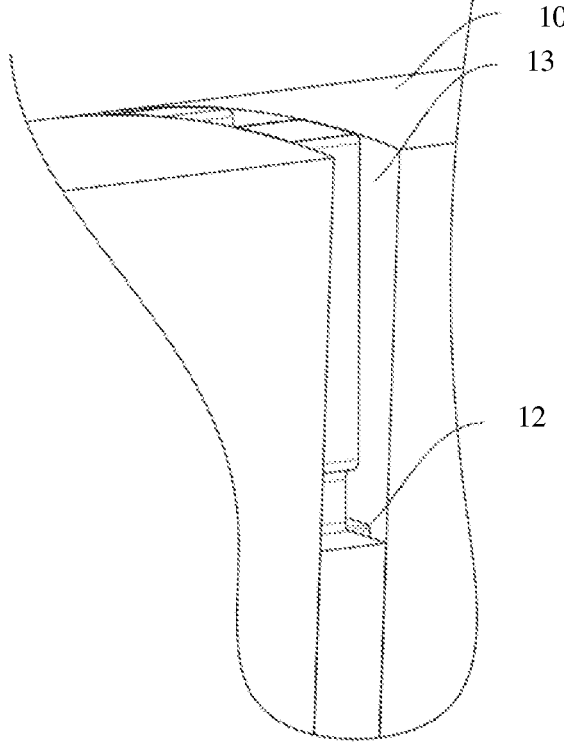
FIG. 15 is another schematic diagram of a partial structure of the stator core shown in FIG. 13.

With reference to FIG. 15, in a possible implementation, the outlet of the flow guiding passage 13 partially communicates with the inlet of the flow passing passage 12. In this way, due to fluidity, the coolant flowing into the flow guiding passage 13 can smoothly flow into the flow passing passage 12. Because the outlet of the flow guiding passage 13 does not need to completely communicates with the inlet of the flow passing passage 12, a processing and manufacturing process of the stator core 10 is simpler.

In another possible implementation, the outlet of the flow guiding passage 13 completely communicates with the inlet of the flow passing passage 12.

Based on the foregoing description, it should be understood that, a flow quantity and a flow velocity of the coolant may be controlled through changing a degree of the communication between the outlet of the flow guiding passage 13 and the inlet of the flow passing passage 12, thereby ensuring flow reliability and evenness of the coolant in the flow passing passage 12.

Figure 13:
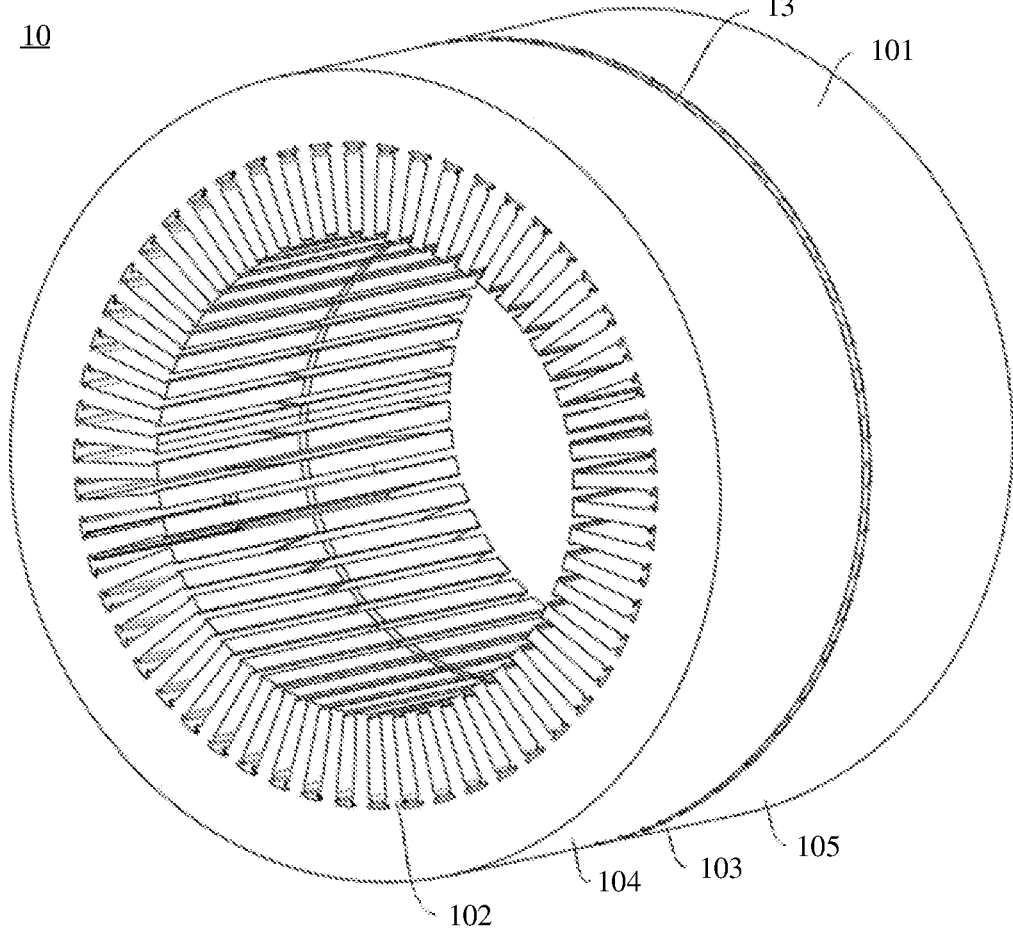
FIG. 13 is a schematic diagram of a structure of a stator core according to a first embodiment.
Figure 14:
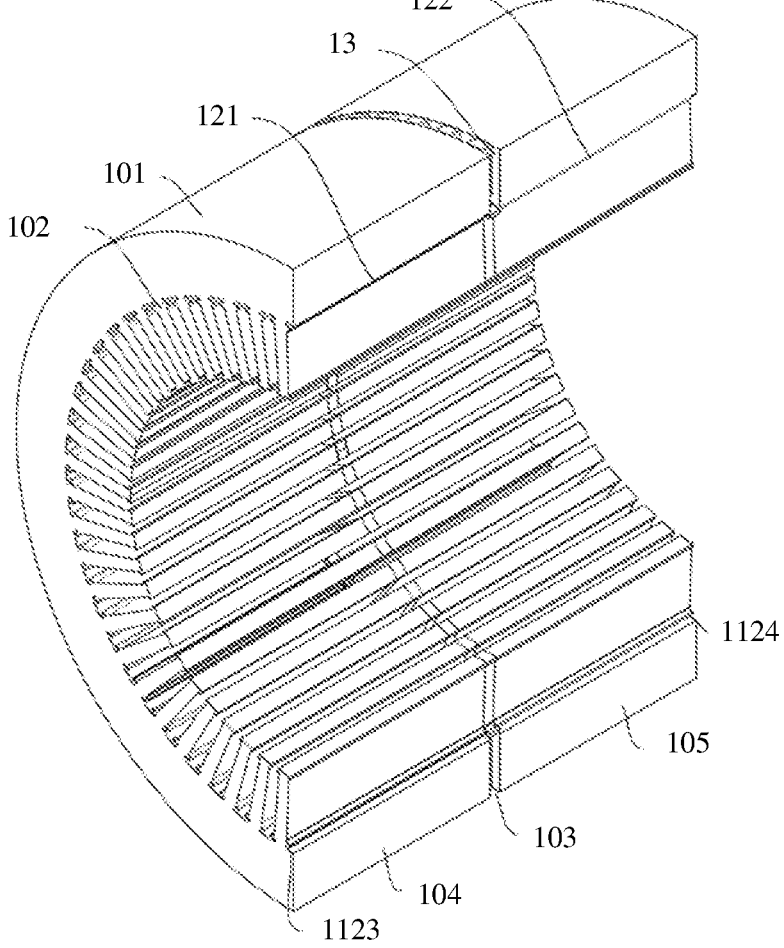
FIG. 14 is a schematic diagram of a partial structure of the stator core shown in FIG. 13.

With reference to FIG. 13 and FIG. 14, in this embodiment, the stator core 10 includes a middle part 103, and a first side part 104 and a second side part 105 that are respectively connected to two ends of the middle part 103. The yoke part 101 and the tooth part 102 both sequentially extend from the first side part 104 to the middle part 103 and then to the second side part 105. In other words, the yoke part 101 may actually be jointly formed by a yoke part located at the first side part 104, a yoke part located at the middle part 103, and a yoke part located at the second side part 105. The tooth part 102 may also be jointly formed by a tooth part located at the first side part 104, a tooth part located at the middle part 103, and a tooth part located at the second side part 105.

It may be understood that, the stator core 10 is divided into three parts: the first side part 104, the middle part 103, and the second side part 105, to facilitate description of a forming principle of the stator core 10 in this embodiment. Details are described below.

In this embodiment, the flow guiding passage 13 is located at the middle part 103. In other words, the flow guiding passage 13 is at a middle location of an axial length of the stator core 10. In this way, after the coolant enters the liquid inlet passage 2120, the coolant may flow in from the location of the middle part 103 in the stator core 10. In this setting, when the motor 200 is run in a high-speed rated working condition, heat exchange and cooling can be quickly performed at the location of the middle part 103 in the stator core 10 prone to a highest temperature, to minimize a possibility that the stator core 10 fails due to overheating, so that the stator core 10 is not damaged due to local overtemperature. Therefore, high reliability is implemented.

In this embodiment, the flow passing passage 12 includes a first flow passing passage 121 and a second flow passing passage 122. The first flow passing passage 121 and the second flow passing passage 122 are respectively located at the first side part 104 and the second side part 105. The first flow passing passage 121 and the second flow passing passage 122 are symmetrically disposed. The first flow passing passage 121 and the second flow passing passage 122 each communicate with the flow guiding passage 13 and an outer space of the stator 100.

An outlet of the first flow passing passage 121 may be disposed on an end face of the first side part 104, and the coolant flowing out through the outlet of the first flow passing passage 121 can be sprayed to the first end winding 23. An outlet of the second flow passing passage 122 is disposed on an end face of the second side part 105, and the coolant flowing out through the outlet of the second flow passing passage 122 can be sprayed to the second end winding 24.

In this way, a structure of the flow passing passage 12 can fully adapt to a manner in which the coolant flows in from the middle part 103, so that the coolant can flow to two ends of the stator core 10 in the axial direction based on a flow splitting function of the flow guiding passage 13 when the coolant enters the flow guiding passage 13 from the middle part 103 of the stator core 10. Therefore, the coolant can quickly dissipate heat at the two ends of the stator core 10, and temperatures at the two ends of the stator core 10 can be relatively even without an excessively large difference. In other words, it can be ensured that the temperatures of the first side part 104 and the second side part 105 are even.

Still with reference to FIG. 13 and FIG. 14, there may be a plurality of flow guiding passages 13. The plurality of flow guiding passages 13 may be spaced in the circumferential direction. In other words, the plurality of flow guiding passages 13 may be spaced at the middle part 103 in the circumferential direction.

For example, the plurality of flow guiding passages 13 may be evenly spaced in the circumferential direction. In other words, the plurality of flow guiding passages 13 may be evenly distributed in the circumferential direction. In the setting of even distribution of the plurality of flow guiding passages 13 in the circumferential direction, an overall temperature of the stator core 10 can be relatively even; and under fully adaption to the fluidity of the coolant, the imbalance generated when the coolant flows can be reduced, thereby further reducing a possibility of increasing the flow resistance of the coolant, challenging the fluidity of the coolant, and causing difficulty in normal working of the stator 100 due to generation of the imbalance. In this way, use performance of the stator 100 is effectively ensured.

In this embodiment, there may be a plurality of flow passing passages 12, and the plurality of flow passing passages 12 may be spaced in the circumferential direction, to present a layout in which the plurality of flow passing passages 12 may be spaced in the circumferential direction of the stator core 10. In other words, there may be a plurality of first flow passing passages 121, and the plurality of first flow passing passages 121 may be spaced at the first side part 104 in the circumferential direction. There may be also a plurality of second flow passing passages 122, and the plurality of second flow passing passages 122 may be spaced at the second side part 105 in the circumferential direction.

For example, the plurality of flow passing passages 12 may be evenly spaced in the circumferential direction. In other words, the plurality of flow passing passages 12 may be evenly distributed in the circumferential direction. In the setting of even distribution of the plurality of flow passing passages 12 in the circumferential direction, an overall temperature of the stator core 10 can be relatively even; and under fully adaption to the fluidity of the coolant, the imbalance generated when the coolant flows can be reduced, thereby further reducing a possibility of increasing the flow resistance of the coolant, challenging the fluidity of the coolant, and causing difficulty in normal working of the stator 100 due to generation of the imbalance. In this way, use performance of the stator 100 is effectively ensured.

Figure 16:
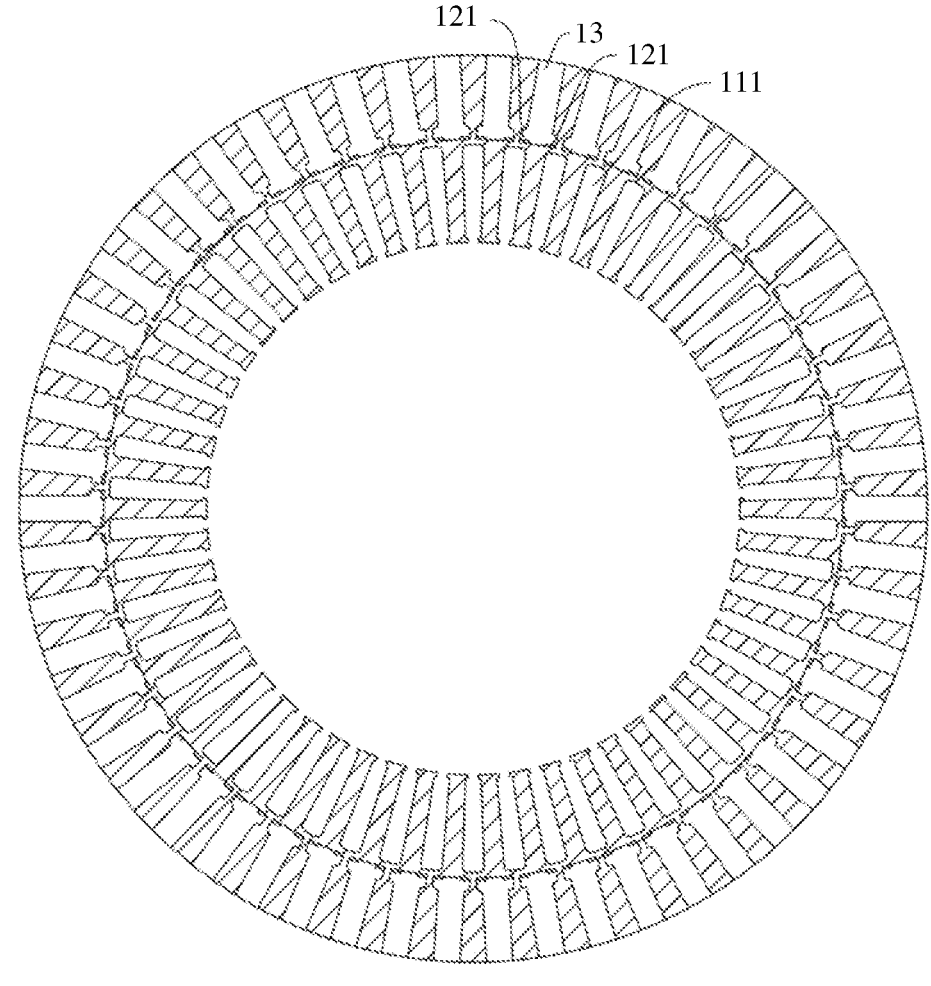
FIG. 16 is a schematic sectional view of a stator core according to a first embodiment.

With reference to FIG. 14 and FIG. 16, in a possible implementation, an inlet of each first flow passing passages 121 communicates with outlets of two adjacent flow guiding passages 13, and an inlet of each second flow passing passage 122 communicates with outlets of two adjacent flow guiding passages 13.

Therefore, a correspondence between the plurality of flow guiding passages 13 and the plurality of flow passing passages 12 is that one flow guiding passage 13 corresponds to two adjacent flow passing passages 12. When the coolant enters one of the flow guiding passages 13, one part of the coolant enters one of two adjacent flow passing passages 12 corresponding to the flow guiding passage 13, and the other part of the coolant enters the other one of the two adjacent flow passing passages 12 corresponding to the flow guiding passage 13.

In other words, the coolant in each of the flow passing passages 12 may come from two adjacent flow guiding passages 13. In this setting, the coolant in the two adjacent flow guiding passages 13 can supplement each other. It is ensured that even if a flow quantity of the coolant in one of the flow guiding passages 13 is relatively small when the coolant flows into the flow passing passage 12, due to existence of the other flow guiding passage 13, the coolant sufficiently flows through each of the flow passing passages 12. In this way, high reliability is implemented, thereby achieving an objective of effective heat dissipation.

Figure 17:
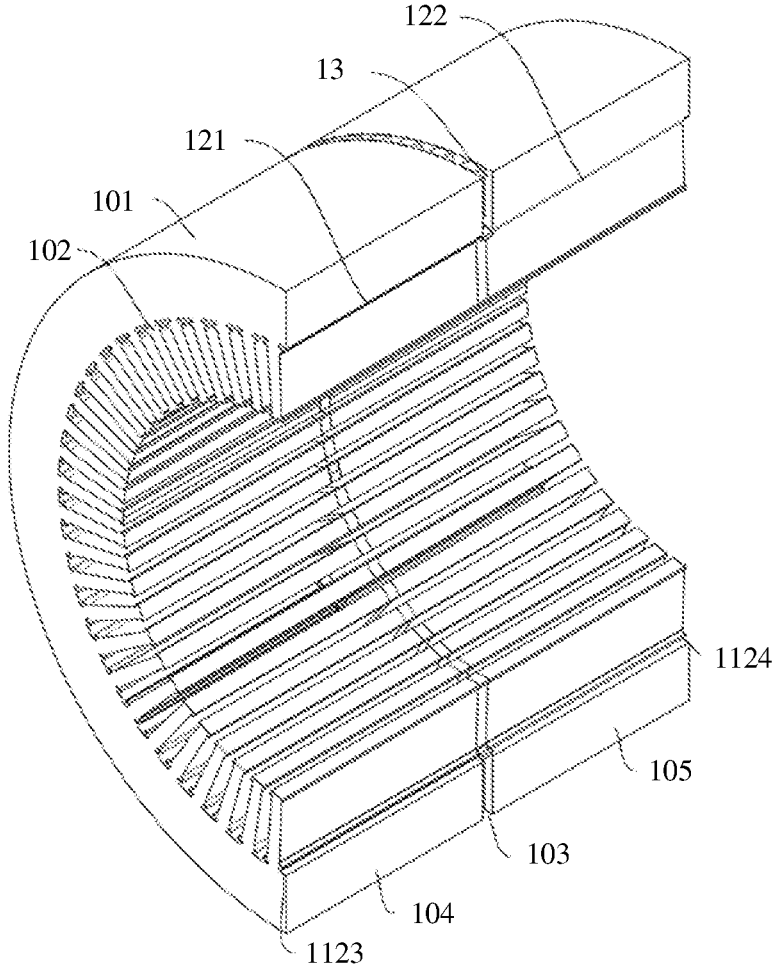
FIG. 17 is another schematic diagram of a structure of a stator core according to a first embodiment.
Figure 18:
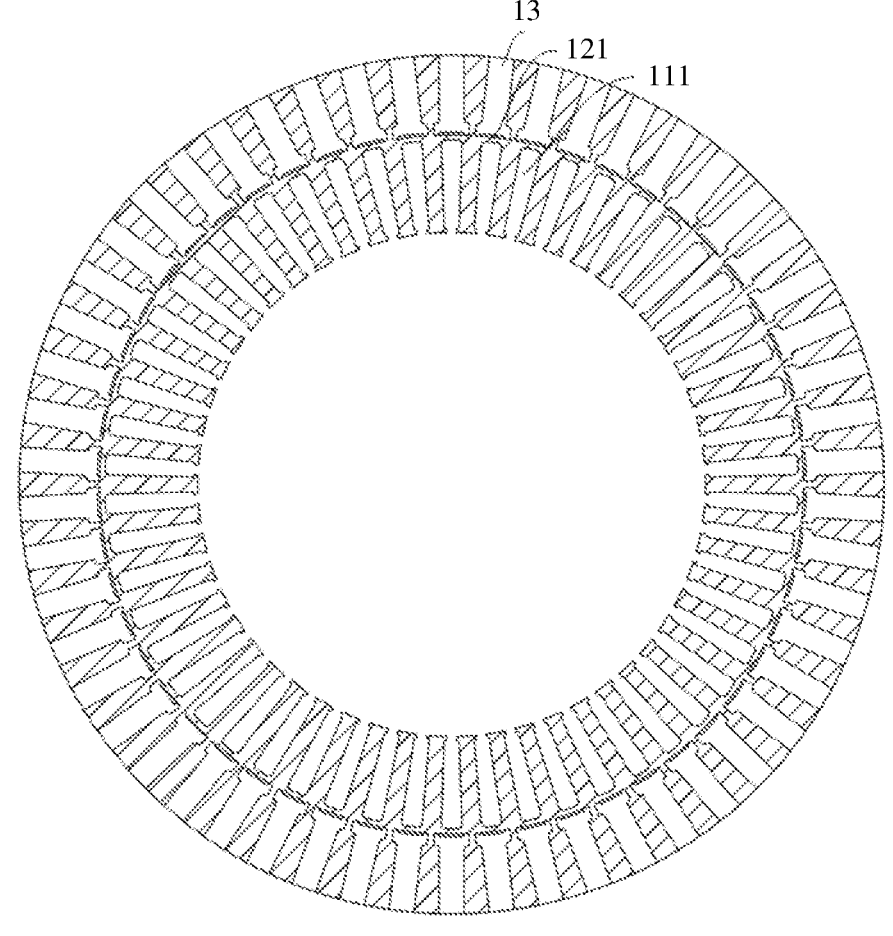
FIG. 18 is a schematic sectional diagram of the stator core shown in FIG. 17.

With reference to FIG. 17 and FIG. 18, in another possible implementation, an inlet of first flow passing passages 121 communicates with an outlet of one flow guiding passage 13, and an inlet of each second flow passing passage 122 communicates with an outlet of one flow guiding passage 13.

In this way, the plurality of flow guiding passages 13 may communicate with the plurality of flow passing passages 12 in a one-to-one correspondence manner. Based on the setting of the communication in the one-to-one correspondence manner, it can be ensured that the coolant flows through each of the flow passing passages 12, so that the coolant can be evenly distributed at various locations in the stator core 10 in the circumferential direction.

Based on the foregoing description, in this embodiment, the liquid inlet passage 2120, the flow guiding passage 13, and the flow passing passage 12 jointly form a cooling passage of the motor 200.

It may be understood that, in this embodiment, the cooling passage of the motor 200 may enable the coolant to flow into the flow guiding passage 13 of the stator core 10 through the liquid inlet passage 2120 disposed on the motor housing 210. For the coolant flowing into the flow guiding passage 13, one part of the coolant is sprayed to the first end winding 23 from the first flow passing passage 121 disposed on the first side part 104, and the other part of the coolant is sprayed to the second end winding 24 from the second flow passing passage 122 disposed on the second side part 105.

Therefore, heat dissipation requirements of the stator core 10 and the stator coil 20 are both considered by using the cooling passage of the motor 200, so that heat dissipation and cooling can be performed on both the stator core 10 and the stator coil 20 by using the cooling passage. This facilitates diversification of use performance of the stator 100. In this way, high-speed running of the motor 200 is ensured, practicability is high, and an application scope is wide.

The following describes a forming principle of the stator core 10 in this embodiment.

With reference to FIG. 13, FIG. 14, FIG. 19, and FIG. 20, in this embodiment, the stator core 10 includes a plurality of first laminations 15 and a plurality of second laminations 16. The plurality of first laminations 15 may be stacked in the axial direction to form the first side part 104 and the second side part 105. The plurality of second laminations 16 may be stacked in the axial direction to form the middle part 103. All first laminations 15 forming the first side part 104, all second laminations 16 forming the middle part 103, and all first laminations 15 forming the second side part 105 are sequentially connected to cooperatively form the stator core 10. For example, materials of the first lamination 15 and the second lamination 16 are both silicon steel. In other words, the first lamination 15 and the second lamination 16 are both silicon steel sheets.

It may be understood that silicon steel is a magnetic substance with a strong magnetoconductivity. In the stator coil 20 that is powered on, silicon steel may generate relatively large magnetic induction intensity, so that an overall volume of the motor 200 can be reduced. However, when the motor 200 works in an alternating-current state, the stator coil 20 has a power loss, and the stator core 10 under magnetization due to the alternating current also has a power loss.

Generally, the power loss in the stator core 10 is referred to as an "iron loss". The iron loss is caused due to two reasons: a "hysteresis loss" and an "eddy-current loss". The hysteresis loss is an iron loss generated due to a magnetic hysteresis phenomenon in a magnetization process of the stator core 10. A magnitude of the loss is directly proportional to a magnitude of an area enclosed by a hysteresis loop of a material. However, a hysteresis loop of silicon steel is narrow, and a hysteresis loss generated by the stator core 10 made of silicon steel in the motor 200 is relatively small, so that a heat emission degree of the stator core 10 can be greatly lowered.

The stator core 10 is formed through stamping silicon steel sheets, to reduce another iron loss, namely, the "eddy-current loss!". When the motor 200 works, an induced current is generated in the stator core 10 due to a changing magnetic flux generated by the stator coil 20. The induced current generated in the stator core 10 causes a Foucault's current (also referred to as an eddy current) in a plane perpendicular to a magnetic flux direction. The heat emission degree of the stator core 10 is greatly increased due to the eddy-current loss. The stator core 10 is formed through stacking and pressing silicon steel sheets that are insulated from each other, so that resistance on an eddy-current path can be increased. In addition, due to silicon in silicon steel, a resistivity of the material is increased, thereby further reducing the eddy current.

It should be noted that a smaller thickness of the silicon steel sheet indicates better effect of reducing the eddy current. However, in an actual processing process, problems such as a manufacturing period and process difficulty of the stator core 10 need to be considered. In other words, a size of the silicon steel sheet may vary based on the foregoing problems.

Figure 19:
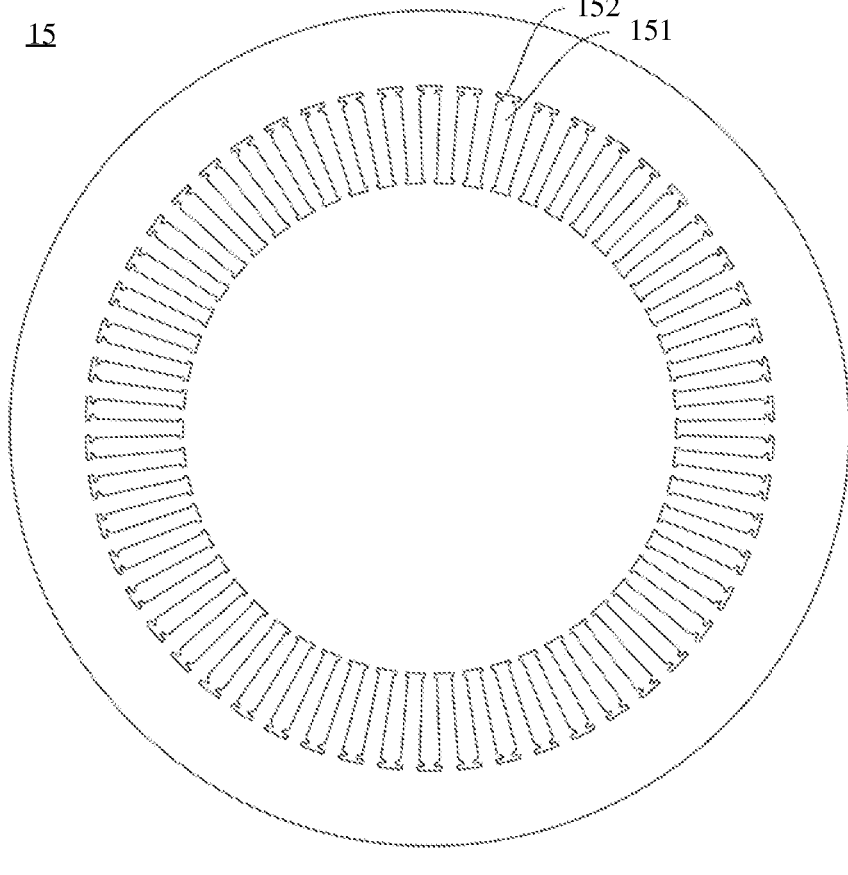
FIG. 19 is a schematic diagram of a structure of a first lamination of a stator core according to a first embodiment.

With reference to FIG. 13, FIG. 14, and FIG. 19, each of the first laminations 15 is provided with a plurality of first coil slots 151 and a plurality of flow passing sub-slots 152. The plurality of first coil slots 151 on the same first lamination 15 may be spaced in the circumferential direction. The plurality of flow passing sub-slots 152 on the same first lamination 15 may be spaced in the circumferential direction and may communicate in a one-to-one correspondence manner with the plurality of first coil slots 151 located at the same first lamination 15.

In this case, when all the first laminations 15 forming the first side part 104 are stacked together, the flow passing sub-slots 152 of all the first laminations 15 forming the first side part 104 communicate with each other to cooperatively form a plurality of first flow passing slots 1123 that are spaced at the first side part 104 in the circumferential direction and that extend in the first side part 104 in the axial direction. Each of the first flow passing slots 1123 penetrates the first side part 104 in the axial direction. In addition, the first flow passing slots 1123 can also cooperate with an insulation kit to form the first flow passing passages 121 located at the first side part 104, so that the coolant flows in the first flow passing passages 121 to perform heat dissipation and cooling on the first side part 104 and the first end winding 23.

In this case, when all the first laminations 15 forming the second side part 105 are stacked together, the flow passing sub-slots 152 of all the first laminations 15 forming the second side part 105 communicate with each other to cooperatively form a plurality of second flow passing slots 1124 that are spaced at the second side part 105 in the circumferential direction and that extend in the second side part 105 in the axial direction. Each of the second flow passing slots 1124 penetrates the second side part 105 in the axial direction. In addition, the second flow passing slots 1124 can also cooperate with the insulation kit to form the second flow passing passages 122 located at the second side part 105, so that the coolant flows in the second flow passing passages 122 to perform heat dissipation and cooling on the second side part 105 and the second end winding 24.

For example, a cross sectional shape of the flow passing sub-slot 152 in the radial direction may be consistent with the cross sectional shape of the flow passing slot 112 in the radial direction shown in FIG. 8 to FIG. 12. This is not limited in this embodiment.

Figure 20:
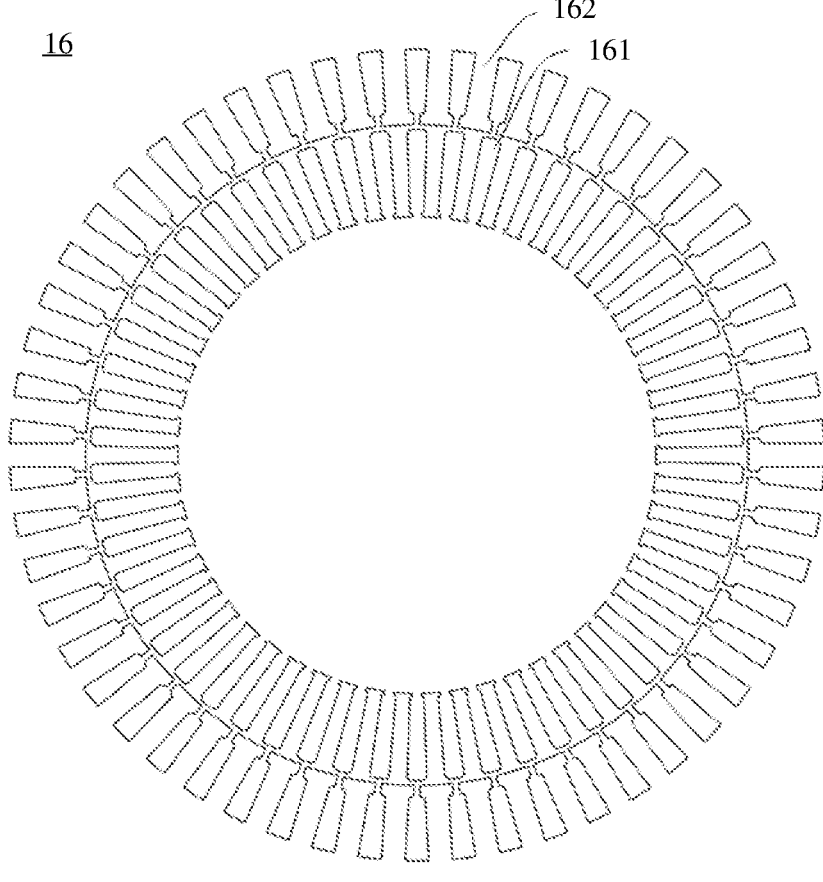
FIG. 20 is a schematic diagram of a structure of a second lamination of a stator core according to a first embodiment.

With reference to FIG. 13, FIG. 14, and FIG. 20, each of the second laminations 16 is provided with a plurality of second coil slots 161 and a plurality of first flow guiding slots 162. The plurality of second coil slots 161 on the same second lamination 16 may be spaced in the circumferential direction. The plurality of first flow guiding slots 162 on the same second lamination 16 may be spaced in the circumferential direction and may be located on a periphery of the plurality of second coil slots 161 on the same second lamination 16.

For example, a cross sectional width of each of the first flow guiding slots 162 in the radial direction may gradually increase from the first flow guiding slot 162 to the second coil slot 161. In this setting, a flowing direction of the coolant can be conveniently changed from the radial direction to the axial direction at the root of the first flow guiding slot 162. In addition, the coolant has high liquidity, and high reliability is implemented.

In this way, when all the second laminations 16 forming the middle part 103 are stacked together, the first flow guiding slots 162 of all the second laminations 16 communicate with each other to cooperatively form a plurality of flow guiding passages 13 that are spaced at the middle part 103 in the circumferential direction and that extend in the middle part 103 in the radial direction.

When all the first laminations 15 forming the first side part 104, all the second laminations 16 forming the middle part 103, and all the first laminations 15 forming the second side part 105 are sequentially connected, the first coil slots 151 of all the first laminations 15 and the second coil slots 161 of all the second laminations 16 communicate with each other to cooperatively form the plurality of coil slots 111 spaced in the circumferential direction. Each of the coil slots 111 sequentially extends from the first side part 104 to the middle part 103 and then to the second side part 105.

With reference to FIG. 20, in a possible implementation, center lines of all the second coil slots 161 on the same second lamination 16 in the radial direction and center lines of all the first flow guiding slots 162 on the same second lamination 16 in the radial direction are arranged in a staggered manner. In this way, when all the laminations are stamped to form the stator core 10, the following passage setting can be implemented: One flow passing passage 12 corresponds to two adjacent flow guiding passages 13. In this setting, the coolant in the two adjacent flow guiding passages 13 can supplement each other. It is ensured that even if a flow quantity of the coolant in one of the flow guiding passages 13 is relatively small when the coolant flows into the flow passing passage 12, due to existence of the other flow guiding passage 13, the coolant sufficiently flows through each of the flow passing passages 12. In this way, high reliability is implemented, thereby achieving an objective of effective heat dissipation.

Figure 21:
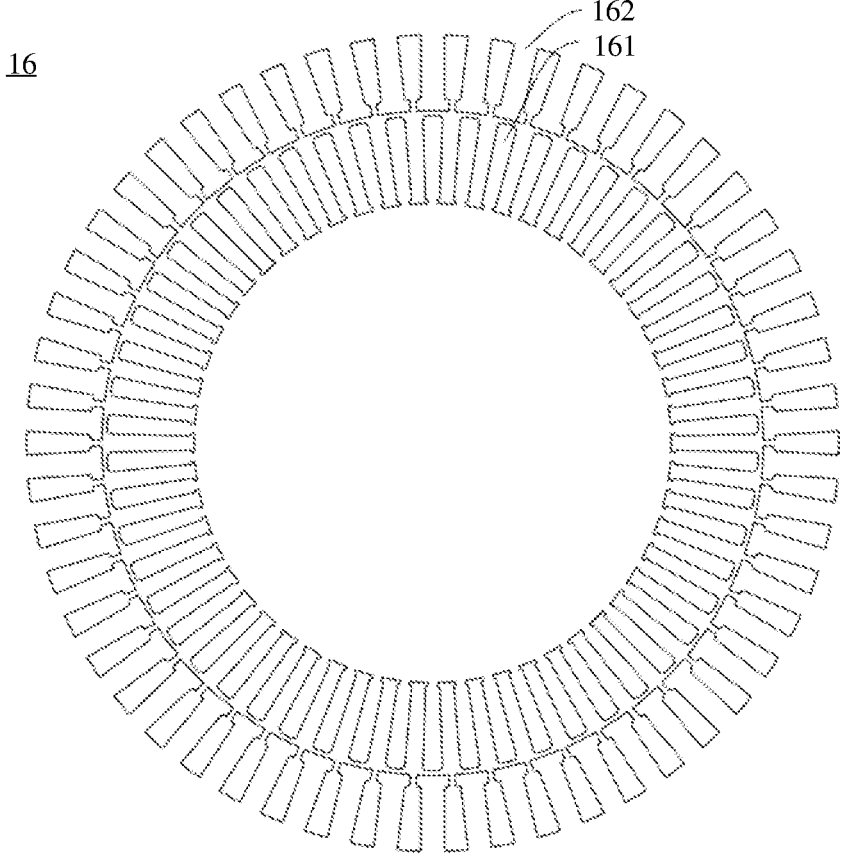
FIG. 21 is another schematic diagram of a structure of a second lamination of a stator core according to a first embodiment.

With reference to FIG. 21, in another possible implementation, a center line of each of the second coil slots 161 on the same second lamination 16 in the radial direction is collinear with a center line of one of the first flow guiding slots 162 on the same second lamination 16 in the radial direction. In this way, when all the laminations are stamped to form the stator core 10, the following passage setting can be implemented: The plurality of flow passing passages 12 may communicate with the plurality of flow guiding passages 13 in a one-to-one correspondence manner. Based on the passage setting of the communication in the one-to-one correspondence manner, it can be ensured that the coolant flows through each of the flow passing passages 12, so that the coolant can be evenly distributed at various locations in the stator core 10 in the circumferential direction.

Based on the foregoing description, in this embodiment, the first laminations 15 and the second laminations 16 in two different forms are disposed. Therefore, when all the laminations are stacked in the axial direction and contours of the laminations completely overlap in the circumferential direction, slot structures at the same locations in the laminations may have a location relationship according to a requirement of a product. For example, all slot structures at the same locations in the laminations completely overlap to form the flow guiding passage 13 and the flow passing passage 12 of the stator core 10. In addition, in the stacking assembly, an eddy-current loss of the stator core 10 can be reduced. This may be highly practical and widely applied.

Second Embodiment

With reference to FIG. 22 to FIG. 27, in the second embodiment, same content as the first embodiment is not described again. A difference from the first embodiment is that the yoke part 101 is further provided with a flow splitting passage 14 extending in the axial direction. The flow splitting passage 14 is the foregoing described passage that can be used to further improve the heat dissipation capability of the stator core 10. The flow splitting passage 14 is away from the tooth part 102 relative to the flow passing passage 12. An inlet of the flow splitting passage 14 communicates with the flow guiding passage 13, and an outlet of the flow splitting passage 14 is disposed on an end face of the yoke part 101.

Figure 28:
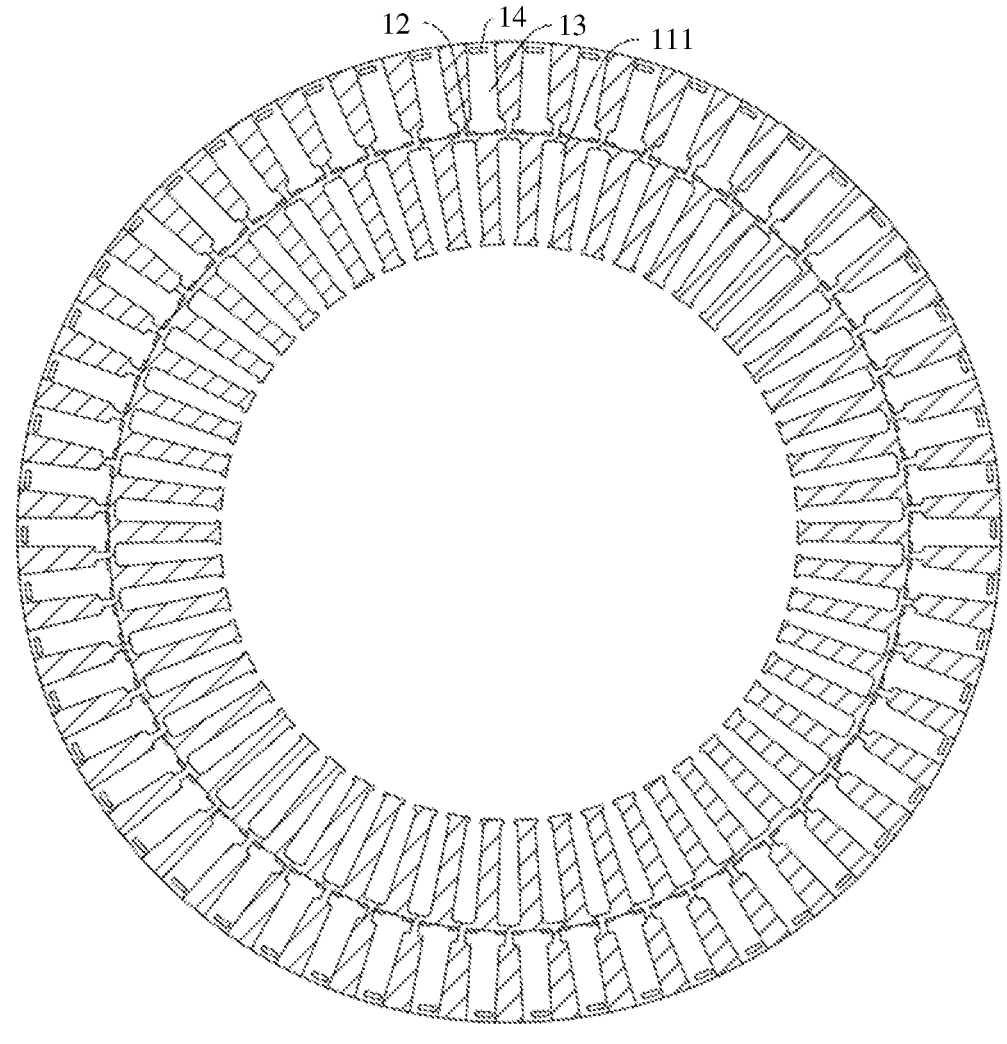
FIG. 28 is a schematic sectional diagram of the stator core shown in FIG. 23.
Figure 29:
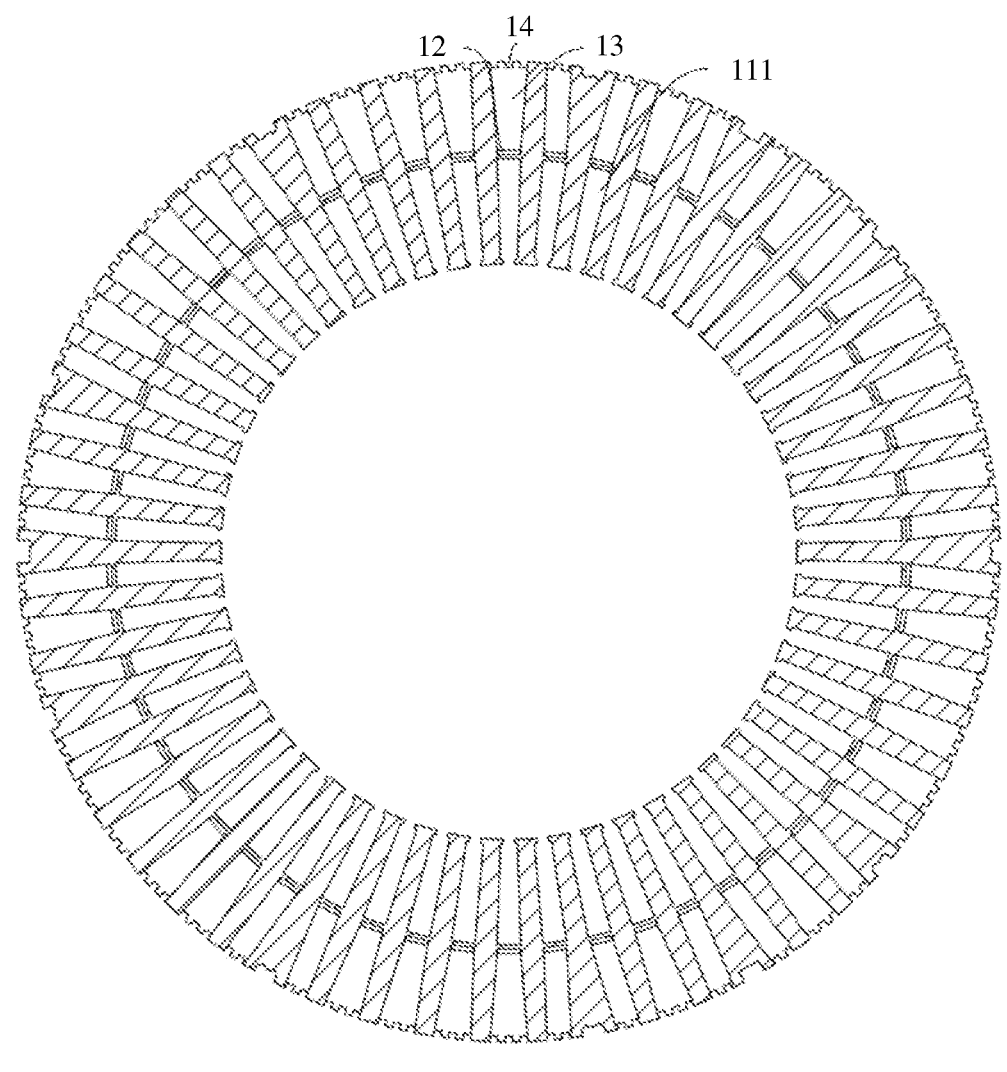
FIG. 29 is a schematic sectional diagram of the stator core shown in FIG. 26.

With reference to FIG. 28 and FIG. 29, the flow splitting passage 14 is disposed, so that heat can be directly dissipated from the stator core 10 when the coolant flows into the flow splitting passage 14. In comparison with a case in which only the flow passing passage 12 is responsible for heat dissipation of the stator core 10 and the stator coil 20, the flow splitting passage 14 is additionally disposed so that two layers of passages are formed inside the stator core 10, to share a heat dissipation load on the flow passing passage 12 and reduce the heat dissipation load on the flow passing passage 12. In this way, cooling performance of the stator core 10 is further improved, and heat dissipation efficiency and heat dissipation reliability of the stator core 10 are further ensured.

Figure 22:
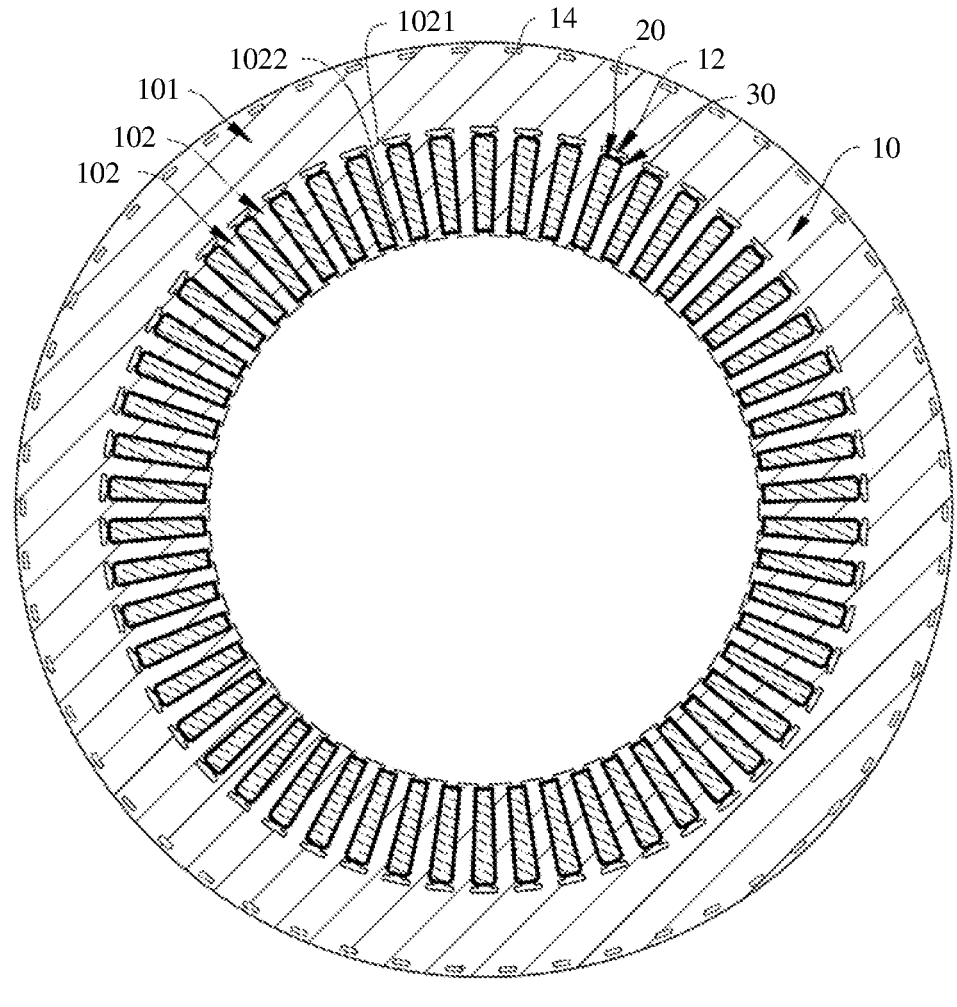
FIG. 22 is a schematic sectional diagram of a stator according to a second embodiment.
Figure 23:
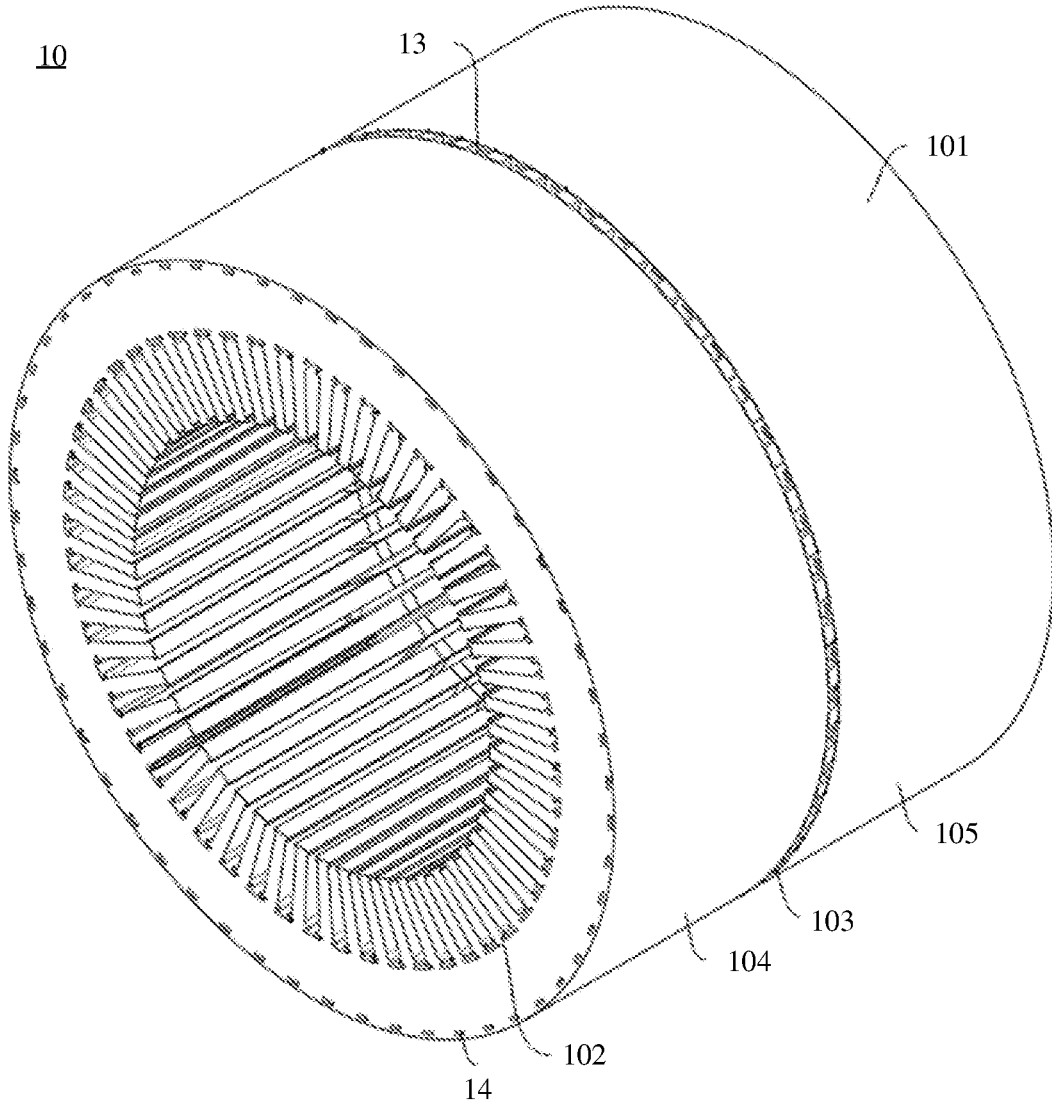
FIG. 23 is a schematic diagram of a structure of a stator core according to a second embodiment.
Figure 24:
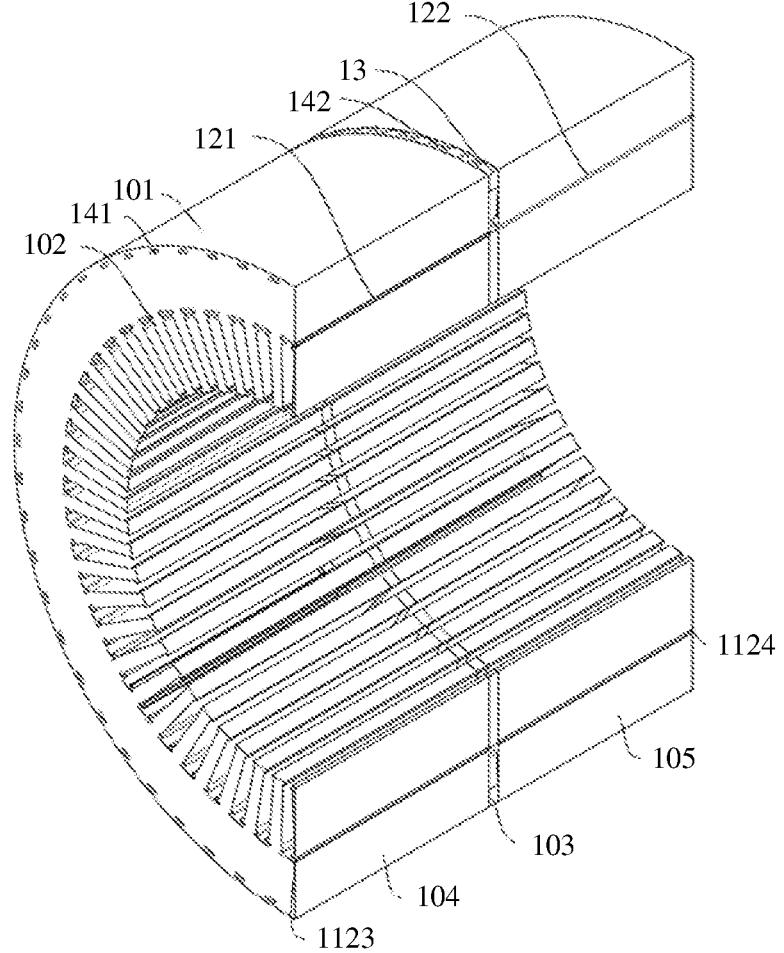
FIG. 24 is a schematic diagram of a partial structure of the stator core shown in FIG. 23.

With reference to FIG. 22, FIG. 23, and FIG. 24, in a possible implementation, two ends of the flow splitting passage 14 are both closed in the radial direction.

Figure 25:
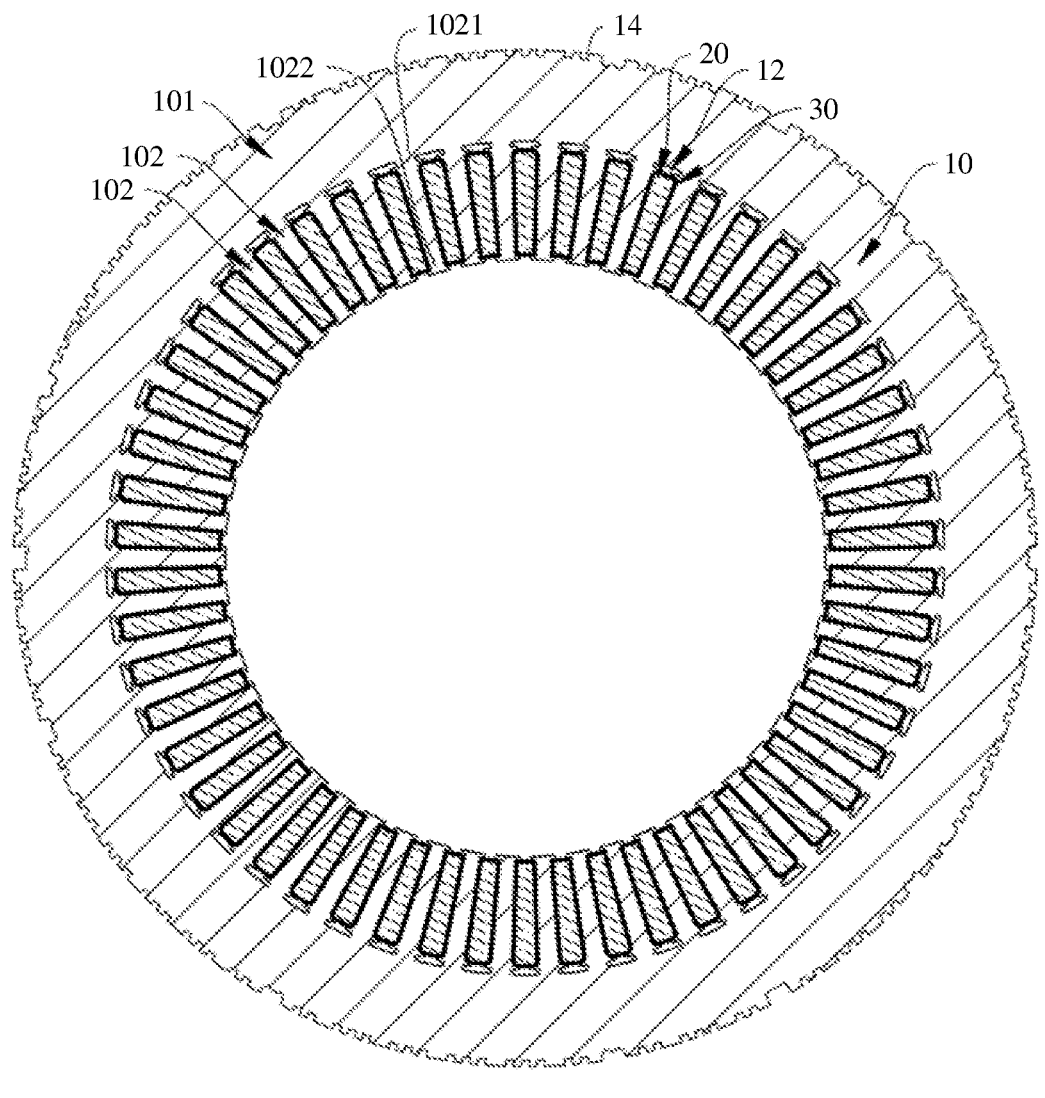
FIG. 25 is another schematic sectional diagram of a stator according to a second embodiment.
Figure 26:
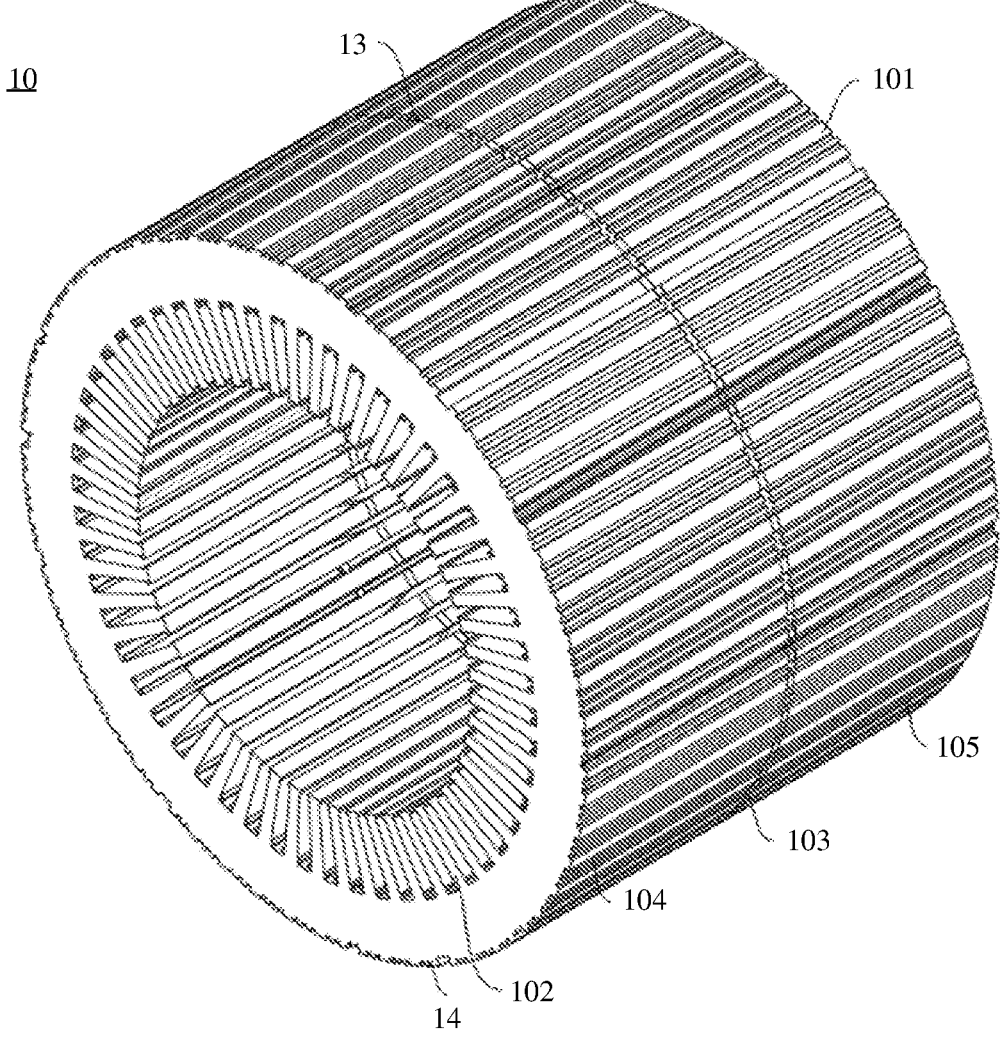
FIG. 26 is a schematic diagram of a structure of a stator core according to a second embodiment.
Figure 27:
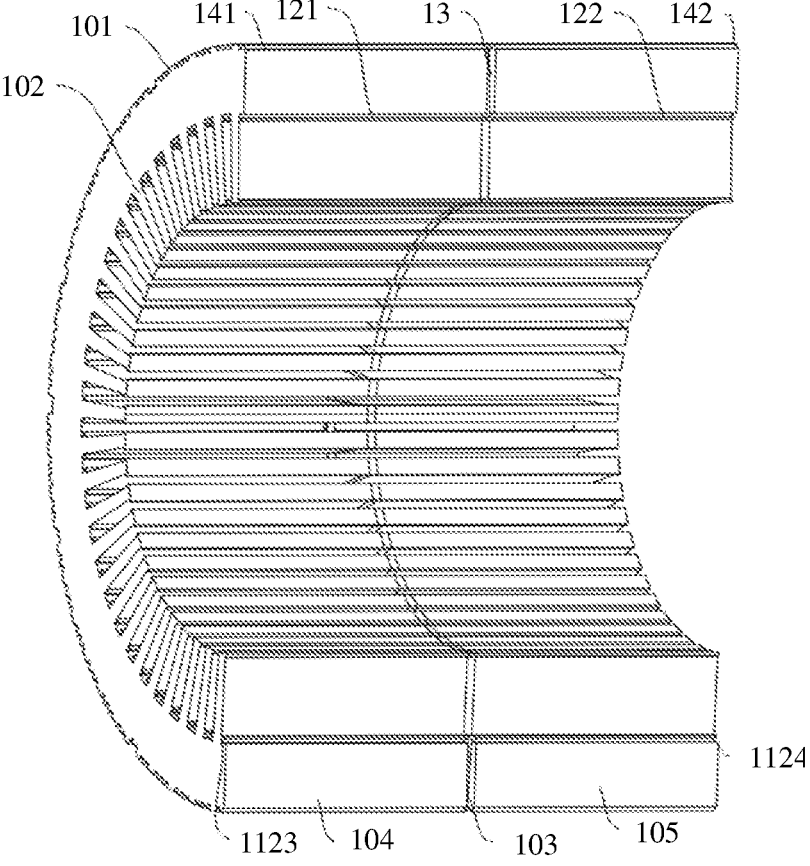
FIG. 27 is a schematic diagram of a partial structure of the stator core shown in FIG. 26.

With reference to FIG. 25, FIG. 26, and FIG. 27, in another possible implementation, one end of the flow splitting passage 14 in the radial direction is open, and the other end of the flow splitting passage 14 in the radial direction is closed.

In this case, a form of the flow splitting passage 14 may be selected according to an actual status of the stator core 10, provided that the flow splitting passage 14 is disposed at an edge of the yoke part 101 or at an edge close to the yoke part 101. It should be understood that overall strength of the stator core 10 and heat distribution of the stator core 10 need to be considered for a location of the flow splitting passage 14.

For example, as shown in FIG. 22, center lines of the plurality of flow splitting passages 14 in the radial direction and center lines of the plurality of flow passing passages 12 in the radial direction are arranged in a staggered manner in the circumferential direction, to present a layout form of "the flow splitting passage 14—the flow passing passage 12—the flow splitting passage 14- . . . -the flow splitting passage 14" in the circumferential direction. In other words, in a schematic cross-sectional diagram of the stator core 10 in the radial direction, a location of each of the flow splitting passages 14 may be aligned with the tooth part 102 between two adjacent flow passing passages 12. However, it should be understood that a location of each of the flow splitting passages 14 may be alternatively aligned with one flow passing passage 12. Alternatively, a location of each of the flow splitting passages 14 may have an overlapping part with one or two adjacent flow passing passages 12. This is not limited in this embodiment.

With reference to FIG. 23 and FIG. 24, in this embodiment, the flow splitting passage 14 includes a first flow splitting passage 141 and a second flow splitting passage 142. The first flow splitting passage 141 and the second flow splitting passage 142 are respectively located at the first side part 104 and the second side part 105. The first flow splitting passage 141 and the second flow splitting passage 142 are symmetrically disposed. The first flow splitting passage 141 and the second flow splitting passage 142 each communicate with the flow guiding passage 13 to an outer space of the stator 100.

An inlet of the first flow splitting passage 141 may communicate with the flow guiding passage 13, an outlet of the first flow splitting passage 141 may be disposed on an end face of the first side part 104, and the coolant flowing out through the outlet of the first flow splitting passage 141 can be sprayed to the first end winding 23. An inlet of the second flow splitting passage 142 communicates with the flow guiding passage 13, an outlet of the second flow splitting passage 142 is disposed on an end face of the second side part 105, and the coolant flowing out through the outlet of the second flow splitting passage 142 can be sprayed to the second end winding 24.

In this way, a structure of the flow splitting passage 14 can fully adapt to a manner in which the coolant flows in from the middle part 103, so that the coolant can flow to two ends of the stator core 10 in the axial direction based on a flow splitting function of the flow guiding passage 13 when the coolant enters the flow guiding passage 13 from the middle part 103 of the stator core 10. Therefore, the coolant can quickly dissipate heat at the two ends of the stator core 10, and temperatures at the two ends of the stator core 10 can be relatively even without an excessively large difference. In other words, it can be ensured that the temperatures of the first side part 104 and the second side part 105 are even.

Still with reference to FIG. 23 and FIG. 24, there may be a plurality of flow splitting passages 14, and the plurality of flow splitting passages 14 may be spaced in the circumferential direction and may be located on a periphery of the plurality of flow passing passages 12, to present a layout in which the plurality of flow splitting passages 14 may be spaced in the circumferential direction of the stator core 10. In other words, there may be a plurality of first flow splitting passages 141, and the plurality of first flow splitting passages 141 may be spaced at the first side part 104 in the circumferential direction. There may be a plurality of second flow splitting passages 142, and the plurality of second flow splitting passages 142 may be spaced at the second side part 105 in the circumferential direction.

For example, the plurality of flow splitting passages 14 may be evenly spaced in the circumferential direction. In other words, the plurality of flow splitting passages 14 may be evenly distributed in the circumferential direction. In the setting of even distribution of the plurality of flow splitting passages 14 in the circumferential direction, an overall temperature of the stator core 10 can be relatively even; and under fully adaption to the fluidity of the coolant, the imbalance generated when the coolant flows can be reduced, thereby further reducing a possibility of increasing the flow resistance of the coolant, challenging the fluidity of the coolant, and causing difficulty in normal working of the stator 100 due to generation of the imbalance. In this way, use performance of the stator 100 is effectively ensured.

In a possible implementation, an inlet of each of the first flow splitting passages 141 communicates with one flow guiding passage 13, and an inlet of each of the second flow splitting passages 142 communicates with one flow guiding passage 13.

In this way, the plurality of flow guiding passages 13 may communicate with the plurality of flow splitting passages 14 in a one-to-one correspondence manner. Based on the setting of the communication in the one-to-one correspondence manner, it can be ensured that the coolant flows through each of the flow splitting passages 14, so that the coolant can be evenly distributed at various locations in the stator core 10 in the circumferential direction.

Based on the foregoing description, in this embodiment, the liquid inlet passage 2120, the flow guiding passage 13, the flow splitting passage 14, and the flow passing passage 12 jointly form a cooling passage of the motor 200.

It may be understood that, in this embodiment, the cooling passage of the motor 200 may enable the coolant to flow into the flow guiding passage 13 of the stator core 10 through the liquid inlet passage 2120 disposed on the motor housing 210. For the coolant flowing into the flow guiding passage 13, one part of the coolant is sprayed to the first end winding 23 from the first flow passing passage 121 disposed on the first side part 104 and the first flow splitting passage 141 disposed on the first side part 104, and the other part of the coolant is sprayed to the second end winding 24 from the second flow passing passage 122 disposed on the second side part 105 and the second flow splitting passage 142 disposed on the second side part 105.

Therefore, heat dissipation requirements of the stator core 10 and the stator coil 20 are both considered by using the cooling passage of the motor 200, so that heat dissipation and cooling can be performed on both the stator core 10 and the stator coil 20 by using the cooling passage. This facilitates diversification of use performance of the stator 100. In this way, high-speed running of the motor 200 is ensured, practicability is high, and an application scope is wide.

The following describes a forming principle of the stator core 10 in this embodiment.

Figure 30:
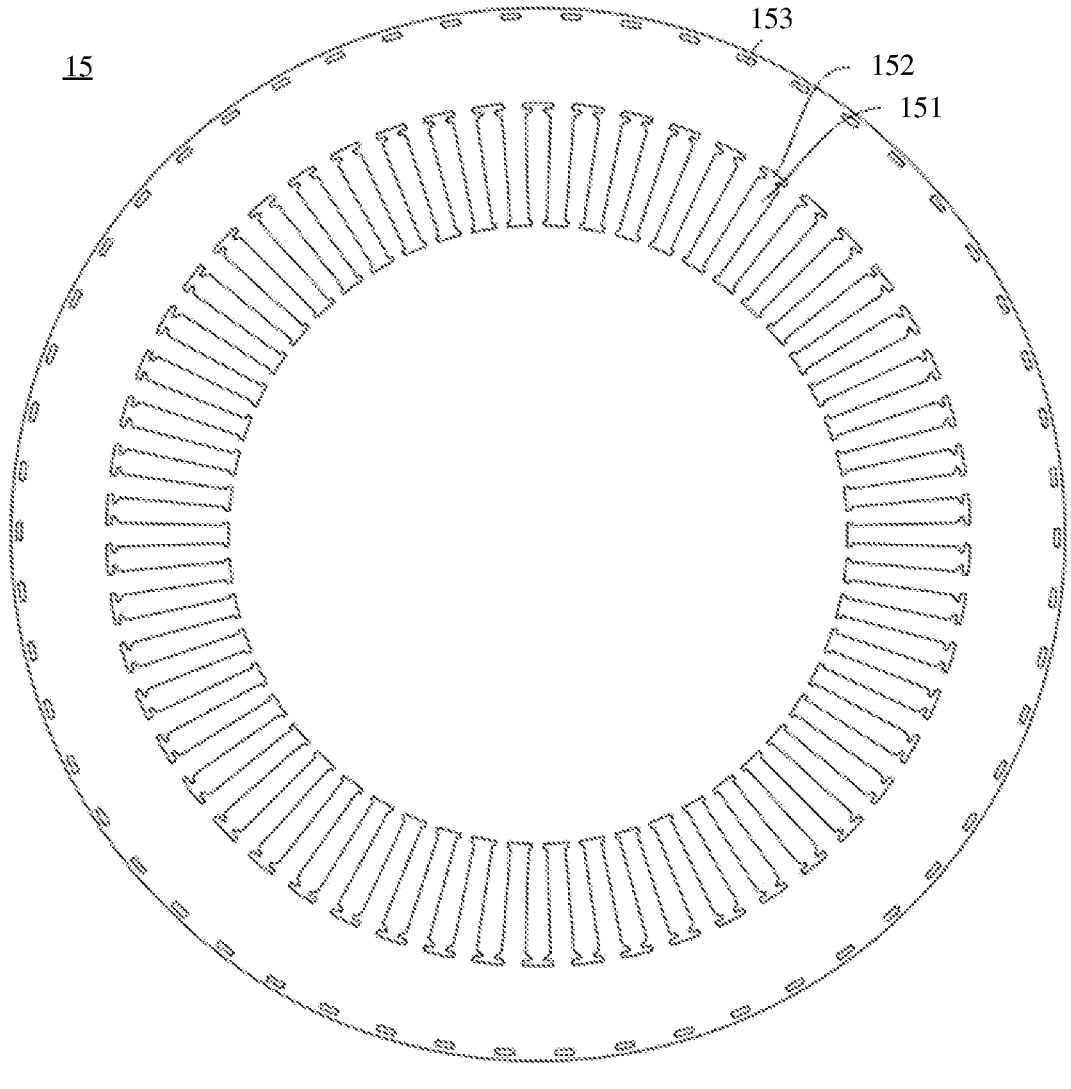
FIG. 30 is a schematic diagram of a structure of a first lamination of a stator core according to a second embodiment.

With reference to FIG. 23, FIG. 24, and FIG. 30, in this embodiment, each of the first laminations 15 is further provided with a plurality of flow splitting slots 153. The plurality of flow splitting slots 153 on the same first lamination 15 may be spaced in the circumferential direction and may be located on a periphery of the plurality of flow passing sub-slots 152 on the same first lamination 15.

In this case, when all the first laminations 15 forming the first side part 104 are stacked together, the flow splitting slots 153 of all the first laminations 15 forming the first side part 104 communicate with each other to cooperatively form the plurality of first flow splitting passages 141 that are spaced at the first side part 104 in the circumferential direction and that extend in the first side part 104 in the axial direction.

When all the first laminations 15 forming the second side part 105 are stacked together, the flow splitting slots 153 of all the first laminations 15 forming the second side part 105 communicate with each other to cooperatively form the plurality of second flow splitting passages 142 that are spaced at the second side part 105 in the circumferential direction and that extend in the second side part 105 in the axial direction.

In a possible implementation, when two ends of each of the flow splitting slots 153 are both closed in the radial direction, and center lines of all the first coil slots 151 on the same first lamination 15 in the radial direction and center lines of all the flow splitting slots 153 on the same first lamination 15 in the radial direction are arranged in a staggered manner, the first lamination 15 may be presented in a form shown in FIG. 30. In this case, the second lamination 16 cooperating with the first lamination 15 may be presented in a form shown in FIG. 20. In other words, center lines of all the second coil slots 161 on the same second lamination 16 in the radial direction and center lines of all the first flow guiding slots 162 on the same second lamination 16 in the radial direction are arranged in a staggered manner.

Figure 31:
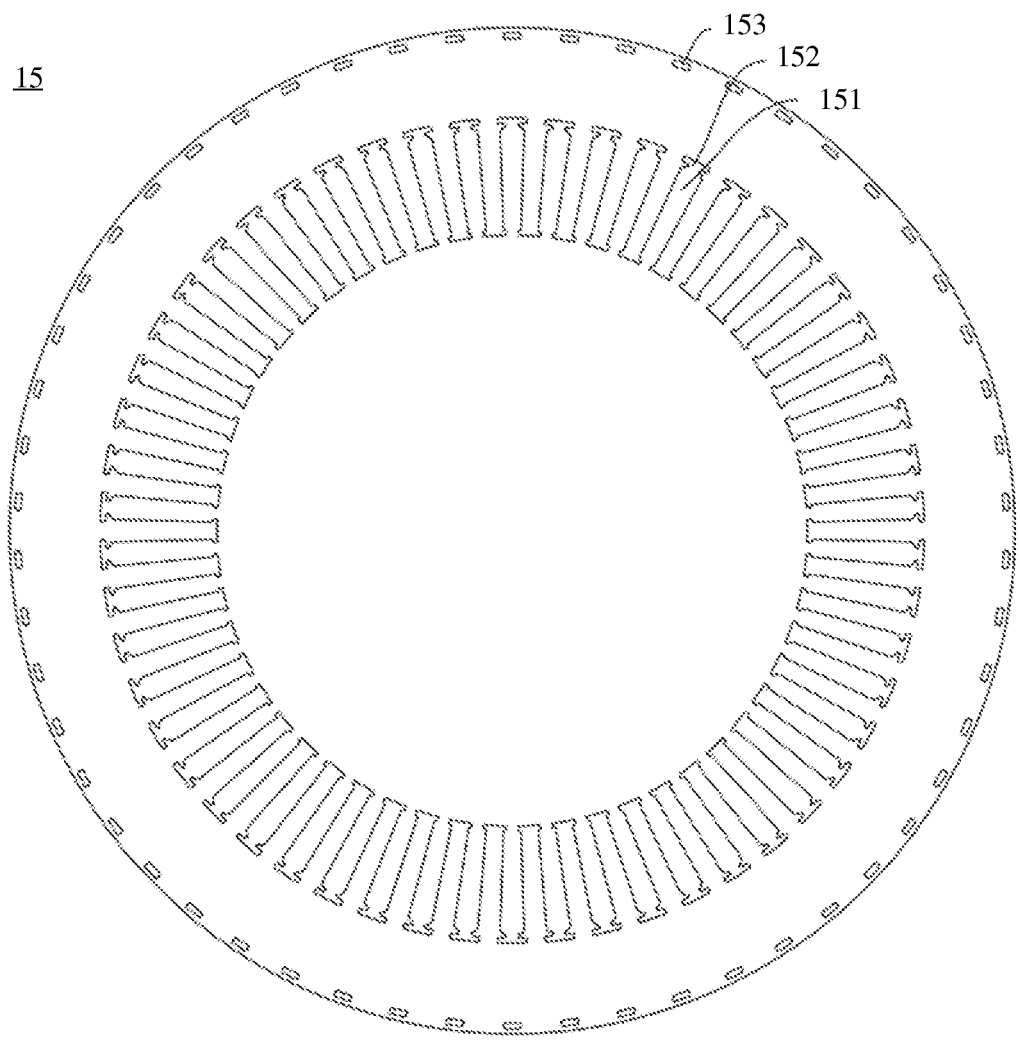
FIG. 31 is another schematic diagram of a structure of a first lamination of a stator core according to a second embodiment.

In another possible implementation, when two ends of each of the flow splitting slots 153 are both closed in the radial direction, and a center line of each of the first coil slots 151 on the same first lamination 15 in the radial direction is collinear with a center line of one of the flow splitting slots 153 on the same first lamination 15 in the radial direction, the first lamination 15 may be presented in a form shown in FIG. 31. In this case, the second lamination 16 cooperating with the first lamination 15 may be presented in a form shown in FIG. 21. In other words, a center line of each of the second coil slots 161 on the same second lamination 16 in the radial direction is collinear with a center line of one of the first flow guiding slots 162 on the same second lamination 16 in the radial direction.

Figure 32:
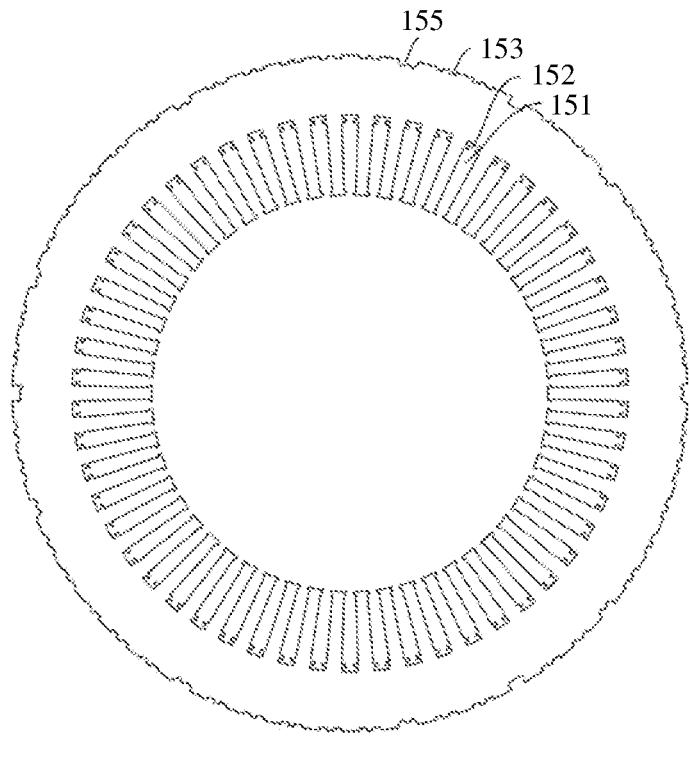
FIG. 32 is still another schematic diagram of a structure of a first lamination of a stator core according to a second embodiment.
Figure 33:
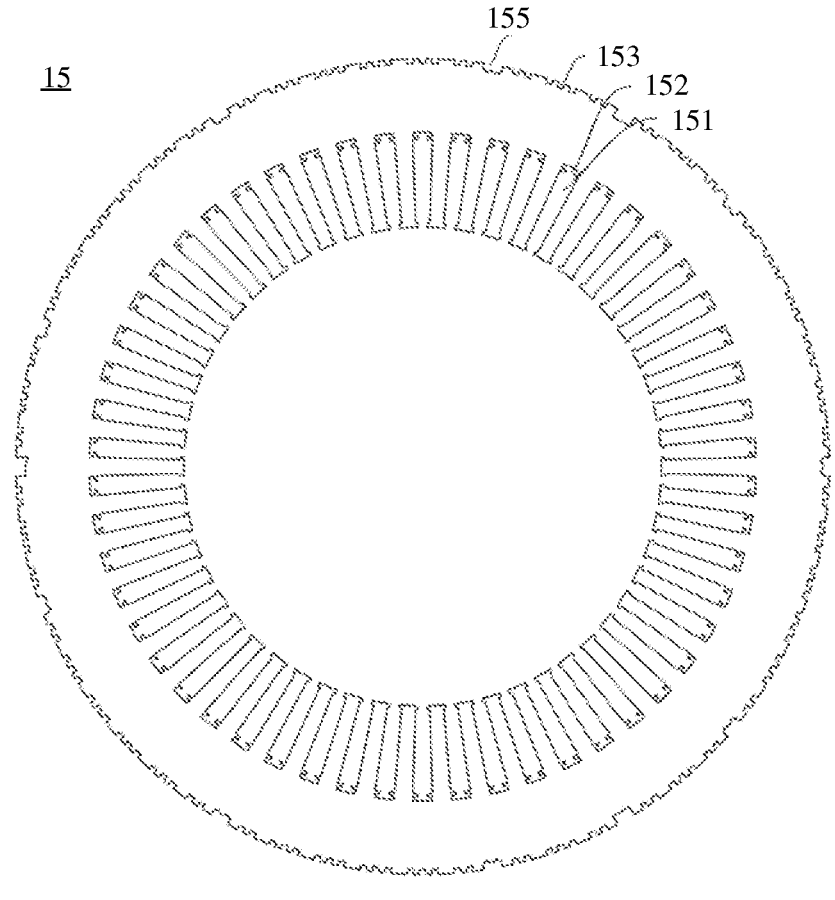
FIG. 33 is yet another schematic diagram of a structure of a first lamination of a stator core according to a second embodiment.
Figure 34:
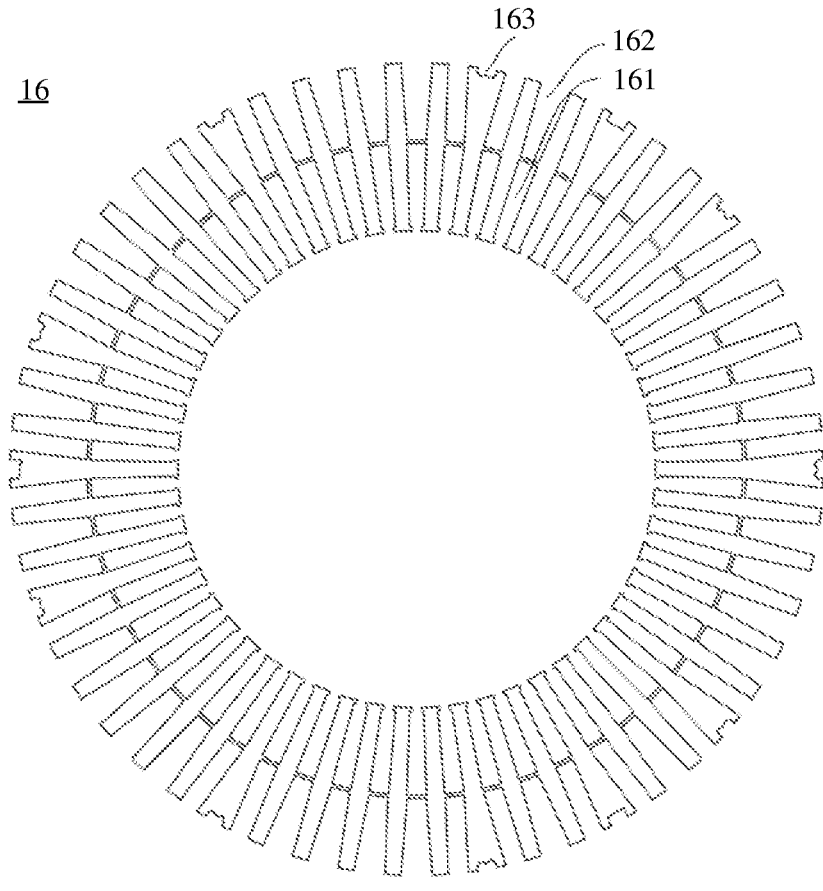
FIG. 34 is a schematic diagram of a structure of a second lamination of a stator core according to a second embodiment.
Figure 35:
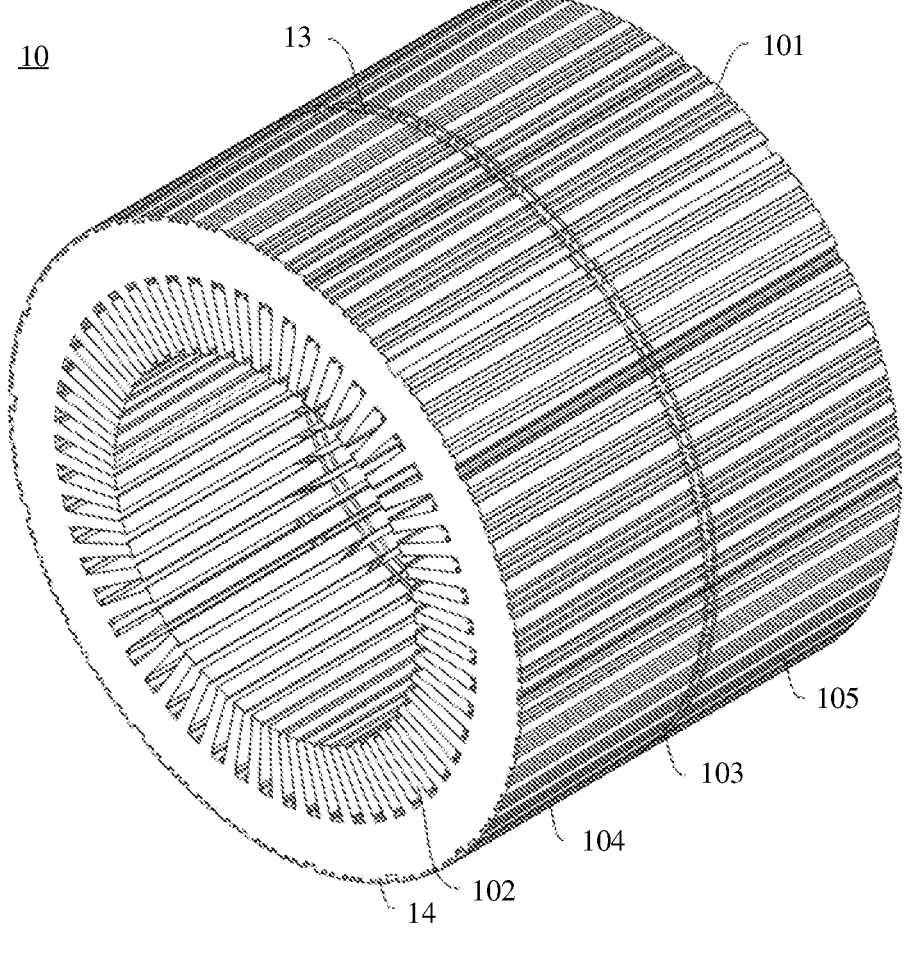
FIG. 35 is a schematic diagram of a structure of a stator core according to a third embodiment.
Figure 36:
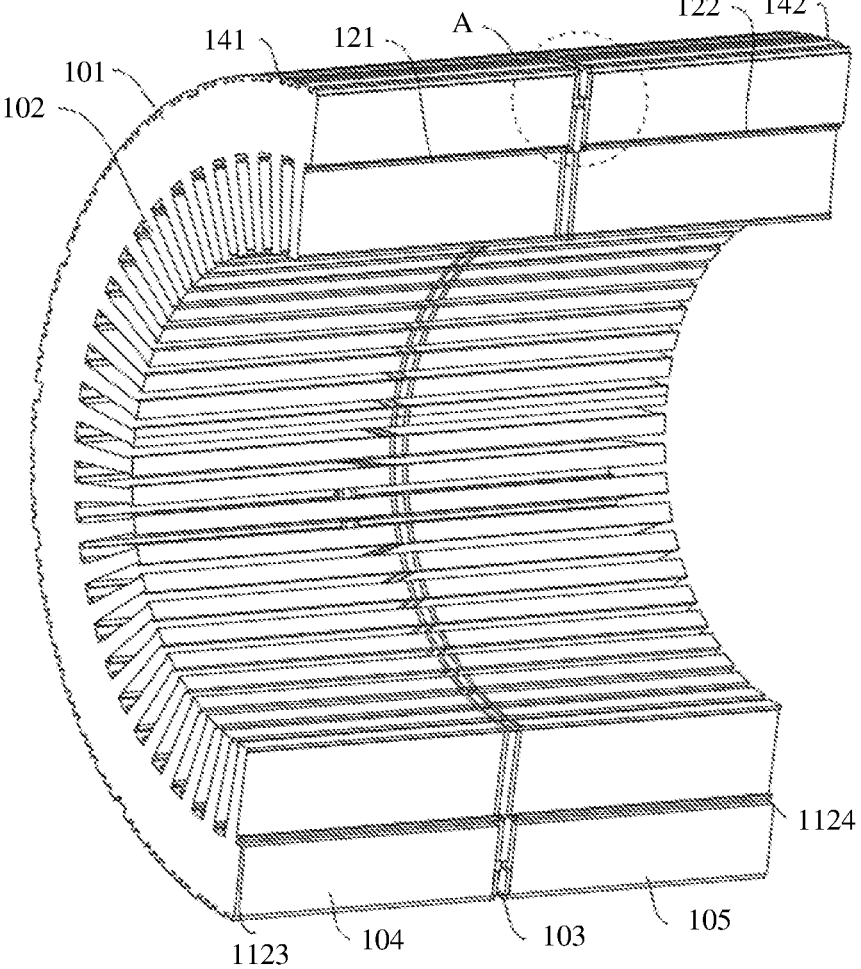
FIG. 36 is a schematic diagram of a partial structure of the stator core shown in FIG. 35.

In still another possible implementation, one end of each of the flow splitting slots 153 in the radial direction is open, and the other end of the flow splitting slot 153 in the radial direction is closed. For example, the first lamination 15 may be presented in a form shown in FIG. 32 or FIG. 33. All the flow splitting slots 153 on the same first lamination 15 may be spaced in a group of two or three. An irregular slot structure 155 on the first lamination 15 may further form a part of a weld bead structure of the stator core 10. This is not strictly limited in this embodiment. In this case, the second lamination 16 cooperating with the first lamination 15 may be presented in a form shown in FIG. 34. It should be understood that, an irregular slot structure 163 that is on the second lamination 16 and that has the same shape as the irregular slot structure 163 on the first lamination 15 may also further form a part of the weld bead structure of the stator core 10. This is not strictly limited in this embodiment.

Based on the foregoing description, in this embodiment, the first laminations 15 and the second laminations 16 in two different forms are disposed. Therefore, when all the laminations are stacked in the axial direction and contours of the laminations completely overlap in the circumferential direction, slot structures at the same locations in the laminations may have a specified location relationship according to a requirement of a product. For example, all slot structures at the same locations in the laminations completely overlap to form the flow guiding passage 13, the flow splitting passage 14, and the flow passing passage 12 of the stator core 10. In addition, in the stacking assembly, an eddy-current loss of the stator core 10 can be reduced. This may be highly practical and widely applied.

Third Embodiment

With reference to FIG. 25, FIG. 35, FIG. 36, and FIG. 37, in the third embodiment, same content as the second embodiment is not described again. A difference from the second embodiment is that the flow guiding passage 13 includes one first flow guiding passage 131, two second flow guiding passages 132, and two third flow guiding passages 133.

The first flow guiding passage 131 may extend in the radial direction and may communicate with the liquid inlet passage 2120 of the peripheral mechanical part of the stator core 10. The two second flow guiding passages 132 are respectively located on two sides of an inlet of the first flow guiding passage 131. One of the second flow guiding passages 132 communicates with the first flow guiding passage 131 and the first flow splitting passage 141, and the other one of the second flow guiding passages 132 communicates with the first flow guiding passage 131 to the second flow splitting passage 142. The two third flow guiding passages 133 are respectively located on two sides of an outlet of the first flow guiding passage 131. One of the third flow guiding passages 133 communicates with the first flow guiding passage 131 to the first flow passing passage 121, and the other one of the third flow guiding passages 133 communicates with the first flow guiding passage 131 to the second flow passing passage 122. For example, the peripheral mechanical part of the stator core 10 may be the motor housing 210. However, it should be understood that the peripheral mechanical part is not limited thereto.

Figure 37:
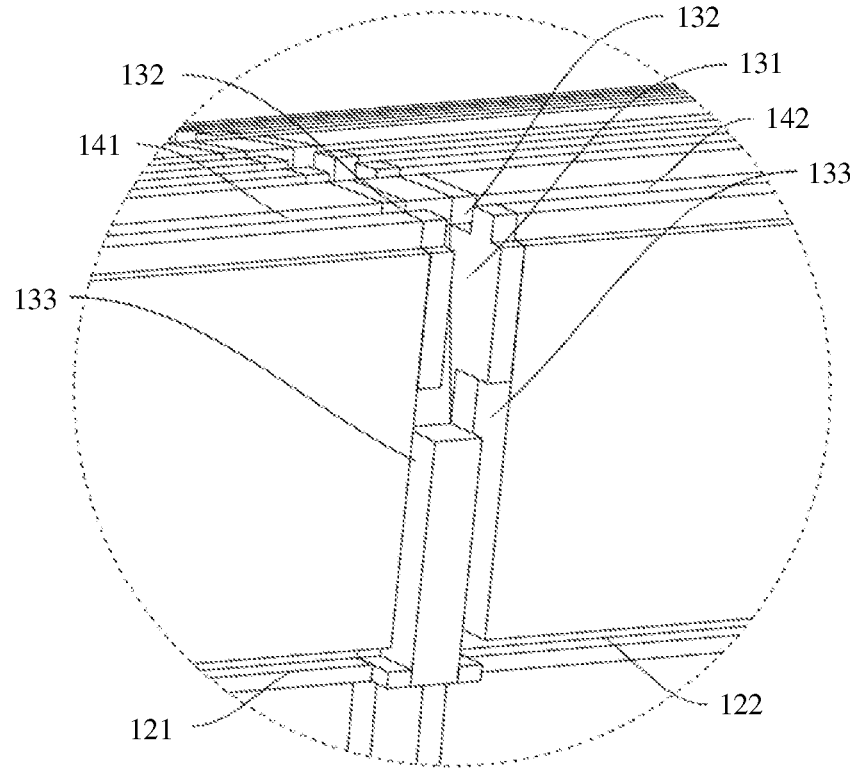
FIG. 37 is an enlarged schematic diagram of a region A shown in FIG. 36.
Figure 38:
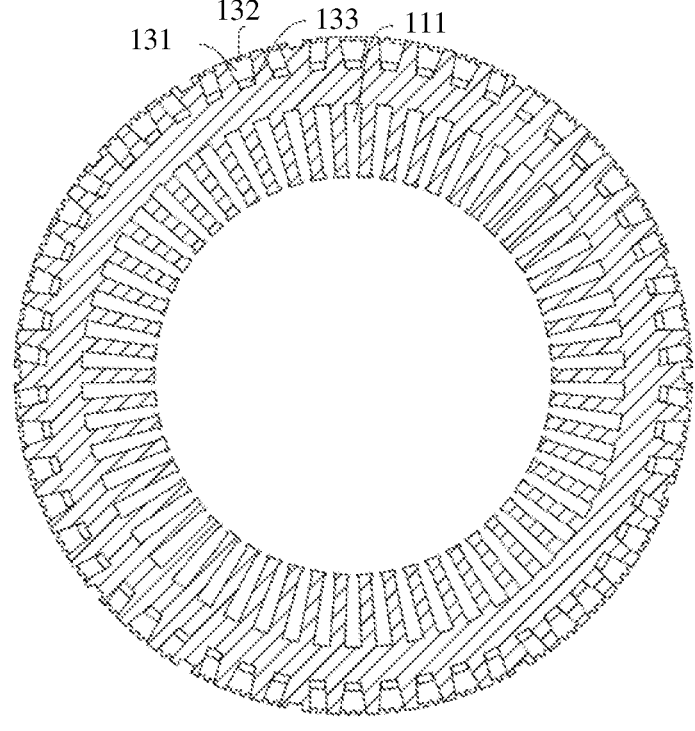
FIG. 38 is a schematic sectional diagram of a stator core according to a third embodiment.
Figure 39:
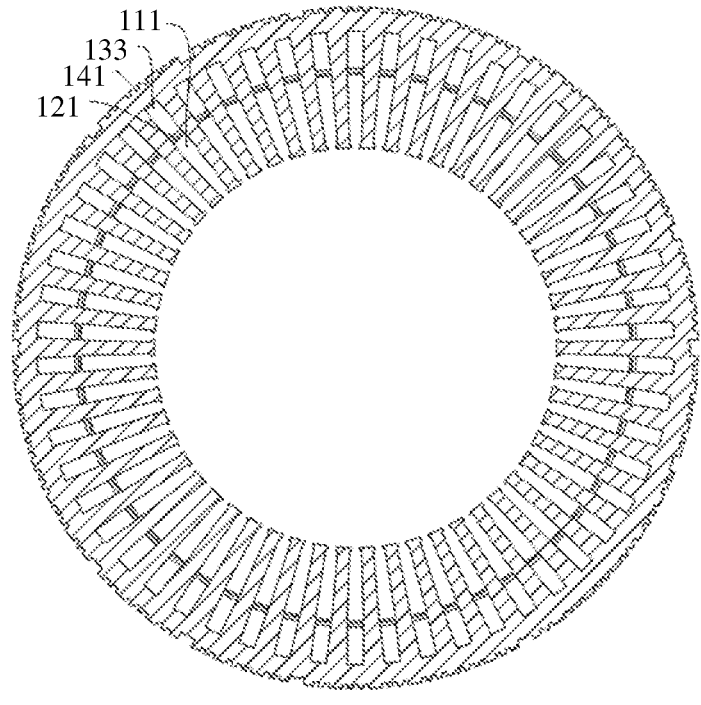
FIG. 39 is another schematic sectional diagram of a stator core according to a third embodiment.

In this way, with reference to FIG. 37, FIG. 38, and FIG. 39, when the coolant flows into the first flow guiding passage 131, based on a flow guiding function of the first flow guiding passage 131, a part of the coolant can enter the second flow guiding passage 132, and a part of the coolant can enter the third flow guiding passage 133. The coolant entering the second flow guiding passage 132 may flow out from an outlet of the first flow splitting passage 141 or the second flow splitting passage 142, and the coolant entering the third flow guiding passage 133 may flow out from an outlet of the first flow passing passage 121 or the second flow passing passage 122. The flow guiding passage is 13 may be as a combination form of a plurality of passages, to further enlarge a contact area between the coolant and the stator core 10, so that the coolant can be in contact with the stator core 10 to a greatest extent in a limited space. In this way, a heat dissipation area of the stator core 10 is fully ensured. This helps improve the heat dissipation efficiency of the stator core 10.

Based on the foregoing description, in this embodiment, the liquid inlet passage 2120, the flow guiding passage 13, the flow splitting passage 14, and the flow passing passage 12 jointly form a cooling passage of the motor 200.

It may be understood that, in this embodiment, the cooling passage of the motor 200 may enable the coolant to flow into the flow guiding passage 13 of the stator core 10 through the liquid inlet passage 2120 disposed on the motor housing 210. For the coolant flowing into the flow guiding passage 13, one part of the coolant is sprayed to the first end winding 23 from the first flow passing passage 121 disposed on the first side part 104 and the first flow splitting passage 141 disposed on the first side part 104, and the other part of the coolant is sprayed to the second end winding 24 from the second flow passing passage 122 disposed on the second side part 105 and the second flow splitting passage 142 disposed on the second side part 105.

Therefore, heat dissipation requirements of the stator core 10 and the stator coil 20 are both considered by using the cooling passage of the motor 200, so that heat dissipation and cooling can be performed on both the stator core 10 and the stator coil 20 by using the cooling passage. This facilitates diversification of use performance of the stator 100. In this way, high-speed running of the motor 200 is ensured, practicability is high, and an application scope is wide.

The following describes a forming principle of the stator core 10 in this embodiment.

With reference to FIG. 35, FIG. 36, FIG. 40, FIG. 41, and FIG. 42, in this embodiment, the stator core 10 includes a plurality of first laminations 15, a plurality of second laminations 16, and a plurality of third laminations 17. The plurality of first laminations 15 may be stacked to form the first side part 104 and the second side part 105 in the axial direction. The plurality of second laminations 16 may be stacked in the axial direction. The plurality of third laminations 17 may be stacked on two sides of the plurality of second laminations 16 in the axial direction. The plurality of third laminations 17 and the plurality of second laminations 16 cooperatively form the middle part 103. All first laminations 15 forming the first side part 104, all the second laminations 16 and all the third laminations 17 forming the middle part 103, and all first laminations 15 forming the second side part 105 are sequentially connected to cooperatively form the stator core 10. For example, materials of the first lamination 15, the second lamination 16, and the third lamination 17 are all silicon steel. In other words, the first lamination 15, the second lamination 16, and the third lamination 17 are all silicon steel sheets.

Figure 40:
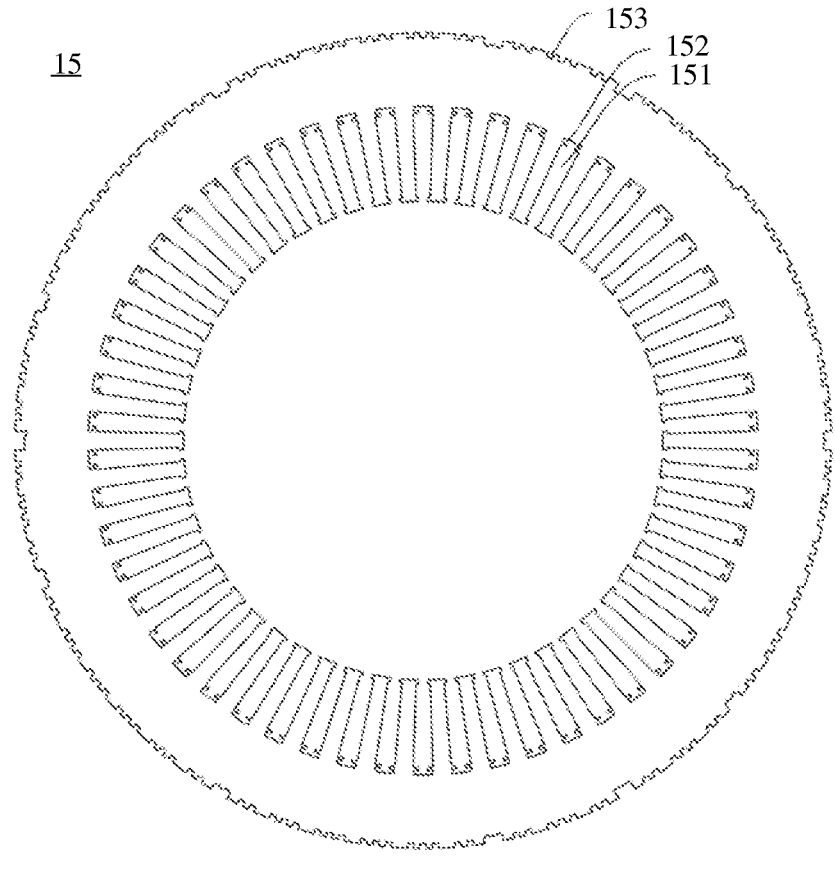
FIG. 40 is a schematic diagram of a structure of a first lamination of a stator core according to a third embodiment.

With reference to FIG. 40, each of the first laminations 15 is provided with a plurality of first coil slots 151, a plurality of flow passing sub-slots 152, and a plurality of flow splitting slots 153. The plurality of first coil slots 151 on the same first lamination 15 may be spaced in the circumferential direction. The plurality of flow passing sub-slots 152 on the same first lamination 15 may be spaced in the circumferential direction and communicate in a one-to-one correspondence manner with the plurality of first coil slots 151 located at the same first lamination 15. The plurality of flow splitting slots 153 on the same first lamination 15 may be spaced in the circumferential direction and may be located on a periphery of the plurality of flow passing sub-slots 152 on the same first lamination 15.

In this case, when all the first laminations 15 forming the first side part 104 are stacked together, the flow passing sub-slots 152 of all the first laminations 15 forming the first side part 104 communicate with each other to cooperatively form a plurality of first flow passing slots 1123 that are spaced at the first side part 104 in the circumferential direction and that extend in the first side part 104 in the axial direction. Each of the first flow passing slots 1123 penetrates the first side part 104 in the axial direction. In addition, the first flow passing slots 1123 can also cooperate with an insulation kit to form the first flow passing passages 121 located at the first side part 104, so that the coolant flows in the first flow passing passages 121 to perform heat dissipation and cooling on the first side part 104 and the first end winding 23. In addition, flow splitting slots 153 of all the first laminations 15 forming the first side part 104 communicate with each other to cooperatively form a plurality of first flow splitting passages 141 that are spaced at the first side part 104 in the circumferential direction and that extend in the first side part 104 in the axial direction.

In this case, when all the second laminations 16 forming the second side part 105 are stacked together, the flow passing sub-slots 152 of all the first laminations 15 forming the second side part 105 communicate with each other to cooperatively form a plurality of second flow passing slots 1124 that are spaced at the second side part 105 in the circumferential direction and that extend in the second side part 105 in the axial direction. Each of the second flow passing slots 1124 penetrates the second side part 105 in the axial direction. In addition, the second flow passing slots 1124 can also cooperate with the insulation kit to form the second flow passing passages 122 located at the second side part 105, so that the coolant flows in the second flow passing passages 122 to perform heat dissipation and cooling on the second side part 105 and the second end winding 24. In addition, flow splitting slots 153 of all the first laminations 15 forming the second side part 105 may further communicate with each other cooperatively form a plurality of second flow splitting passages 142 that are spaced at the second side part 105 in the circumferential direction and that extend in the second side part 105 in the axial direction.

For example, a cross sectional shape of the flow passing sub-slot 152 in the radial direction may be consistent with the cross sectional shape of the flow passing slot 112 in the radial direction shown in FIG. 8 to FIG. 12. This is not limited in this embodiment.

Figure 41:
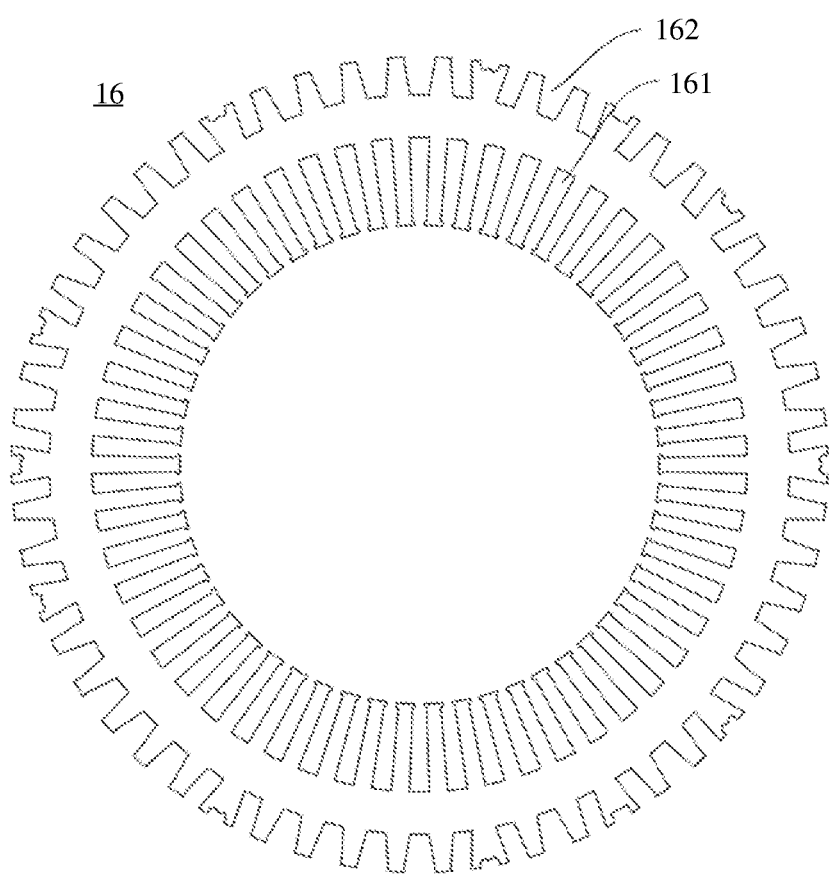
FIG. 41 is a schematic diagram of a structure of a second lamination of a stator core according to a third embodiment.

With reference to FIG. 41, each of the second laminations 16 is provided with a plurality of second coil slots 161 and a plurality of first flow guiding slots 162. The plurality of second coil slots 161 on the same second lamination 16 may be spaced in the circumferential direction. The plurality of first flow guiding slots 162 on the same second lamination 16 may be spaced in the circumferential direction and may be located on a periphery of the plurality of second coil slots 161 on the same second lamination 16.

For example, a cross-sectional width of each of the first flow guiding slots 162 in the radial direction may gradually decrease from the first flow guiding slot 162 to the second coil slot 161 and is presented in a cup shape.

In this way, when all the second laminations 16 forming the middle part 103 are stacked together, the first flow guiding slots 162 of all the second laminations 16 communicate with each other to cooperatively form a plurality of first flow guiding passages 131 that are spaced in the circumferential direction.

Figure 42:
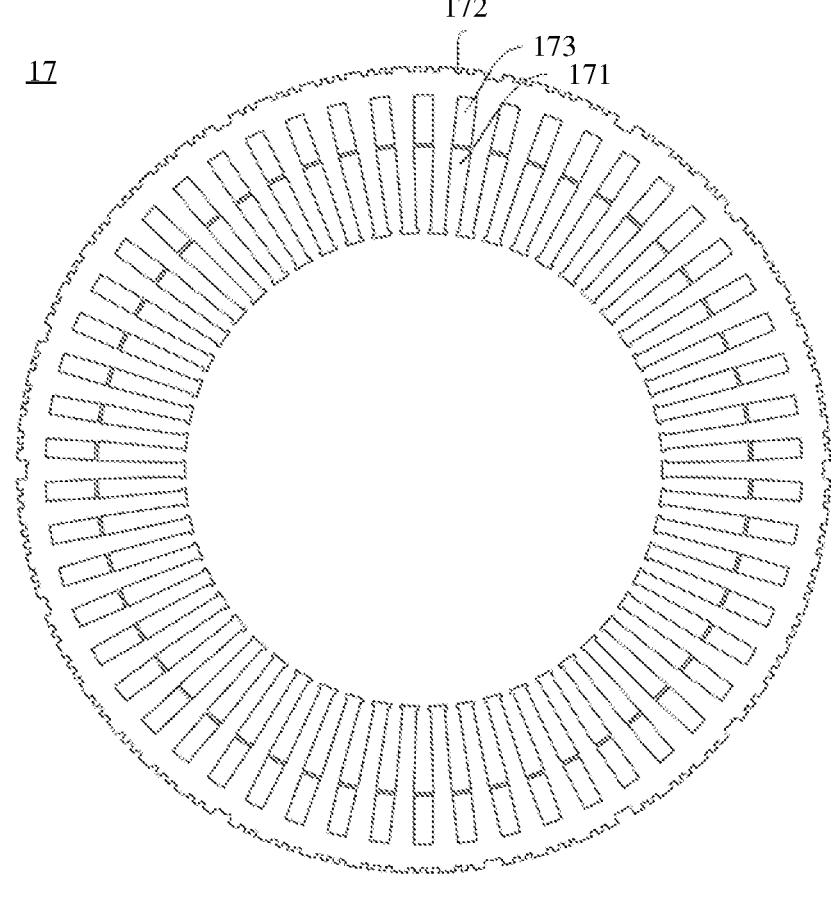
FIG. 42 is a schematic diagram of a structure of a third lamination of a stator core according to a third embodiment.
Figure 43:
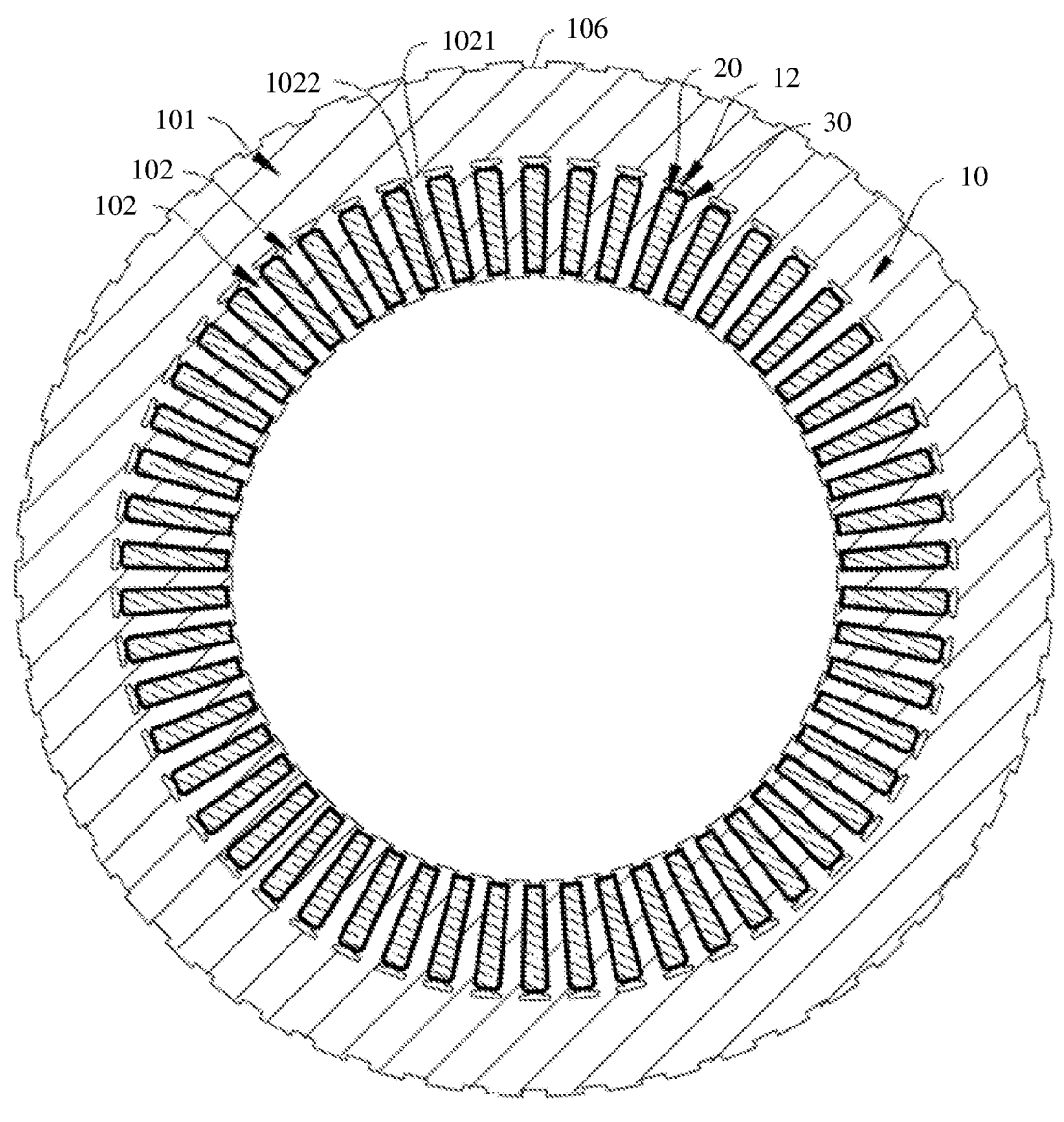
FIG. 43 is a schematic sectional diagram of a stator according to a fourth embodiment.
Figure 44:
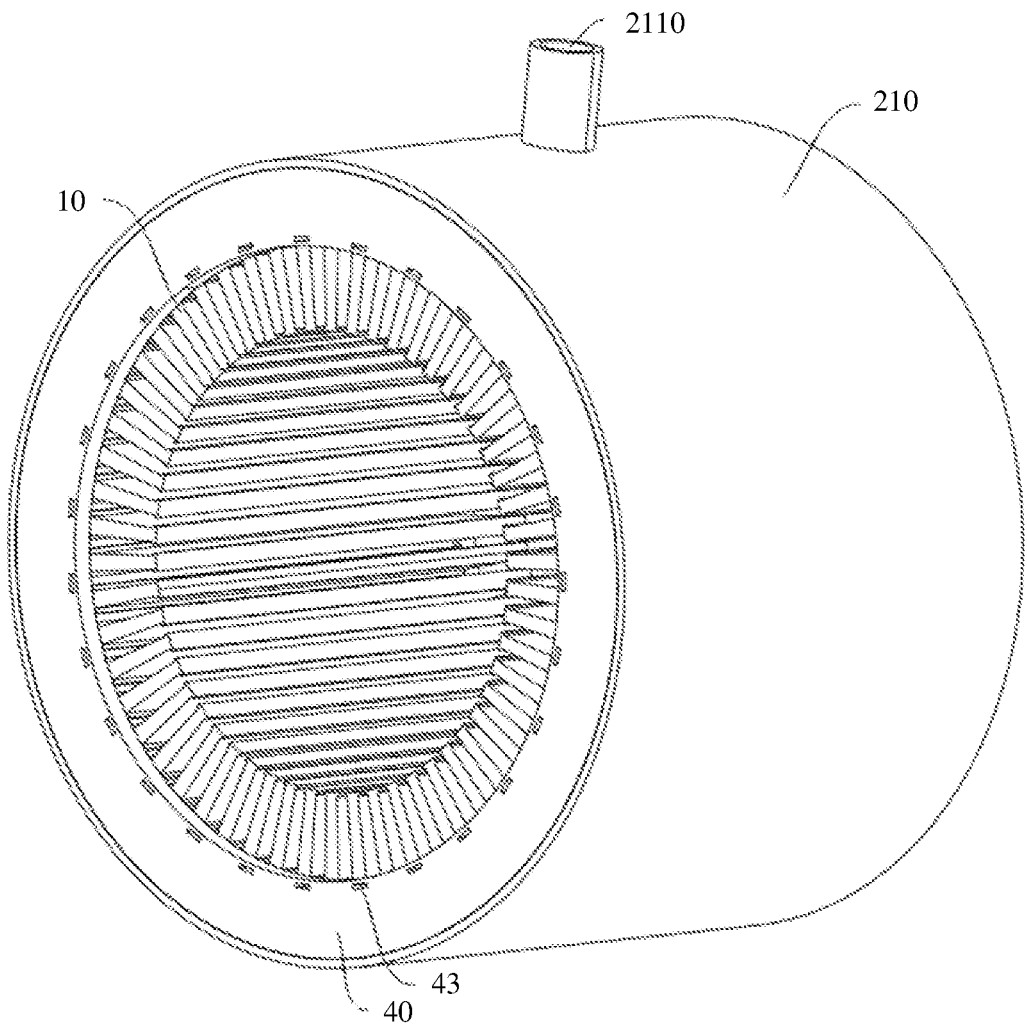
FIG. 44 is a schematic diagram of a structure of a motor according to a fourth embodiment.
Figure 45:
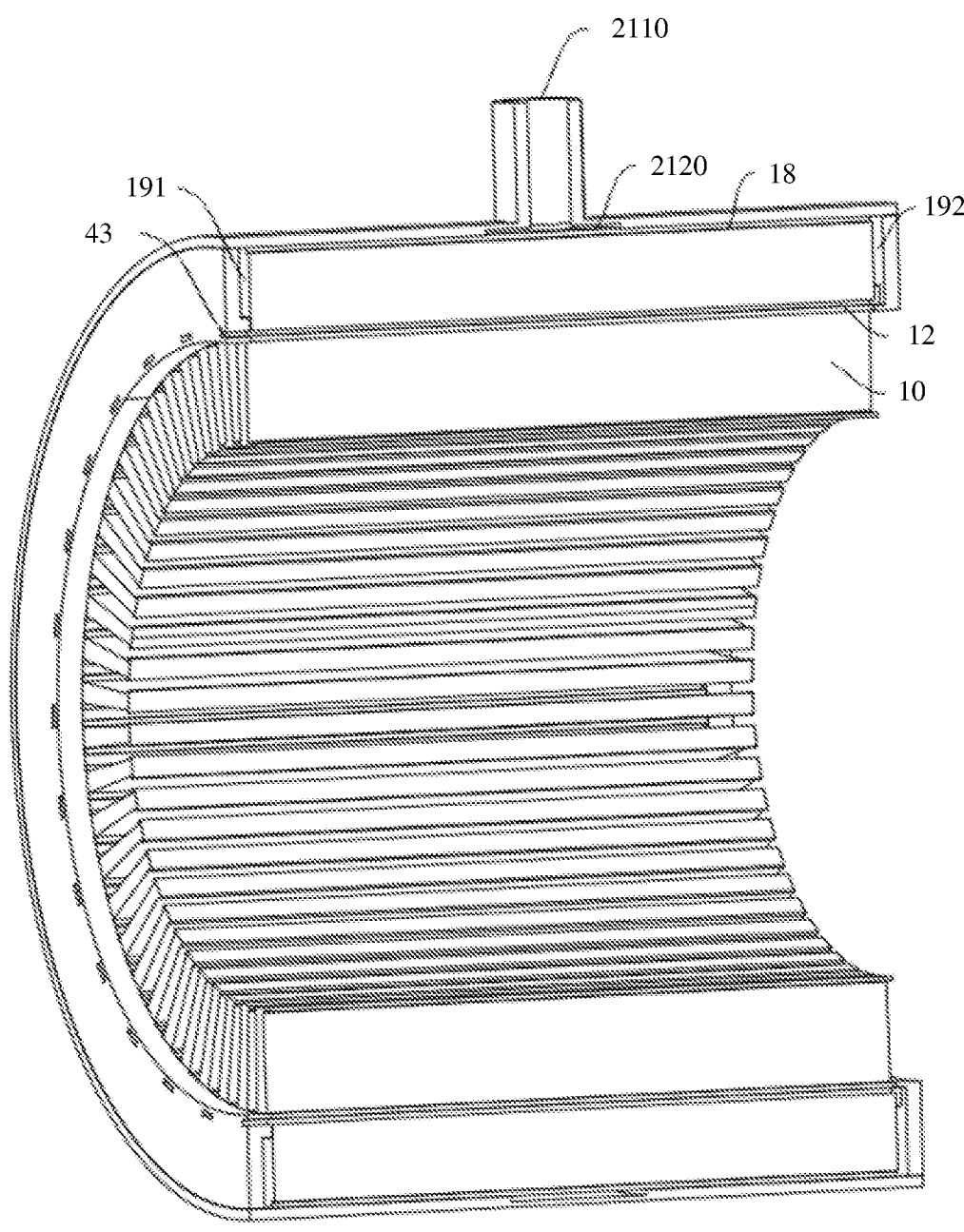
FIG. 45 is a schematic diagram of a partial structure of the motor shown in FIG. 44.
Figure 46:
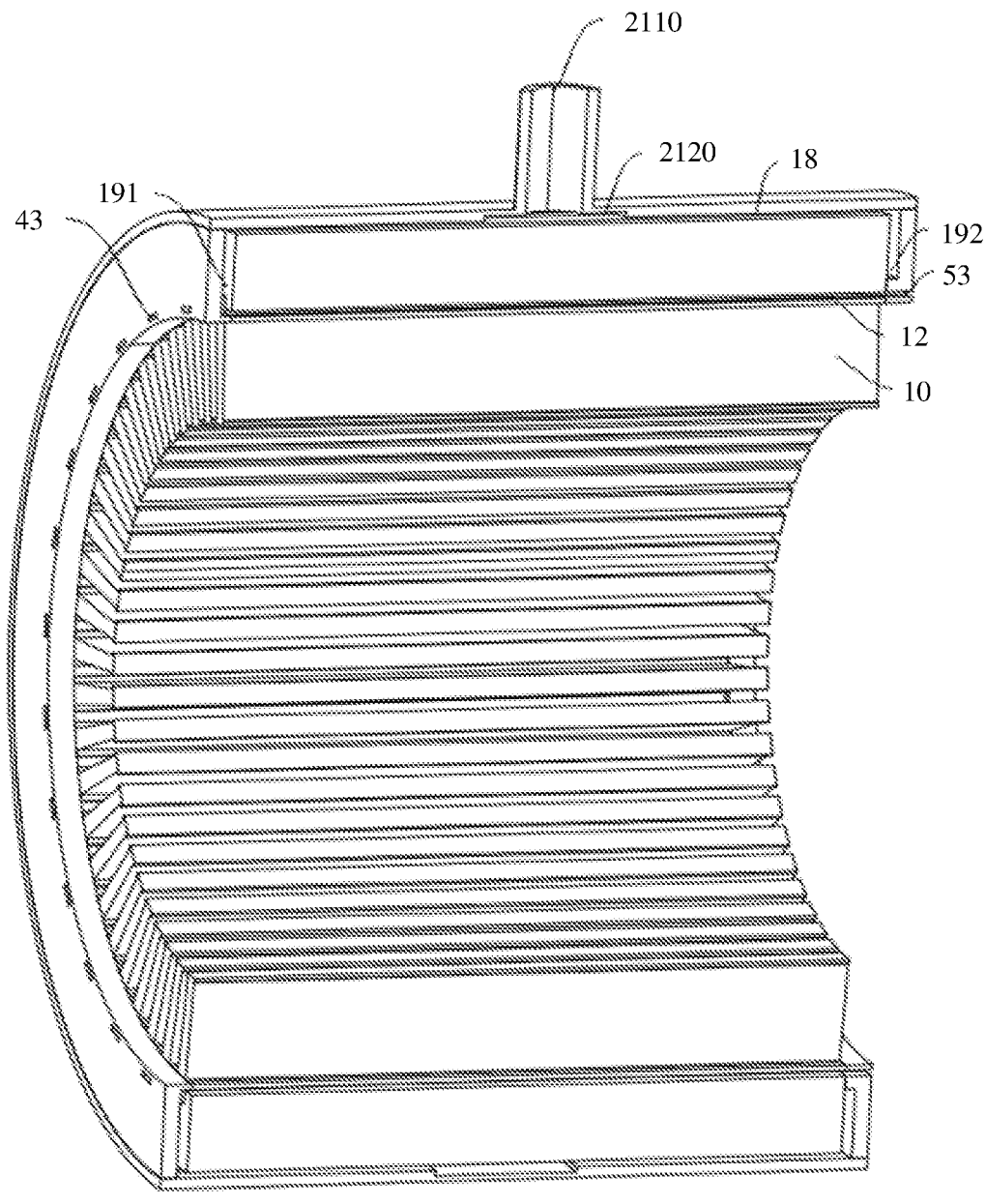
FIG. 46 is another schematic diagram of a partial structure of the motor shown in FIG. 44.
Figure 47:
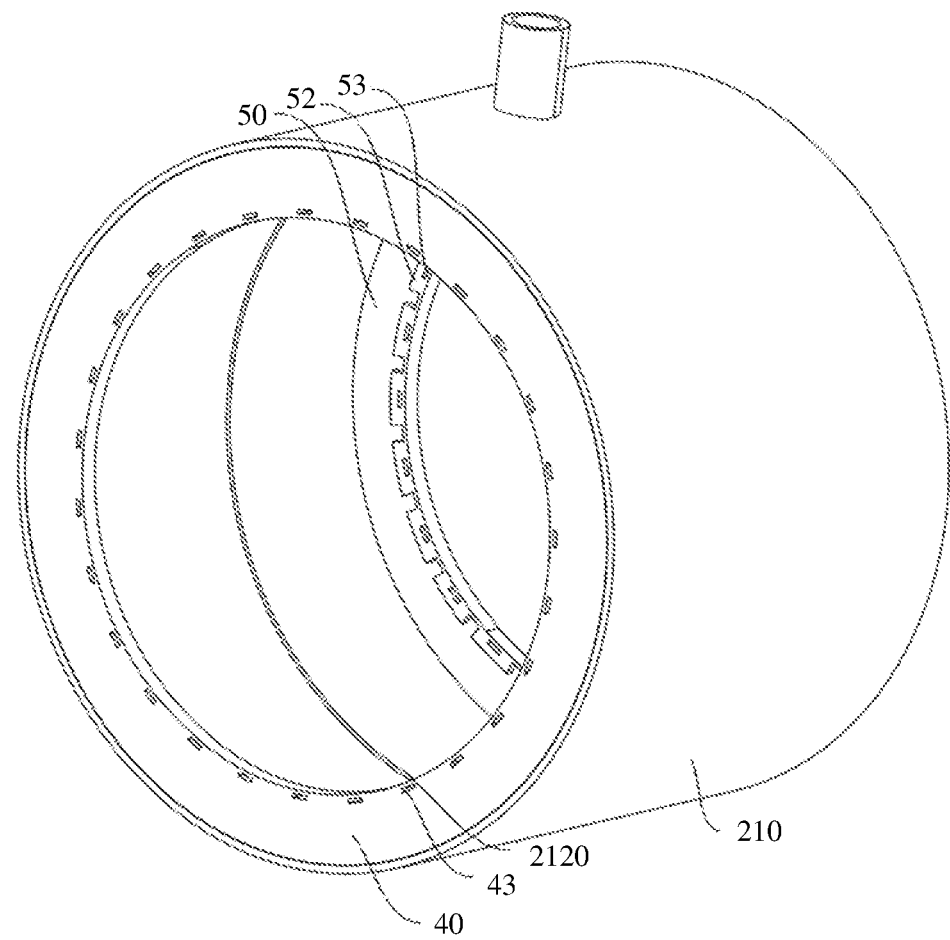
FIG. 47 is still another schematic diagram of a partial structure of the motor shown in FIG. 44.
Figure 48:
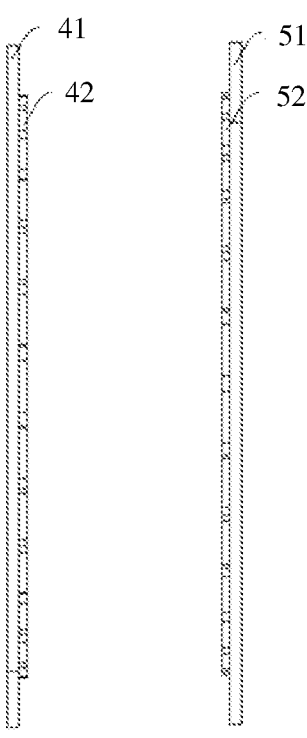
FIG. 48 is a schematic diagram of a first end cover and a second end cover of the motor shown in FIG. 44 at an angle.

With reference to FIG. 42, each of the third laminations 17 is provided with a plurality of third coil slots 171, a plurality of second flow guiding slots 172, and a plurality of third flow guiding slots 173. The plurality of third coil slots 171 on the same third lamination 17 may be spaced in the circumferential direction. The plurality of second flow guiding slots 172 on the same third lamination 17 may be spaced in the circumferential direction and may be located on a periphery of the plurality of third coil slots 171 on the same third lamination 17. The plurality of third flow guiding slots 173 on the same third lamination 17 may be spaced in the circumferential direction and may be located between the plurality of third coil slots 171 and the plurality of second flow guiding slots 172 on the same third lamination 17.

For example, a cross sectional shape of the third flow guiding slot 173 in the radial direction may be a rectangular shape. All the second flow guiding slots 172 on the same third lamination 17 may be spaced in a group of three (not limited to three, or may be one, two, or more). An irregular slot structure on the third lamination 17 may further form a weld bead structure of the stator core 10. In this case, irregular slot structures that are on the second lamination 16 and the first lamination 15 cooperating with the third lamination 17 and that are in the same shape as the irregular slot structure on the third lamination 17 may also further form a weld bead structure of the stator core 10. This is not strictly limited in this embodiment.

It may be understood that when all the third laminations 17 forming the middle part 103 are stacked together, the second flow guiding slots 172 of all the third laminations 17 communicate with each other to cooperatively form a plurality of second flow guiding passages 132 spaced in the circumferential direction, and the third flow guiding slots 173 of all the third laminations 17 communicate with each other to cooperatively form a plurality of third flow guiding passages 133 spaced in the circumferential direction.

Therefore, when all the first laminations 15 forming the first side part 104, all the second laminations 16 and all the third laminations 17 forming the middle part 103, and all the first laminations 15 forming the second side part 105 are sequentially connected, the first coil slots 151 of all the first laminations 15, the second coil slots 161 of all the second laminations 16, and the third coil slots 171 of all the third laminations 17 communicate with each other to cooperatively form the plurality of coil slots 111 spaced in the circumferential direction. Each of the coil slots 111 sequentially extends from first side part 104 to the middle part 103 and then to the second side part 105.

Based on the foregoing description, in this embodiment, the first laminations 15, the second laminations 16, and the third laminations 17 in three different forms are disposed. Therefore, when all the laminations are stacked in the axial direction and contours of the laminations completely overlap in the circumferential direction, slot structures at the same locations in the laminations may have a specified location relationship according to a requirement of a product. For example, all slot structures at the same locations in the laminations completely overlap to form the flow guiding passage 13, the flow splitting passage 14, and the flow passing passage 12 of the stator core 10. In addition, in the stacking assembly, an eddy-current loss of the stator core 10 can be reduced. This may be highly practical and widely applied.

Fourth Embodiment

With reference to FIG. 43, FIG. 44, FIG. 45, and FIG. 46, in the fourth embodiment, same content as the first embodiment is not described again, and different content from the first embodiment is described in detail below.

In this embodiment, an outer surface of the yoke part 101 caves in to form a connection slot 106 extending in the axial direction, the connection slot 106 is connected to the inner surface 2102 of the motor housing 210 to form a connection passage 18, and the liquid inlet passage 2120 communicates with the connection passage 18.

The connection passage 18 is disposed, so that heat can be directly dissipated from the stator core 10 when the coolant flows into the connection passage 18. In comparison with a case in which only the flow passing passage 12 is responsible for heat dissipation of the stator core 10 and the stator coil 20, the connection passage 18 is additionally disposed so that two layers of passages are formed inside the stator core 10, to share a heat dissipation load on the flow passing passage 12 and reduce the heat dissipation load on the flow passing passage 12. In this way, cooling performance of the stator core 10 is further improved, and heat dissipation efficiency and heat dissipation reliability of the stator core 10 are further ensured.

There may be a plurality of connection passages 18, and the plurality of connection passages 18 may be spaced in the circumferential direction and may be located on a periphery of the plurality of flow passing passages 12, to present a layout in which the plurality of connection passages 18 may be spaced in the circumferential direction of the stator core 10.

For example, the plurality of connection passages 18 may be evenly spaced in the circumferential direction. In other words, the plurality of connection passages 18 may be evenly distributed in the circumferential direction. In the setting of even distribution of the plurality of connection passages 18 in the circumferential direction, an overall temperature of the stator core 10 can be relatively even; and under fully adaption to the fluidity of the coolant, the imbalance generated when the coolant flows can be reduced, thereby further reducing a possibility of increasing the flow resistance of the coolant, challenging the fluidity of the coolant, and causing difficulty in normal working of the stator 100 due to generation of the imbalance. In this way, use performance of the stator 100 is effectively ensured.

With reference to FIG. 45, FIG. 46, FIG. 47, and FIG. 48, the stator 100 further includes a first end cover 40 and a second end cover 50, and the first end cover 40 and the second end cover 50 are respectively connected to two ends of a housing of the stator 100 and abut against two axial ends of the stator core 10.

The first end cover 40 is presented in a ring shape and includes a first body 41 and a plurality of first protrusion parts 42 protruding from the first body 41. The plurality of first protrusion parts 42 may be spaced in the circumferential direction and can abut against the stator core 10. The first body 41 cooperates with the housing of the stator 100 and the stator core 10 to form a first flow equalization passage 191. The first flow equalization passage 191 communicates with each of the plurality of connection passages 18. Each of the first protrusion parts 42 is provided with a first liquid outlet 43 penetrating the first end cover 40. For example, the first end cover 40 is an integrated structure.

The second end cover 50 is presented in a ring shape and includes a second body 51 and a plurality of second protrusion parts 52 protruding from the second body 51. The plurality of second protrusion parts 52 may be spaced in the circumferential direction and can abut against the stator core 10. The second body 51 cooperates with the housing of the stator 100 and the stator core 10 to form a second flow equalization passage 192. The second flow equalization passage 192 communicates with each of the plurality of connection passages 18. Each of the second protrusion parts 52 is provided with a second liquid outlet 53 penetrating the second end cover 50. For example, the second end cover 50 is an integrated structure.

It may be understood that, when the first end cover 40 and the second end cover 50 are stacked, the first liquid outlet 43 of the first end cover 40 and the second liquid outlet 53 of the second end cover 50 are not disposed in a facing manner but are disposed in a staggered manner. Each first liquid outlet 43 on the first end cover 40 may face one gap between two adjacent second protrusion parts 52 on the second end cover 50. Each second liquid outlet 53 on the second end cover 50 faces one gap between two adjacent first protrusion parts 42 on the first end cover 40.

In this way, two adjacent flow passing passages 12 respectively communicate with the first liquid outlet 43 and the second liquid outlet 53. The flow passing passage 12 communicating with the first liquid outlet 43 further communicates with the second flow equalization passage 192. The flow passing passage 12 communicating with the second liquid outlet 53 further communicates with the first flow equalization passage 191.

In this way, outlets of two adjacent flow passing passages 12 are respectively the first liquid outlet 43 and the second liquid outlet 53. In other words, in the two adjacent flow passing passages 12, the coolant in one flow passing passage 12 is sprayed from the first liquid outlet 43 of the first end cover 40 to the first end winding 23, and the coolant in the other flow passing passage 12 is sprayed from the second liquid outlet 53 of the second end cover 50 to the second end winding 24. In this setting, the coolant can flow out through three layers of passages (the connection passage 18, the first flow equalization passage 191, and the flow passing passage 12; or the connection passage 18, the second flow equalization passage 192, and the flow passing passage 12), thereby sufficiently increasing a contact area with the stator core 10 and implementing a high heat dissipation capability and high cooling efficiency.

Based on the foregoing description, it should be understood that, the connection passage 18, the first flow equalization passage 191, and the second flow equalization passage 192 are the foregoing described passages that can be connected to the liquid inlet passage 2120 and the flow passing passage 12. In this embodiment, the liquid inlet passage 2120, the connection passage 18, the first flow equalization passage 191, the second flow equalization passage 192, and the flow passing passage 12 jointly form a cooling passage of the motor 200.

It may be understood that, in this embodiment, the cooling passage of the motor 200 may enable the coolant to flow into the connection passage 18 through the liquid inlet passage 2120 disposed on the motor housing 210. For the coolant flowing into the connection passage 18, one part of the coolant flows into the flow passing passage 12 through the first flow equalization passage 191 disposed on the first end cover 40, and then is sprayed to the second end winding 24 through the second liquid outlet 53 that is on the second end cover 50 and that communicates with the flow passing passage 12. The other part of the coolant flows into the flow passing passage 12 through the second flow equalization passage 192 disposed on the second end cover 50, and then is sprayed to the first end winding 23 through the first liquid outlet 43 that is on the first end cover 40 and that communicates with the flow passing passage 12.

Therefore, heat dissipation requirements of the stator core 10 and the stator coil 20 are both considered by using the cooling passage of the motor 200, so that heat dissipation and cooling can be performed on both the stator core 10 and the stator coil 20 by using the cooling passage. This facilitates diversification of use performance of the stator 100. In this way, high-speed running of the motor 200 is ensured, practicability is high, and an application scope is wide.

The following describes a forming principle of the stator core 10 in this embodiment.

Figure 49:
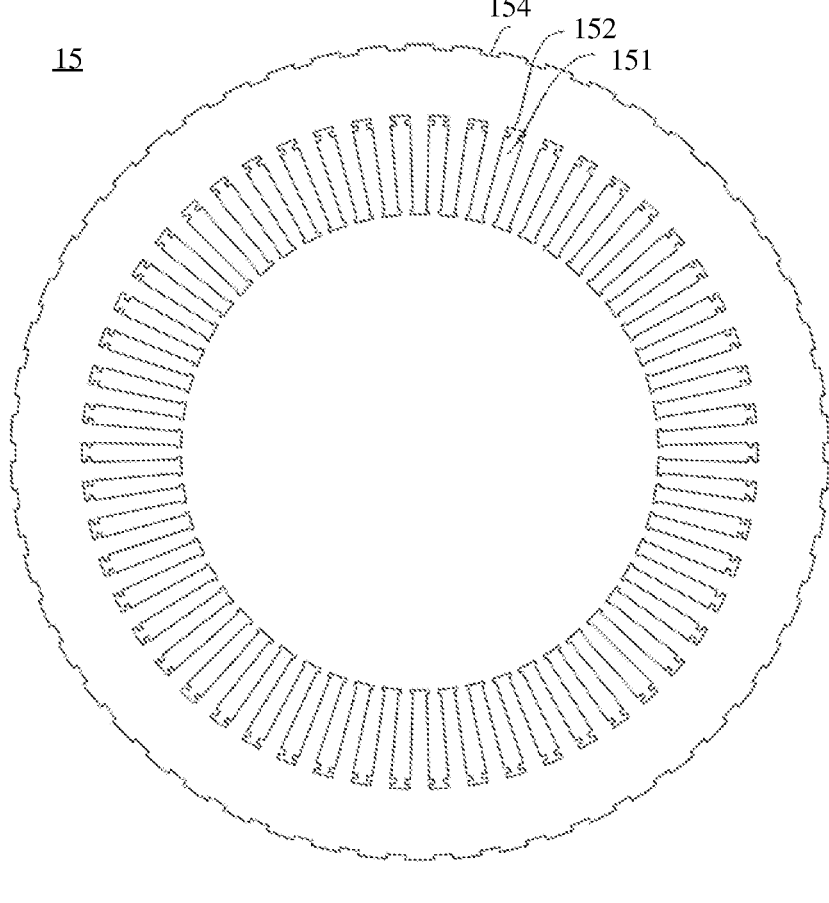
FIG. 49 is a schematic diagram of a structure of a first lamination of a stator core according to a fourth embodiment.

With reference to FIG. 49, in this embodiment, the stator core 10 includes a plurality of first laminations 15 and the plurality of first laminations 15 may be stacked in the axial direction to form the stator core 10. For example, a material of the first lamination 15 is silicon steel. In other words, the first laminations 15 are all silicon steel sheets.

Each of the first laminations 15 is provided with a plurality of first coil slots 151, a plurality of flow passing sub-slots 152, and a plurality of connection sub-slots 154. The plurality of first coil slots 151 on the same first lamination 15 may be spaced in the circumferential direction. The plurality of flow passing sub-slots 152 on the same first lamination 15 may be spaced in the circumferential direction and communicate in a one-to-one correspondence manner with the plurality of first coil slots 151 located at the same first lamination 15. The plurality of connection sub-slots 154 on the same first lamination 15 may be spaced in the circumferential direction and may be located on a periphery of the plurality of flow passing sub-slots 152 on the same first lamination 15.

In this case, when all the first laminations 15 are stacked together, the first coil slots 151 on all the first laminations 15 communicate with each other to cooperatively form the plurality of coil slots 111 spaced in the circumferential direction. Each of the coil slots 111 penetrates two axial ends of the stator core 10 in the axial direction.

In addition, the flow passing sub-slots 152 of all the first laminations 15 communicate with each other to cooperatively form the plurality of flow passing slots 112 that are spaced in the circumferential direction and that extend in the axial direction. Each of the flow passing slots 112 penetrates the two axial ends of the stator core 10 in the axial direction. The flow passing slot 112 can also cooperate with an insulation kit to form the flow passing passage 12, so that the coolant flows in the flow passing passage 12 to perform heat dissipation and cooling on the stator core 10 and the stator coil 20. For example, a cross sectional shape of the flow passing sub-slot 152 in the radial direction may be consistent with the cross sectional shape of the flow passing slot 112 in the radial direction shown in FIG. 8 to FIG. 12. This is not limited in this embodiment.

In addition, the connection sub-slots 154 of all the first laminations 15 communicate with each other to cooperatively form a plurality of connection slots 106 that are spaced in the circumferential direction and that extend in the axial direction. The connection slot 106 can also cooperate with the inner surface 2102 of the motor housing 210 to form the connection passage 18, so that the coolant flows in the connection passage 18 to perform heat dissipation and cooling on the stator core 10.

Based on the foregoing description, in this embodiment, the first laminations 15 are disposed. Therefore, when all the first laminations 15 are stacked in the axial direction and contours of the first laminations completely overlap in the circumferential direction, slot structures at the same locations in the laminations may have a specified location relationship according to a requirement of a product. For example, all slot structures at the same locations in the laminations completely overlap to form the connection passage 18 and the flow passing passage 12 of the stator core 10. In addition, in the stacking assembly, an eddy-current loss of the stator core 10 can be reduced. This may be highly practical and widely applied.

With reference to the foregoing four embodiments, it should be understood that, in the setting in which the flow passing slot 112 cooperates with the insulation kit to form the flow passing passage 12 in the embodiments, a cooling temperature gain of 20° C. to 30° C. can be implemented when a passage is not additionally added, so that the heat dissipation capability of the stator 100 is effectively improved. In addition, a heat transfer path of the flow passing passage 12 may be short, so that the contact area with the stator core 10 can be effectively increased, and joint heat dissipation of the stator coil 20 and the stator core 10 can be considered, thereby achieving high heat dissipation efficiency.

The embodiments are described in detail above. The principles and the implementations are described through examples. The description about the embodiments is merely provided to help understand the method and ideas. In addition, a person of ordinary skill in the art can make variations and modifications in terms of the implementations and application scopes. Therefore, the content of the embodiments shall not be construed as limiting.

What is claimed is:

1. A stator, comprising a stator core and a seal kit;

the stator core comprises a yoke part and a plurality of tooth parts, a tooth root of the tooth part is connected to the yoke part, a tooth top of the tooth part is away from the yoke part, and an opening slot is formed between two adjacent tooth parts;

the opening slot comprises a coil slot and a flow passing slot that communicate with each other, the coil slot extends from the tooth top to the tooth root, the coil slot is configured to accommodate a stator coil, and the flow passing slot extends from the tooth root to the yoke part; and the seal kit is connected to an inner wall of the opening slot, and the seal kit and the inner wall of the flow passing slot jointly form a flow passing passage for a coolant to flow through;

wherein the yoke part is further provided with a flow guiding passage extending in a radial direction;

an inlet of the flow guiding passage is disposed on an outer surface of the yoke part and is configured to guide a coolant in a liquid inlet passage of a peripheral mechanical part of the stator core to the stator core, and an outlet of the flow guiding passage at least partially communicates with an inlet of the flow passing passage;

wherein the flow guiding passage comprises one first flow guiding passage, two second flow guiding passages, and two third flow guiding passages, and the first flow guiding passage communicates with the liquid inlet passage of the peripheral mechanical part of the stator core;

the two second flow guiding passages are respectively located on two sides of an inlet of the first flow guiding passage, one of the second flow guiding passages communicates with the first flow guiding passage and the first flow splitting passage, and the other one of the second flow guiding passages communicates with the first flow guiding passage and the second flow splitting passage; and the two third flow guiding passages are respectively located on two sides of an outlet of the first flow guiding passage, one of the third flow guiding passages communicates with the first flow guiding passage and the first flow passing passage, and the other one of the third flow guiding passages communicates with the first flow guiding passage and the second flow passing passage.

2. The stator according to claim 1, further comprising:

a stator coil, wherein the stator coil comprises a core part, and the core part passes through the coil slot; and the seal kit is located between the core part and the coil slot, and the seal kit wraps the inner wall of the coil slot.

3. The stator according to claim 2, wherein the stator coil further comprises an end winding connected to the core part, the end winding is located on an outer side of the stator core, and an outlet of the flow passing passage faces the end winding.

4. The stator according to claim 1, wherein the flow passing slot comprises a body part and at least one branch part, the body part communicates with the coil slot, and the at least one branch part is spaced on a peripheral side of the body part and communicates with the body part.

5. The stator according to claim 4, wherein the flow passing slot has a symmetrical structure.

6. The stator according to claim 1, wherein the yoke part is further provided with a flow splitting passage extending in an axial direction, the flow splitting passage is away from the tooth part relative to the flow passing passage, an inlet of the flow splitting passage communicates with the flow guiding passage, and an outlet of the flow splitting passage is disposed on an end face of the yoke part; and one end of the flow splitting passage in the radial direction is open, and the other end of the flow splitting passage in the radial direction is closed; or two ends of the flow splitting passage are both closed in the radial direction.

7. The stator according to claim 1, wherein the stator core comprises a middle part, and a first side part and a second side part that are respectively connected to two ends of the middle part, the yoke part and the tooth part both sequentially extend from the first side part to the middle part and then to the second side part, and the flow guiding passage is located at the middle part.

8. The stator according to claim 7, wherein the flow passing passage comprises a first flow passing passage and a second flow passing passage, the first flow passing passage and the second flow passing passage are respectively located at the first side part and the second side part, the first flow passing passage and the second flow passing passage are symmetrically disposed, and the first flow passing passage and the second flow passing passage each communicate with the flow guiding passage and an outer space of the stator.

9. The stator according to claim 8, wherein a flow splitting passage comprises a first flow splitting passage and a second flow splitting passage, the first flow splitting passage and the second flow splitting passage are respectively located at the first side part and the second side part, the first flow splitting passage and the second flow splitting passage are symmetrically disposed, and the first flow splitting passage and the second flow splitting passage each communicate with the flow guiding passage and the outer space of the stator.

10. The stator according to claim 1, wherein the tooth root at least partially separates the coil slot and the flow passing slot.

11. The stator according to claim 1, wherein the seal kit comprises insulation paper.

12. A motor, comprising a motor housing and a stator, and the stator comprises a stator core and a seal kit;

the stator core comprises a yoke part and a plurality of tooth parts, a tooth root of the tooth part is connected to the yoke part, a tooth top of the tooth part is away from the yoke part, and an opening slot is formed between two adjacent tooth parts;

the opening slot comprises a coil slot and a flow passing slot that communicate with each other, the coil slot extends from the tooth top to the tooth root, the coil slot is configured to accommodate a stator coil, and the flow passing slot extends from the tooth root to the yoke part; and the seal kit is connected to an inner wall of the opening slot, and the seal kit and the inner wall of the flow passing slot jointly form a flow passing passage for a coolant to flow through, and the stator is accommodated inside the motor housing, wherein the motor further comprises a first end cover and a second end cover, and the first end cover and the second end cover are respectively connected to two ends of a housing of the stator and abut against two axial ends of the stator core;

there is a plurality of connection passages, wherein the connection passages are spaced in the circumferential direction;

the first end cover comprises a first body and a plurality of first protrusion parts protruding from the first body, the plurality of first protrusion parts is spaced in the circumferential direction and abut against the stator core, each of the first protrusion parts is provided with one first liquid outlet penetrating the first end cover, the first body cooperates with the housing of the stator and the stator core to form a first flow equalization passage, and the first flow equalization passage communicates with the plurality of connection passages;

the second end cover comprises a second body and a plurality of second protrusion parts protruding from the second body, the plurality of second protrusion parts is spaced in the circumferential direction and abut against the stator core, each of the second protrusion parts is provided with one second liquid outlet penetrating the second end cover, the second body cooperates with the housing of the stator and the stator core to form a second flow equalization passage, and the second flow equalization passage communicates with the plurality of connection passages; and two adjacent flow passing passages respectively communicate with the first liquid outlet and the second liquid outlet, the flow passing passage communicating with the first liquid outlet further communicates with the second flow equalization passage, and the flow passing passage communicating with the second liquid outlet further communicates with the first flow equalization passage.

13. The motor according to claim 12, wherein an inner surface of the motor housing is provided with an annular liquid inlet passage, an outer surface of the motor housing is provided with a liquid inlet for flow-in of a coolant, and the liquid inlet communicates with the liquid inlet passage; and the liquid inlet passage communicates with a flow guiding passage of the yoke part; or the outer surface of the yoke part caves in to form a connection slot extending in the axial direction, the connection slot is connected to the inner surface of the motor housing to form a connection passage, and the liquid inlet passage communicates with the connection passage.

14. The motor according to claim 13, wherein the stator core comprises a plurality of first laminations, and the plurality of first laminations is stacked to form the stator core;

each of the first laminations is provided with a plurality of first coil slots, and the plurality of first coil slots on the same first lamination is spaced in the circumferential direction; and the first coil slots of all the first laminations communicate with each other to cooperatively form the plurality of coil slots spaced in the circumferential direction.

15. The motor according to claim 14, wherein each of the first laminations is further provided with a plurality of flow passing sub-slots, and the plurality of flow passing sub-slots on the same first lamination is spaced in the circumferential direction and communicate in a one-to-one correspondence manner with the plurality of first coil slots located at the same first lamination; and flow passing sub-slots of all the first laminations forming the stator core communicate with each other to cooperatively form a plurality of flow passing slots that are spaced in the circumferential direction and that extend in the axial direction.

16. The motor according to claim 15, wherein each of the first laminations is further provided with a plurality of connection sub-slots, and the plurality of connection sub-slots on the same first lamination is spaced in the circumferential direction and are located on a periphery of the plurality of flow passing sub-slots on the same first lamination; and the connection sub-slots of all the first laminations forming the stator core communicate with each other to cooperatively form a plurality of connection slots that is spaced in the circumferential direction and that extend in the axial direction.

17. The motor according to claim 12, wherein the tooth root at least partially separates the coil slot and the flow passing slot; and the seal kit comprises insulation paper.

18. A power assembly, comprising a motor controller and a motor, the motor comprises a motor housing and a stator, and the stator comprises a stator core and a seal kit;

the stator core comprises a yoke part and a plurality of tooth parts, a tooth root of the tooth part is connected to the yoke part, a tooth top of the tooth part is away from the yoke part, and an opening slot is formed between two adjacent tooth parts;

the opening slot comprises a coil slot and a flow passing slot that communicate with each other, the coil slot extends from the tooth top to the tooth root, the coil slot is configured to accommodate a stator coil, and the flow passing slot extends from the tooth root to the yoke part; and the seal kit is connected to an inner wall of the opening slot, and the seal kit and the inner wall of the flow passing slot jointly form a flow passing passage for a coolant to flow through, and the stator is accommodated inside the motor housing, and the motor controller is electrically connected to the motor;

wherein the motor further comprises a first end cover and a second end cover, and the first end cover and the second end cover are respectively connected to two ends of a housing of the stator and abut against two axial ends of the stator core;

there is a plurality of connection passages, wherein the connection passages are spaced in the circumferential direction;

the first end cover comprises a first body and a plurality of first protrusion parts protruding from the first body, the plurality of first protrusion parts is spaced in the circumferential direction and abut against the stator core, each of the first protrusion parts is provided with one first liquid outlet penetrating the first end cover, the first body cooperates with the housing of the stator and the stator core to form a first flow equalization passage, and the first flow equalization passage communicates with the plurality of connection passages;

the second end cover comprises a second body and a plurality of second protrusion parts protruding from the second body, the plurality of second protrusion parts is spaced in the circumferential direction and abut against the stator core, each of the second protrusion parts is provided with one second liquid outlet penetrating the second end cover, the second body cooperates with the housing of the stator and the stator core to form a second flow equalization passage, and the second flow equalization passage communicates with the plurality of connection passages; and two adjacent flow passing passages respectively communicate with the first liquid outlet and the second liquid outlet, the flow passing passage communicating with the first liquid outlet further communicates with the second flow equalization passage, and the flow passing passage communicating with the second liquid outlet further communicates with the first flow equalization passage.

19. The power assembly according to claim 18, wherein an inner surface of the motor housing is provided with an annular liquid inlet passage, an outer surface of the motor housing is provided with a liquid inlet for flow-in of a coolant, and the liquid inlet communicates with the liquid inlet passage; and the liquid inlet passage communicates with a flow guiding passage of the yoke part; or the outer surface of the yoke part caves in to form a connection slot extending in the axial direction, the connection slot is connected to the inner surface of the motor housing to form a connection passage, and the liquid inlet passage communicates with the connection passage.

20. The power assembly according to claim 18, wherein the tooth root at least partially separates the coil slot and the flow passing slot; and the seal kit comprises insulation paper.

\* \* \* \* \*